(12) United States Patent
Sa

(10) Patent No.: US 12,048,391 B1
(45) Date of Patent: Jul. 30, 2024

(54) PORTABLE COFFEE MACHINE

(71) Applicant: UUOOSS LTD, Majuro (MH)

(72) Inventor: Sandy Sa, Majuro (MH)

(73) Assignee: UUOOSS LTD, Majuro (MH)

( * ) Notice: Subject to any disclaimer, the term of this patent is extended or adjusted under 35 U.S.C. 154(b) by 0 days.

(21) Appl. No.: 18/525,932

(22) Filed: Dec. 1, 2023

Related U.S. Application Data

(63) Continuation-in-part of application No. 18/329,509, filed on Jun. 5, 2023, now Pat. No. 11,903,513.

(51) Int. Cl.
| | |
|---|---|
| A47J 31/00 | (2006.01) |
| A47J 31/36 | (2006.01) |
| A47J 31/40 | (2006.01) |
| A47J 31/42 | (2006.01) |
| A47J 31/46 | (2006.01) |
| A47J 31/54 | (2006.01) |
| A47J 31/057 | (2006.01) |

(52) U.S. Cl.
CPC ............. *A47J 31/005* (2013.01); *A47J 31/36* (2013.01); *A47J 31/404* (2013.01); *A47J 31/407* (2013.01); *A47J 31/42* (2013.01); *A47J 31/468* (2018.08); *A47J 31/54* (2013.01); *A47J 31/057* (2013.01)

(58) Field of Classification Search
CPC ........ A47J 31/005; A47J 31/02; A47J 31/057; A47J 31/36
See application file for complete search history.

(56) References Cited

U.S. PATENT DOCUMENTS

| | | | |
|---|---|---|---|
| 2006/0107839 A1* | 5/2006 | Nenov .................... | A47J 31/36 99/275 |
| 2016/0183717 A1* | 6/2016 | Ostan ..................... | A47J 31/24 99/280 |
| 2017/0303712 A1* | 10/2017 | Pisarevsky ............. | A47J 31/32 |
| 2018/0206666 A1* | 7/2018 | Kollep .................. | A47J 31/407 |
| 2018/0333007 A1* | 11/2018 | Ganahl ................. | A47J 31/005 |
| 2022/0061577 A1* | 3/2022 | Newman ................. | A47J 31/02 |
| 2022/0125234 A1* | 4/2022 | Richardson ......... | A47J 31/0626 |

* cited by examiner

*Primary Examiner* — Reginald Alexander
(74) *Attorney, Agent, or Firm* — Ying-Ting Chen

(57) ABSTRACT

A portable coffee machine includes a transferring cup, and a machine body which includes a housing, a water storing cup mounted to the housing, a water pump, and an extraction container which is integrated at the housing, wherein the extraction container has an extraction cavity for receiving a coffee capsule, wherein the transferring cup is detachably coupled to the extraction container for retaining the coffee capsule in the extraction cavity, wherein water in the water storing cup is capable of being pumped into the extraction container by the water pump for coffee extraction.

15 Claims, 62 Drawing Sheets

PORTABLE COFFEE MACHINE

CROSS REFERENCE OF RELATED APPLICATION

This application is a Continuation-In-Part application that claims the benefit of priority under 35 U.S.C. § 120 to a non-provisional application, application Ser. No. 18/329,509, filed on Jun. 5, 2023, wherein the entire content of which is expressly incorporated herein by reference.

BACKGROUND OF THE PRESENT INVENTION

Field of Invention

The present invention relates to the field of coffee machine technology, and more particularly to a portable coffee machine.

Description of Related Arts

Coffee is a globally popular beverage, which is frequently consumed in social gatherings and office settings by white-collar workers due to its ability to energize, refresh, and relieve hangovers. The coffee we drink daily is made by using various types of coffee beans with different brewing equipment.

A conventional way of making coffee is mostly pouring hot water into a cup to brew the coffee powder inside. The taste of the coffee brewed this way is not well and cannot meet the strict requirements of taste for coffee lovers. If roasted coffee beans are exposed to the air for a long time, they will undergo chemical changes and gradually become acidic. This causes many large packages of coffee powder or coffee beans to undergo changes that are not yet noticeable when consumed, and they fail to meet people's requirements. Therefore, making it into capsule coffee is a common solution. Capsule coffee is made by grinding the coffee beans into coffee powder first, and then putting them into an aluminum capsule to avoid problems such as oxidation caused by ordinary coffee beans or coffee powder contacting with the air. It effectively preserves the fresh taste of the coffee.

However, this type of capsule requires a professional coffee machine for brewing. A current capsule coffee machine is generally bulky and can only be placed indoors. In the high-paced work and life of society, people cannot spare enough time to use a professional coffee machine for brewing. Also, under outdoor circumstances such as traveling, there are no facilities for brewing, which makes it impossible to enjoy freshly brewed coffee anytime and anywhere.

A current conventional coffee machine generally has a bulky size, which is not convenient for people to carry around. When making coffee outdoors, most people pour hot water into a cup to brew the coffee powder. They need to stir it quickly to dissolve the coffee powder, and the resulting coffee is usually of average taste and cannot meet users' needs.

In other words, the conventional technology involves grinding coffee beans into coffee powder and packing the powder into food-grade packaging bags or capsules to form coffee cakes or coffee capsules. However, the machines for brewing such coffee cakes or coffee capsules into espresso are bulky and not easy to carry, which cannot meet people's demand for drinking coffee when on business trips or traveling, and the coffee capsules are expensive.

There are now some portable coffee machines on the market, but these machines cannot adapt to both coffee capsules and coffee powder at the same time, and because the extraction blade design is relatively simple when extracting coffee capsules, the extraction efficiency is low. In addition, these portable coffee machines do not have a water pump and drainage assembly, resulting in uncontrollable water flow speed and difficult water flow direction changing. These portable coffee machines also do not have a heating module, thus requiring hot water to be added to the coffee machine. Furthermore, these portable coffee machines have poor air tightness and sealing performance, which can easily cause water leakage.

SUMMARY OF THE PRESENT INVENTION

The present invention provides a portable electric pumping coffee machine, which comprises a housing, a drainage module, an extraction module, and a controller, wherein the drainage module comprises a water storing cup, a water pump, a conduit, and a drainage assembly, wherein the water storing cup is connected to the housing and is located at a top of the housing, the extraction module is detachably connected to the drainage module, the extraction module comprises a transferring cup and an extraction container, the transferring cup is detachably connected to the extraction container, wherein the controller comprises a control module for controlling the water pump to pump the water in the water storing cup through the conduit and the drainage assembly into the extraction module.

Preferably, the extraction container is a first extraction container for extracting coffee powder, wherein the first extraction container is provided with a filtering layer and a one-way valve.

Preferably, the first extraction container comprises a cover and a container body. The top of the cover is provided with a third through hole arranged in a ring shape, which can allow water to enter and form a circulation to sufficiently extract the coffee powder.

Preferably, a filtering layer is arranged at the bottom of the container body, and a plurality of upward extending buckles are provided at the edge of the filtering layer, which facilitates the disassembly and cleaning of the filtering layer.

Preferably, a one-way valve is provided at the center of the bottom of the container body to prevent the backflow of coffee liquid due to high pressure after the water pump stops running.

Preferably, the extraction container is a second extraction container wherein the second extraction container is used for extracting a coffee capsule and is equipped with at least one extraction blade.

Preferably, there is a groove at the center of an end of the second extraction container, and a plurality of extraction blades is extended from the edge around the groove.

Preferably, a fourth through hole is located near the extraction blade at the end of the second extraction container, and the side of the extraction blade is bent toward the direction of the fourth through hole, so that the water flowing through the fourth through hole can fully enter the coffee capsule.

Preferably, the drainage module further comprises a limiting frame and a fixing base, wherein the limiting frame is provided with a first through hole away from the center, one end of the drainage assembly is extended into the first through hole, and a protruding block is extended towards the center of the limiting frame at the first through hole. The limiting frame comprises projections for limiting the drainage assembly, wherein the fixing base is connected with the limit frame, the fixing base is provided with a fifth groove, the fifth groove is provided with a second through hole.

Preferably, the portable electric pumping coffee machine further comprises a sensor assembly, a driving module and a power module, the sensor assembly is electrically connected to the power module, and the sensor assembly comprises a first sensor and a second sensor. The first sensor is connected to the water storing cup to detect the temperature of the water in the water storing cup. The second sensor is connected to the battery to detect the temperature of the battery. The driving module is electrically connected to the control module, and the driving module comprises a driving motor, wherein the driving motor is connected to the water pump for driving the water pump. The power module is electrically connected to the control module and the driving module, and comprises a battery for providing power to other modules.

Preferably, the first sensor and the second sensor are temperature sensors.

Preferably, the portable electric pumping coffee machine further comprises a heating module, wherein the heating module comprises a heating member, the heating member is connected to the water storing cup, and the heating member is used for heating the water in the water storing cup.

Preferably, the portable electric pumping coffee machine further comprises a mounting bracket, wherein a bottom of the mounting bracket is provided with the controller and an upper fixing arm, and the upper fixing arm is connected to the water storing cup, the other side of the bottom of the mounting bracket is provided with a lower fixing foot, which is connected to the limiting frame.

Preferably, there is a peripheral hole provided in the water storing cup, and there is a hollow column extended from the peripheral hole. One end of the conduit is connected to the hollow column, and the other end of the conduit is connected to the drainage assembly. One side of the water pump is connected to the drainage assembly.

Preferably, the bottom of the transferring cup is provided with protrusions and small holes, and the inner wall of the transferring cup is provided with engaging blocks.

The above technical solution has the following advantages or beneficial effects.

First of all, the portable electric pumping coffee machine of the present invention is equipped with a drainage assembly, which is connected to a water pump. The drainage assembly is able to change the direction and control the flow rate of the water while pumping the water into the extraction cup. Moreover, the second groove of the drainage assembly is equipped with an inclined groove for the convenience of water flow entering the first water inlet, thus avoiding water overflow.

Secondly, the portable electric pumping coffee machine of the present invention is equipped with one or more extraction blades, the side of which is bent towards the direction of the fourth through hole, so that the water flowing through the fourth through hole can fully enter the coffee capsule through the extraction blades, thereby improving the extraction efficiency.

Thirdly, the portable electric pumping coffee machine of the present invention is equipped with a heating module, which can heat the water in the water storing cup, enhancing the applicability and versatility of the coffee machine.

Fourthly, this portable electric pumping coffee machine of the present invention is equipped with extraction containers which allow for the extraction of coffee capsule and coffee powder, increasing its versatility.

The invention also provides a heating assembly, which is used in a portable coffee machine, the heating assembly comprises a heating cup that is connected to a water pipe. The outer surrounding wall or bottom of the heating cup is equipped with a heating member which is arranged to heat water in the heating cup.

In the above technical solution, preferably, the water pipe is provided on the peripheral edge of the bottom of the heating cup, the heating member is installed at the bottom of the heating cup.

In the above technical solution, preferably, the heating member is provided at the bottom of the heating cup, and the water pipe is provided at the center of the bottom of the heating cup, and passes through the heating member.

In the above technical solution, preferably, the heating member is a heating tube which is wound around the outer surrounding wall and the bottom of the heating cup.

In the above technical solution, preferably, the heating member is covered on the outer surrounding wall and the bottom of the heating cup, and is provided with a hole for the water pipe to pass through.

The present invention also discloses a portable coffee machine comprising a machine main body. The aforementioned heating assembly is used within the machine main body.

Preferably, the machine main body, from top to bottom, comprising an top cover, a housing, and a coffee cup. A upper supporting plate and a lower supporting plate are arranged inside the housing. A water pump is arranged on the lower supporting plate, and the drain sleeve is installed below. The water pump is connected to the heating cup through the water pipe. The drain sleeve is connected to the supporting sleeve, and the diversion sleeve is arranged between the supporting sleeve and the drain sleeve. The coffee capsule is installed in the diversion sleeve, and the coffee cup is covered by the drain sleeve. The water pump pressurizes the water to pass through the drain sleeve and the diversion sleeve, so as to act on a coffee capsule for achieving brewing. Then, the coffee liquid enters the supporting sleeve and finally flows into the coffee cup.

Preferably, there is a battery housed in the space between the lower supporting plate and the upper supporting plate. The upper supporting plate is equipped with a controlling circuit board, which is connected to a vertical sub-board. The sub-board is where a controlling button is positioned and there are one or more indicator lights below the the controlling button. Additionally, a charging port is also located on the housing, which is connected to the circuit board installed in the sub-board.

Preferably, the top cover is provided with one or more breathable holes, and a one-way valve is installed at the breathable holes to avoid water leakage from the heating cup.

Preferably, the top surface of the drain sleeve is provided with a collection groove and a collection hole is provided at the center position. The water pump is provided with an outlet, and the outlet is aligned with the collection groove.

Preferably, the diversion sleeve is provided with a diversion groove on the top center, and a diversion hole is located on the outer side of the diversion groove. The capsule compartment is arranged inside the diversion sleeve, and a breaking blade is installed on the top of the capsule compartment. The breaking blade is used to cut the outer wall of the coffee capsule, so that the water flowing down from the diversion hole can be fully mixed with the coffee powder.

Preferably, the bottom of the supporting sleeve is equipped with a guide cone surface, and the convergence of the guide cone surface is provided with a coffee outlet hole. The supporting sleeve is internally equipped with a bottom plate, which is provided with a plurality of protrusions for holding the coffee capsule, and a plurality of bumps are also provided on the bottom plate.

The present invention provides a heating assembly and a portable coffee machine. The structure of the coffee machine is simple and compact, which makes it easy for users to carry around and meet their need to drink coffee anytime and anywhere. Moreover, the coffee machine is capable of automatically producing high-pressure water when brewing coffee, resulting in a rich aroma of coffee.

The present invention further provides a portable coffee machine, comprising a transferring cup, and a machine body which comprises a housing, a water storing cup mounted to the housing, a water pump, and an extraction container which is integrated at the housing, wherein the extraction container has an extraction cavity for receiving a coffee capsule, wherein the transferring cup is detachably coupled to the extraction container for retaining the coffee capsule in the extraction cavity, wherein water in the water storing cup is capable of being pumped into the extraction container by the water pump for coffee extraction.

Preferably, the machine body further comprises a heating module for heating the water in the water storing cup.

Preferably, the heating module comprises a heating member which is located at a bottom of the water storing cup.

Preferably, the heating module comprises a heating member, wherein a top surface of the heating member partially form a bottom of the water storing cup.

Preferably, the water storing cup comprises a bottom wall and a surrounding wall connected to the bottom wall to define a water storing cavity, wherein the water storing cup further comprises a discharging portion which has a plurality of discharging holes communicated to the water storing cavity.

Preferably, the discharging portion is formed at a periphery of the bottom wall of the water storing cup, wherein the discharging portion is protruded from the bottom wall of the water storing cup for being connected to the water pump, wherein the heating member is provided at an inner side of the discharging portion. Preferably, the water storing cup is made of thermal conductive material.

Preferably, the water storing cup comprises a bottom wall and a surrounding wall connected to the bottom wall to define a water storing cavity, wherein the top surface of the heating member and the bottom wall of the water storing cup form the bottom of the water storing cup, wherein the water storing cup further comprises a discharging portion mounted to the bottom wall of the water storing cup, wherein the discharging portion has a plurality of discharging holes communicated to the water storing cavity. Preferably, the discharging portion is formed at a periphery of the bottom wall of the water storing cup, wherein the discharging portion is protruded from the bottom wall of the water storing cup for being connected to the water pump.

Preferably, the machine body further comprises a water pump assembly which comprises the water pump unit, a connecting conduit which is connected between the discharging portion of the water storing cup and the water pump unit, and a feeding conduit communicating the water pump unit to the extraction container.

Preferably, the extraction container comprises a body portion having the extraction cavity and a top inlet communicated to the extraction cavity, a mounting portion fixing the body portion to the housing, and a blade assembly mounted around the top inlet for piercing the coffee capsule.

Preferably, the transferring cup comprises a cup body having a receiving chamber, and a sealing portion mounted to the cup body and comprises a plurality of protrusions and has a plurality of discharge outlet holes which is communicated to the extraction cavity of the extraction container, wherein when the coffee capsule is disposed in the extraction cavity, the coffee capsule is retained between the plurality of protrusions and the blade assembly.

Preferably, the portable coffee machine further comprises a coffee cup detachably coupled to one of the extraction container and the housing.

Preferably, the portable coffee machine further comprises a cup lid detachably coupled with the water storing cup, wherein the cup lid comprises a lid boy having a plurality of vapor holes, a connecting column, and a flexible sealing film having a slit, wherein a cavity is defined between the sealing film and the lid body, wherein the plurality of vapor holes is communicated to the cavity.

Preferably, the portable coffee machine further comprises a cup lid detachably coupled with the water storing cup, wherein the cup lid comprises a lid body and a vapor discharging portion having one or more vapor holes which are communicated to the water storing cavity of the water storing cup.

Preferably, the portable coffee machine further comprises a switch which is embodied as a button, where when the button is continually pressed for a preset time duration, a controller activates the heating module to heat and boil the water in the water storing cup.

Preferably, after boiling the water in the water storing cup, the controller automatically activates the water pump to pump the boiled water into the extraction cavity of the extraction container.

According to anther aspect, the present invention provides a portable coffee machine, comprising:
- a machine body comprising a housing, a water storing cup mounted to the housing, and a water pump unit;
- an extraction assembly; and
- a transferring cup, wherein the extraction assembly is detachably coupled with the housing, wherein the transferring cup is detachably coupled to the extraction assembly, wherein water in the water storing cup is capable of being pumped into the extraction assembly by the water pump unit for coffee extraction.

Preferably, the machine body further comprises a water pump assembly which comprises the water pump unit, a connecting conduit which is connected between the discharging portion of the water storing cup and the water pump, and a feeding conduit communicating the water pump unit to the extraction assembly.

Preferably, the water pump unit comprises an operation motor having a driving shaft, a motion transmission element, a pump element and a water guiding element which is connected between the water storing cup and the extraction assembly, wherein when the operation motor is activated, the driving shaft is driven to rotate, and the rotation will be transmitted to the pump element by the motion transmission element, so as to drive the water guiding element to suck in the water from the water storing cup and discharge the water towards the extraction assembly.

Preferably, the motion transmission element comprises a driving unit comprising an eccentric member and a linkage member connected to the eccentric member, wherein the pump element comprises a diaphragm member connected to the linkage member, and a water transition plate communicated to the water guiding element, wherein the diaphragm member is attached to the water transition plate to define a transition chamber between the diaphragm member and the water transition plate.

Preferably, the motion transmission element further comprises a channel member, wherein the water transition plate has an inlet and an outlet, wherein the inlet and the outlet of the water transition plate are communicated to the transition chamber, wherein the channel member has an inlet channel and an outlet channel, wherein the inlet channel is communicated to the inlet of the water transition plate and the outlet channel is communicated to the outlet of the water transition plate, wherein the water guiding element comprises an inlet portion and an outlet portion, wherein the inlet portion is connected to the water storing cup by the connecting conduit, the outlet portion is connected to the feeding conduit.

Preferably, the water pump unit comprises an operation motor having a driving shaft, a motion transmission element, a pump element and a water guiding element which is connected between the water storing cup and the extraction assembly, wherein the motion transmission element comprises a driving unit comprising an eccentric member and a linkage member connected to the eccentric member, wherein the pump element comprises a diaphragm member connected to the linkage member, a water transition plate communicated to the water guiding element, and a channel member, wherein the diaphragm member is attached to the water transition plate to define a transition chamber between the diaphragm member and the water transition plate, wherein the water transition plate has an inlet and an outlet, wherein the inlet and the outlet of the water transition plate are communicated to the transition chamber, wherein the channel member has an inlet channel and an outlet channel, wherein the inlet channel is communicated to the inlet of the water transition plate and the outlet channel is communicated to the outlet of the water transition plate, wherein the water guiding element comprises an inlet portion connected to the water storing cup and an outlet portion connected to the extraction assembly, wherein when the operation motor is activated, the driving shaft drives the eccentric member to rotate, and the linkage member is driven by the eccentric member to reciprocate, so as to drive the diaphragm member to deform, so as to create pressure change in the transition chamber between the diaphragm member and the water transition plate, so as to suck the water from the water storing cup into the transition chamber and discharge the water in the transition chamber towards the extraction assembly.

Preferably, the extraction assembly comprises a capsule extraction container which comprises a capsule retaining portion and a top engaging portion connected to the capsule retaining portion, wherein the capsule retaining portion has an extraction cavity for receiving a coffee capsule, the top engaging portion has an inlet communicated to the extraction cavity, the housing has a feeding outlet hole at a bottom thereof, wherein when the top engaging portion is engaged with the housing, the feeding outlet hole is communicated to the inlet of the top engaging portion.

Preferably, the top engaging portion has an indented groove, wherein the feeding outlet hole is communicated to the inlet of the top engaging portion through the indented groove, wherein the top engaging portion has a plurality of the inlets arranged in a circumferential direction at a peripheral edge thereof, wherein the housing comprises a resilient protrusion at a bottom side thereof for biasing against the top engaging portion, wherein the feeding outlet hole is provided at a center of the resilient protrusion, wherein the capsule extraction container comprises a blade assembly which comprises a plurality of blades, wherein the plurality of blades is respectively aligned with the inlets of the top engaging portion, wherein the capsule extraction container is detachably disposed in the transferring cup to seal a bottom of the extraction cavity, wherein the transferring cup comprises a sealing portion comprising a plurality of protrusions and a plurality of discharge outlet holes aligned with the extraction cavity, wherein the transferring cup further has a central outlet communicated to the extraction cavity through the plurality of discharge outlet holes.

Preferably, the extraction assembly comprises a powder extraction container which comprises a top engaging portion, a cover body and a body portion, wherein aid cover body is detachably coupled with the bod portion to define an extraction cavity for receiving coffee powder, wherein the top engaging portion, which is connected to the cover body, has an inlet communicated to the extraction cavity, wherein the housing has a feeding outlet hole at a bottom thereof, wherein when the top engaging portion is engaged with the housing, the feeding outlet hole is communicated to the inlet of the top engaging portion.

Preferably, the powder extraction container further comprises a backflow prevention layer disposed in the extraction cavity for preventing back flow of coffee liquid when the water pump unit is stopped working.

Preferably, the powder extraction container further comprises a transition container which comprises an enclosing wall connected to the cover body and the backflow prevention layer connected to the enclosing wall to define a transition cavity, wherein the backflow prevention layer has a plurality of pores each having a diameter smaller than a diameter of the inlet of the top engaging portion.

Preferably, the body portion of the powder extraction container comprises a surrounding portion, a bottom portion, a filtering layer disposed at a bottom of the extraction cavity above the bottom portion to allow liquid coffee to flow into the transferring cup, and a film layer connected to the bottom portion, wherein a flow chamber is formed between the film layer and the filtering layer, wherein the film layer is flexible and is formed with a discharging slit which is shifted between an open state in which the discharging slit is forced to open by an increased pressure in the flow chamber when the water pump unit is working and a closed sate in which the discharging slit is closed to prevent the flow chamber to be communicated to the transferring cup.

Preferably, the top engaging portion has an indented groove, wherein the feeding outlet hole is communicated to the inlet of the top engaging portion through the indented groove, wherein the top engaging portion has a plurality of the inlets arranged in a circumferential direction at a peripheral edge thereof, wherein the housing comprises a resilient protrusion at a bottom side thereof for biasing against the top engaging portion, wherein the feeding outlet hole is provided at a center of the resilient protrusion, wherein the powder extraction container is detachably disposed in the transferring cup, wherein the transferring cup has an central outlet communicated to the extraction cavity.

Preferably, the extraction assembly comprises a capsule extraction container for receiving a coffee capsule, and a powder extraction container for receiving coffee powder, wherein both of the capsule extraction container and the powder extraction container are detachably coupled with the housing and the transferring cup.

Preferably, the capsule extraction container is detachably disposed in the transferring cup, wherein the transferring cup is detachably coupled with the housing by threads.

Preferably, the powder extraction container is detachably disposed in the transferring cup, wherein the transferring cup is detachably coupled with the housing by threads.

Preferably, the portable coffee machine further comprises a cup lid detachably coupled with the water storing cup, wherein the cup lid comprises a lid body and a flexible sealing film connected to the lid body, wherein the flexible sealing film has a slit which is forced to open by increased air pressure in the water storing cup when the heating module heats and boils the water ins aid water storing cup to produce water vapor.

Preferably, the lid body has a plurality of vapor holes, wherein the cup lid further comprises a connecting column connected to the lid body, wherein a cavity is defined between the flexible sealing film and the lid body, wherein the plurality of vapor holes is communicated to the cavity, wherein the connecting column is coupled with the flexible sealing film to define the slit.

DETAILED DESCRIPTION OF THE EMBODIMENT

Figure 1:
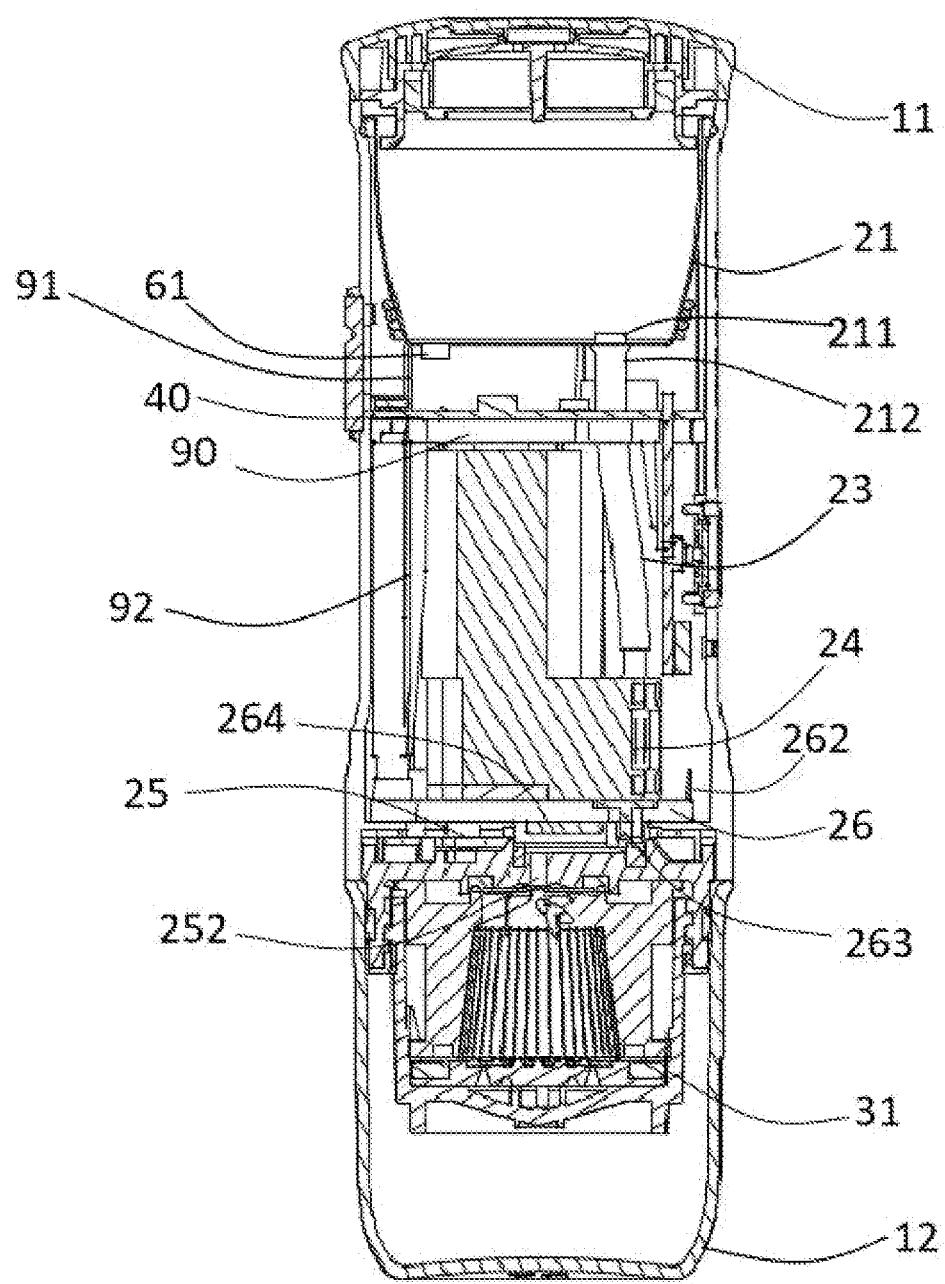
FIG. 1 is a schematic view of the structure of the present invention's portable electric pumping coffee machine.

To make the above objectives, features, and advantages of the present invention more apparent and understandable, a detailed description of specific embodiments of the present invention will be given below in conjunction with the accompanying drawings.

Example 1

Referring to FIGS. 1-11, a portable electric pumping coffee machine is provided. The coffee machine comprises a housing 10, a cup lid 11, a coffee cup 12, a mounting bracket 90, a power module 70, a drainage module 20, an extraction module 30, a controller 40, a drive module 50, and a sensor assembly 60. The controller 40 comprises a control module 41. The drainage module 20 comprises a water storing cup 21, a water pump 22, a conduit 23, a drainage assembly 24, a fixing base 25, and a limiting frame 26. The fixing base 25 is connected to the limiting frame 26, which comprises a fixing projection 262 for fixing the drainage assembly 24. The water storing cup 21 is used for receiving and storing hot water, and the water pump 22 is used to draw water from the drainage module 20 into the extraction module 30. The drainage assembly 24 is connected to the water pump 22 and the conduit 23 to change the direction of water flow. The extraction module 30 comprises a transferring cup 31, a first extraction container 32, and a second extraction container 33. The first extraction container 32 is used for placing coffee powder, and the second extraction container 33 is used for placing a coffee capsule. The transferring cup 31 can be detachably connected to the first extraction container 32 or the second extraction container 33. The control module 41 is used to receive signals from the sensor assembly 60 and send instructions to the drive module 50. The drive module 50 comprises a driving motor 51 for driving the water pump 22 in the drainage module 20. The power module 70 comprises a battery 72 for powering the drive module 50.

One side of the housing 10 is equipped with a button 101 and or or more indicator lights 102. The side of the housing 10 far from button 101 has a charging interface slot, which corresponds to a charging interface on the controller 40. Threaded holes are located at the bottom edge of housing 10 and opening is located near the center at the bottom of housing 10. There is also a through slot extending from the center of the bottom of housing 10 towards the edge. The power module 70, the drainage module 20, the control module 41, the drive module 50, and the sensor assembly 60 are all installed inside housing 10. The mounting bracket 90 is connected to the water cup 21, and at the top of mounting bracket 90 is provided with the controller 40, the control module 41 is a circuit in the controller 40. A plurality of upper fixing arms 91 are located above the mounting bracket 90 to reserve space for the controller 40, while a plurality of lower fixing feet 92 are located below the mounting bracket 90 to engage with the limit frame 26. The sensor assembly 60 comprises a first sensor 61 and a second sensor 62.

Figure 9A:
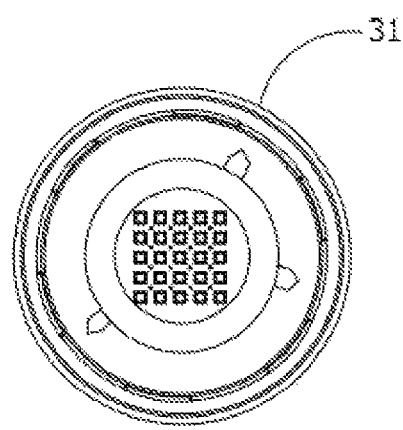
FIG. 9A and FIG. 9B are schematic views of an transferring cup of the portable electric pumping coffee machine of the present invention.
Figure 9B:
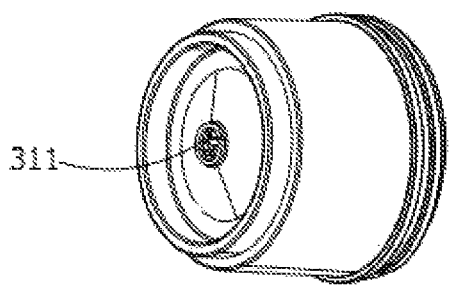
Figure 10:
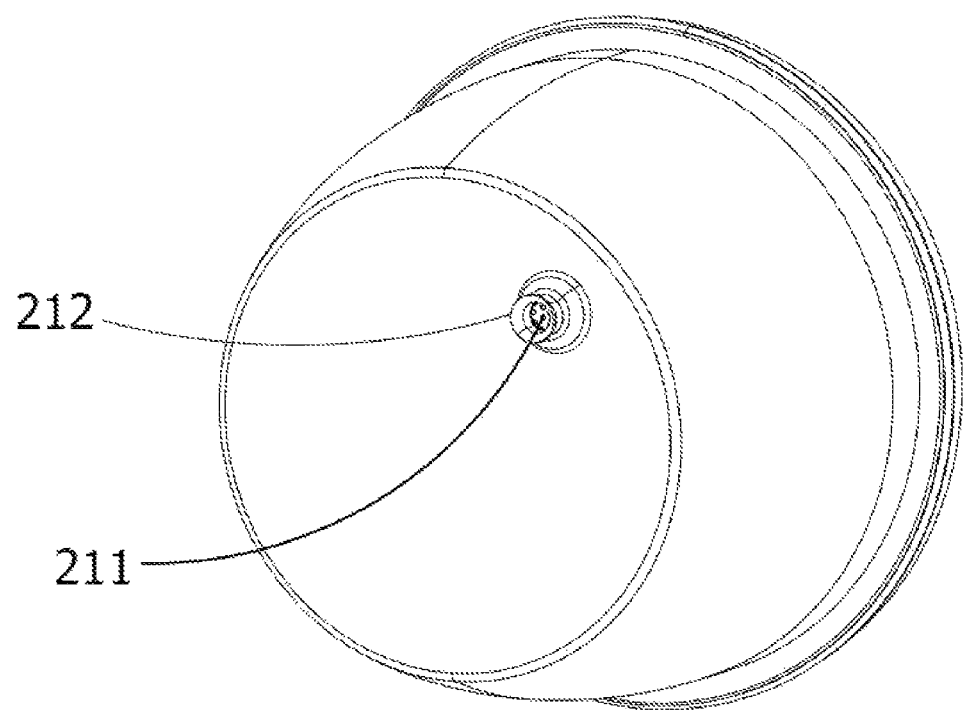
FIG. 10 is a schematic view of a water storing cup of the portable electric pumping coffee machine according to a first embodiment of the present invention.
Figure 11:
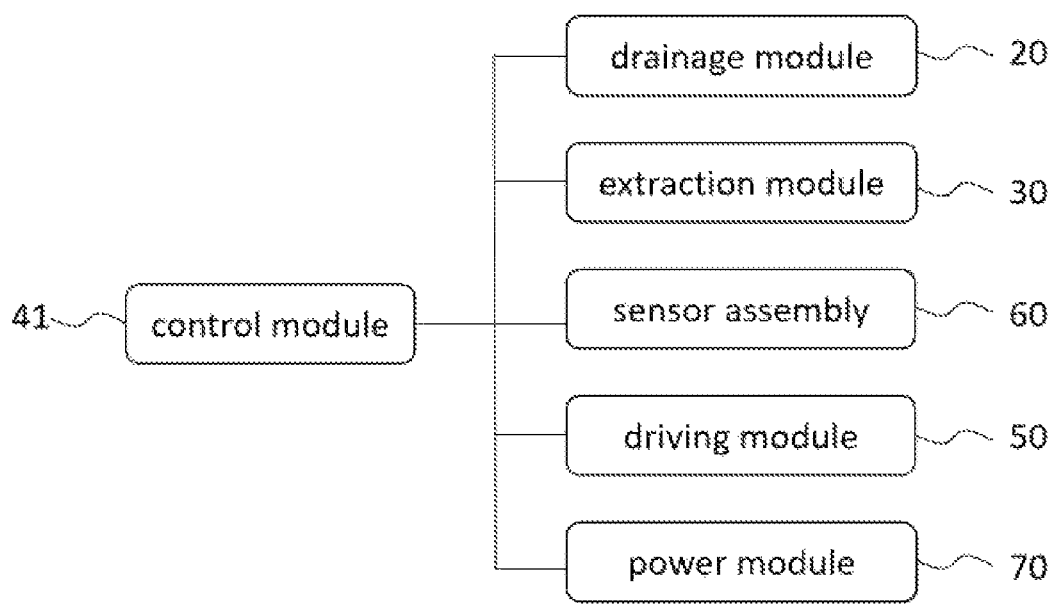
FIG. 11 is a modular composition diagram of the portable electric pumping coffee machine according to the first embodiment of the present invention.
Figure 12:
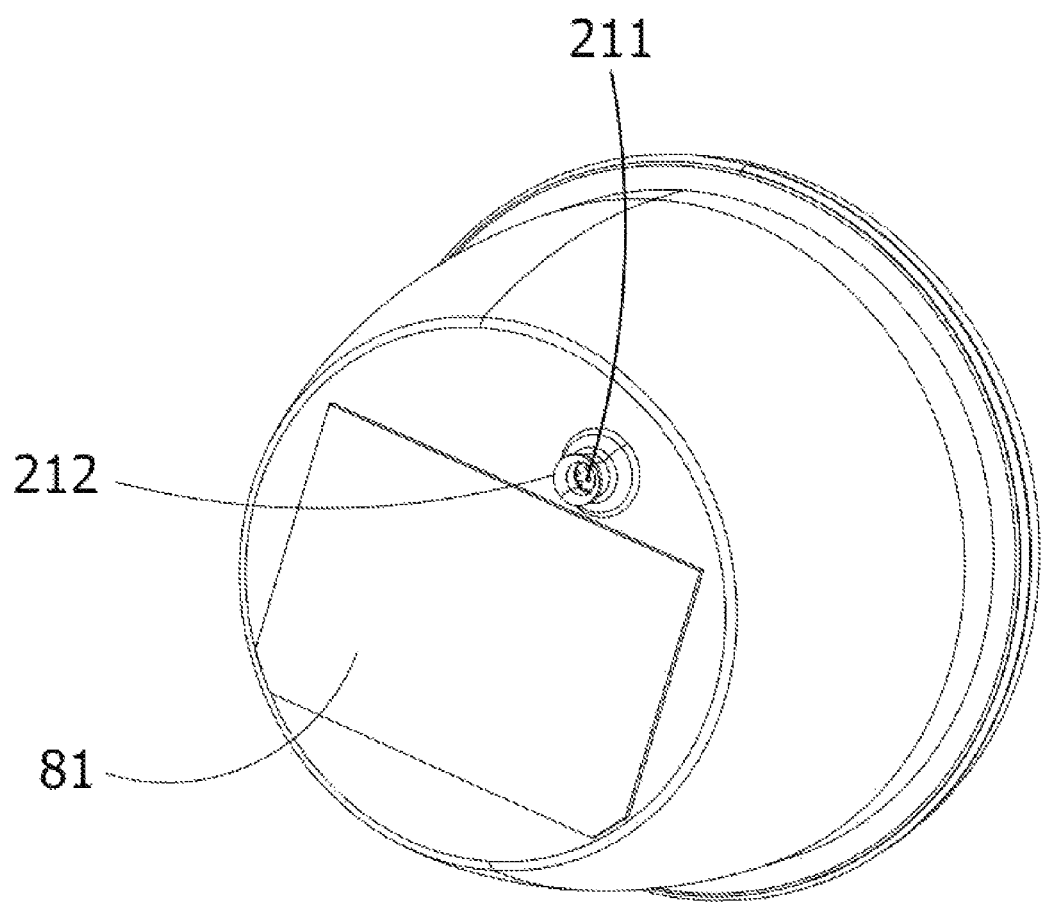
FIG. 12 is a schematic view of the water storing cup of the portable electric pumping coffee machine according to a second embodiment of the present invention.
Figure 13:
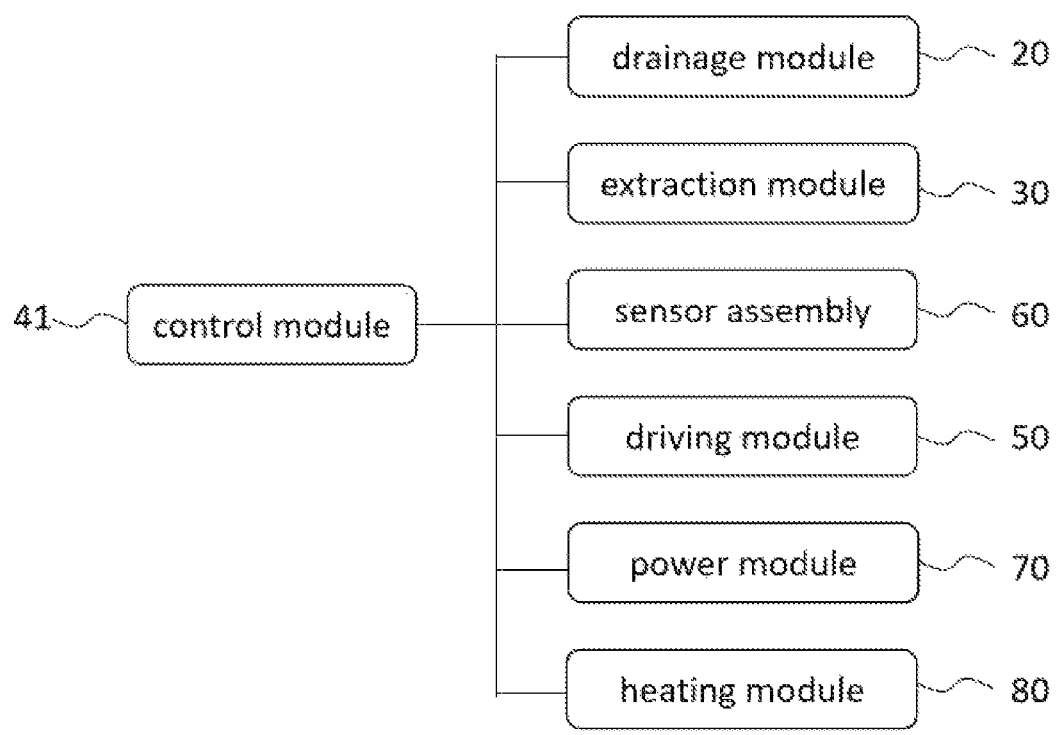
FIG. 13 is a schematic view of the modular composition of the portable electric pumping coffee machine according to the second embodiment of the present invention.
Figure 14:
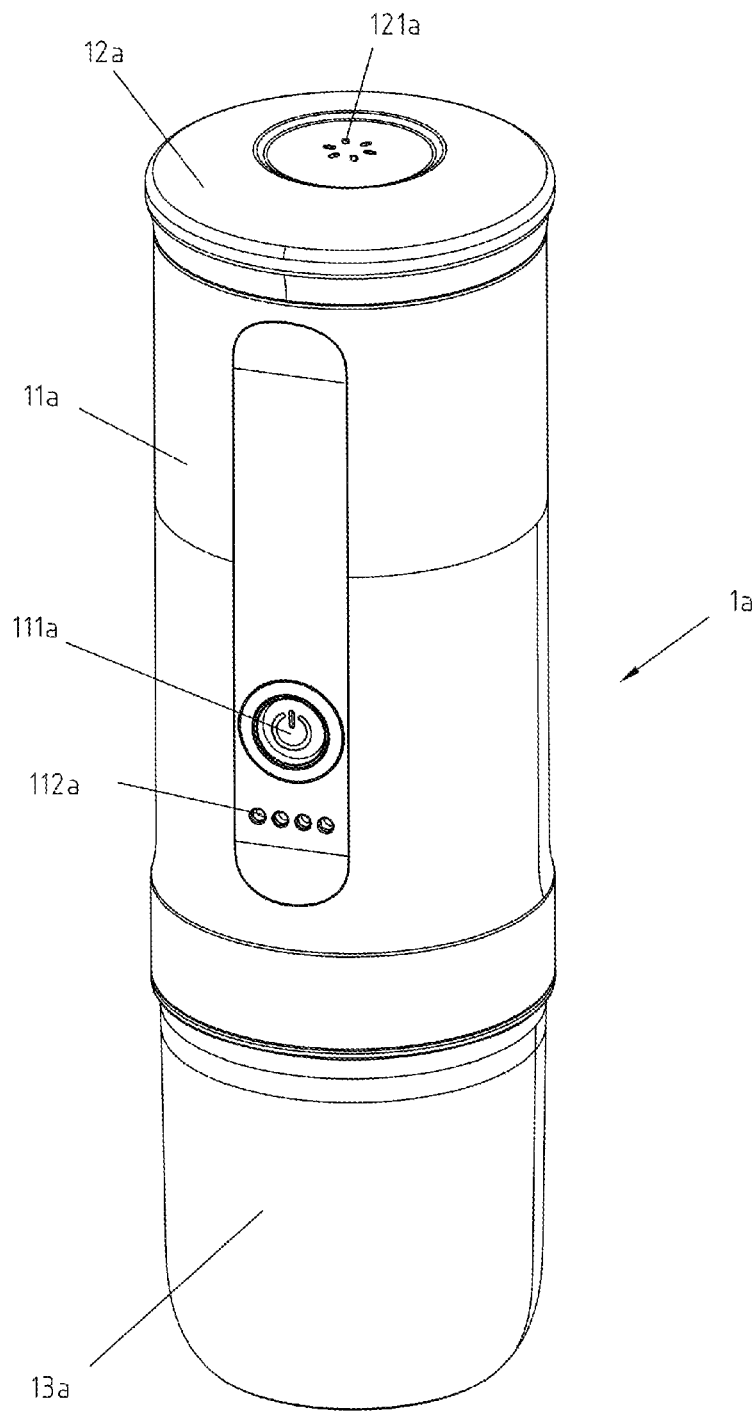
FIG. 14 is a perspective view of a portable coffee machine according to a third embodiment of the present invention.
Figure 15:
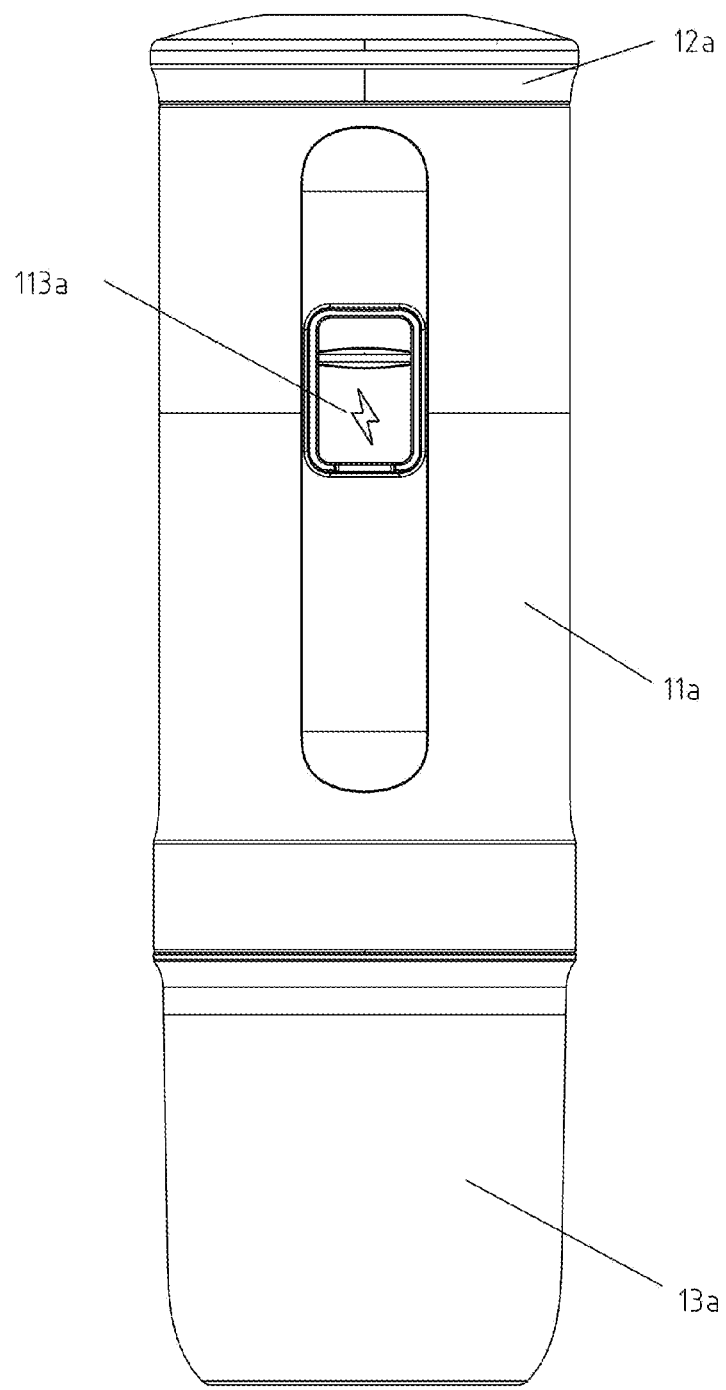
FIG. 15 is a schematic view of a back of the portable coffee machine according to the third embodiment of the present invention.
Figure 16:
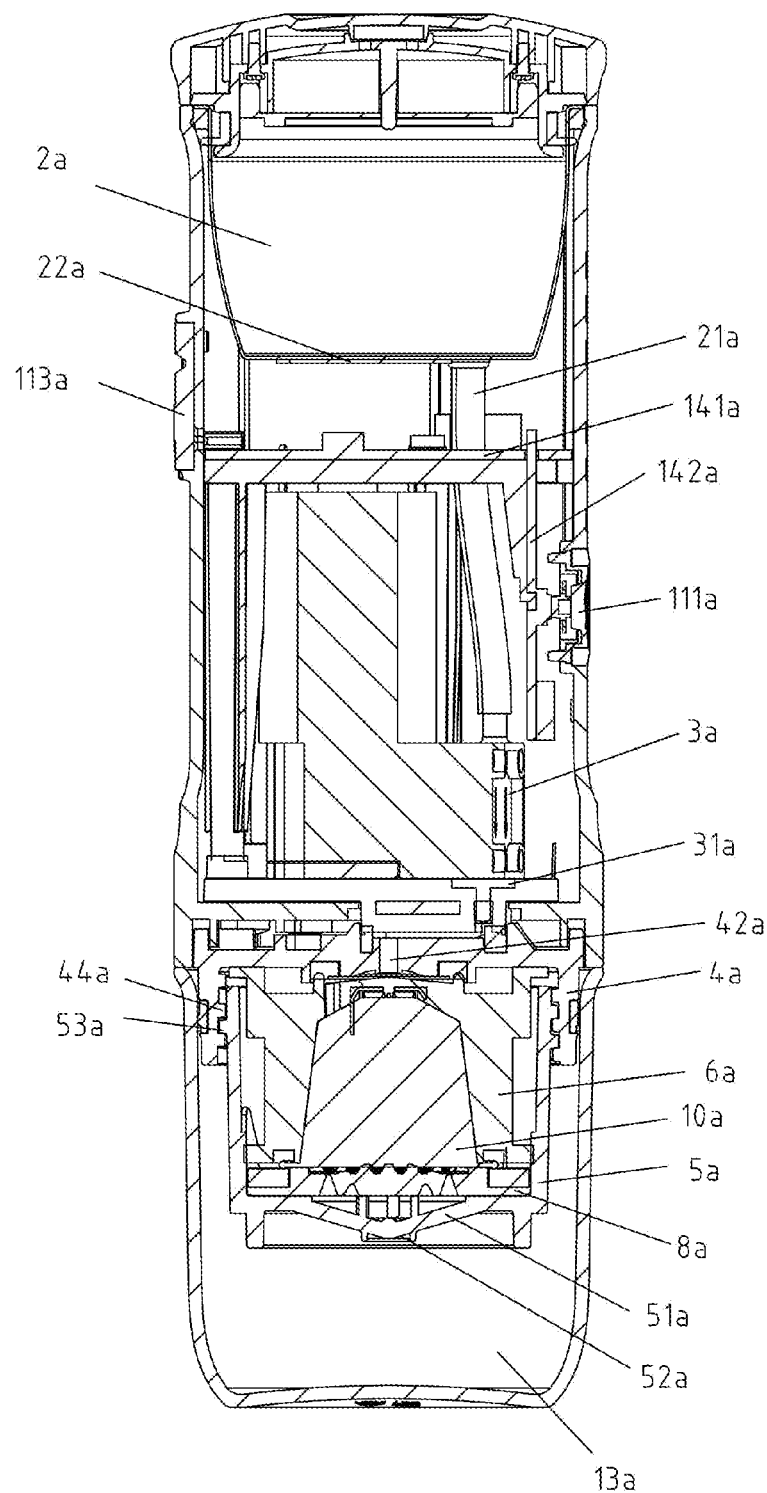
FIG. 16 is a sectional schematic view of the portable coffee machine according to the third embodiment of the present invention.
Figure 17:
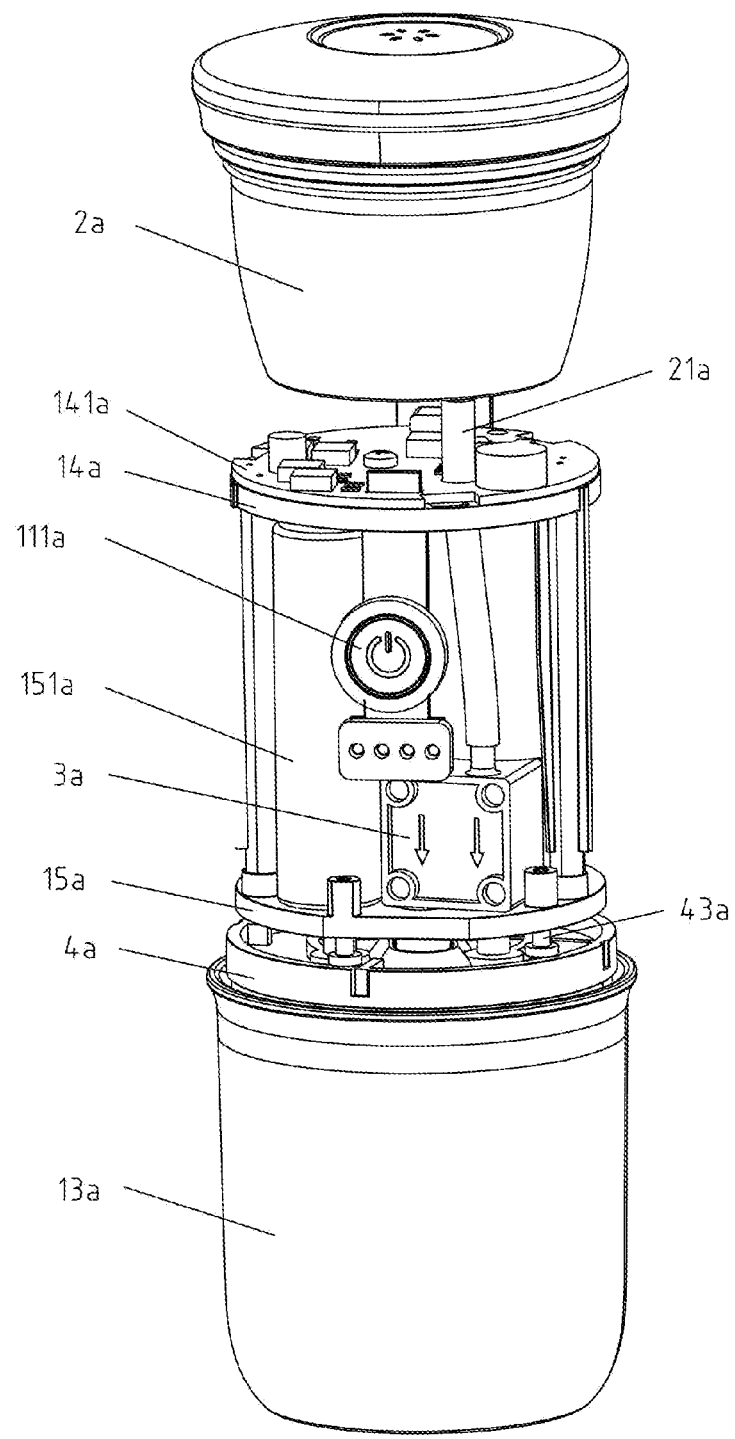
FIG. 17 is a schematic view of an internal structure of the housing of the portable coffee machine according to the third embodiment of the present invention.
Figure 18:
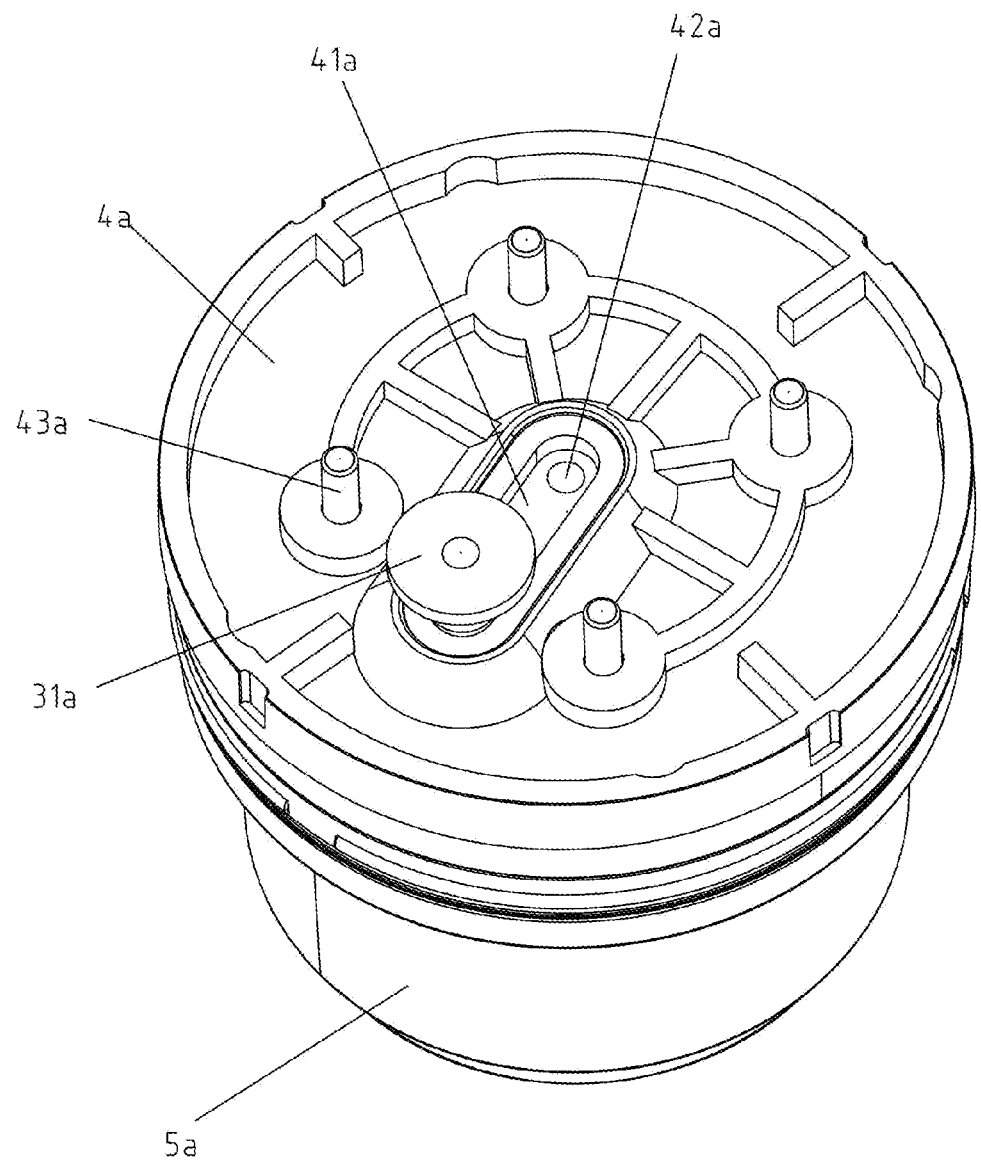
FIG. 18 is a schematic view of a drain sleeve of the portable coffee machine of according to the third embodiment of the present invention.
Figure 19:
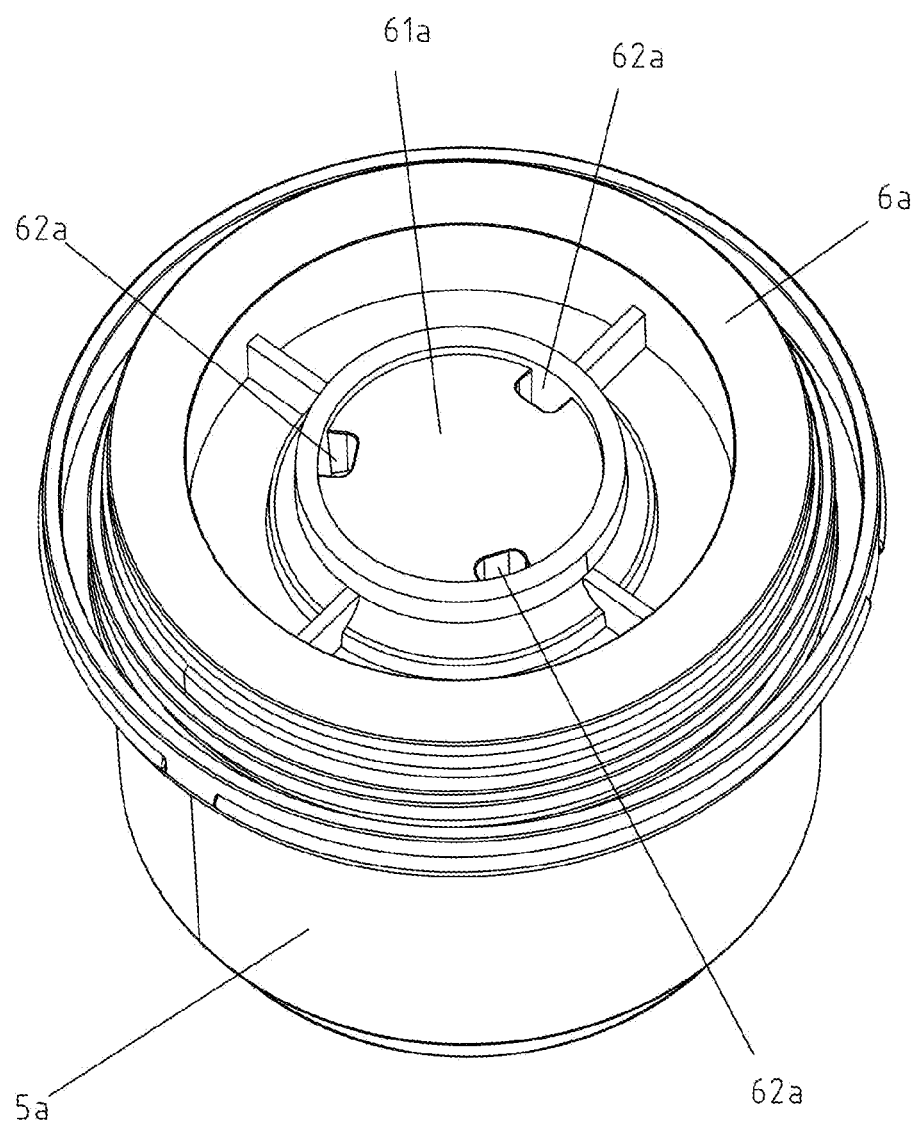
FIG. 19 is a schematic view of the structure of a diversion sleeve of the portable coffee machine according to the third embodiment of the present invention.
Figure 20:
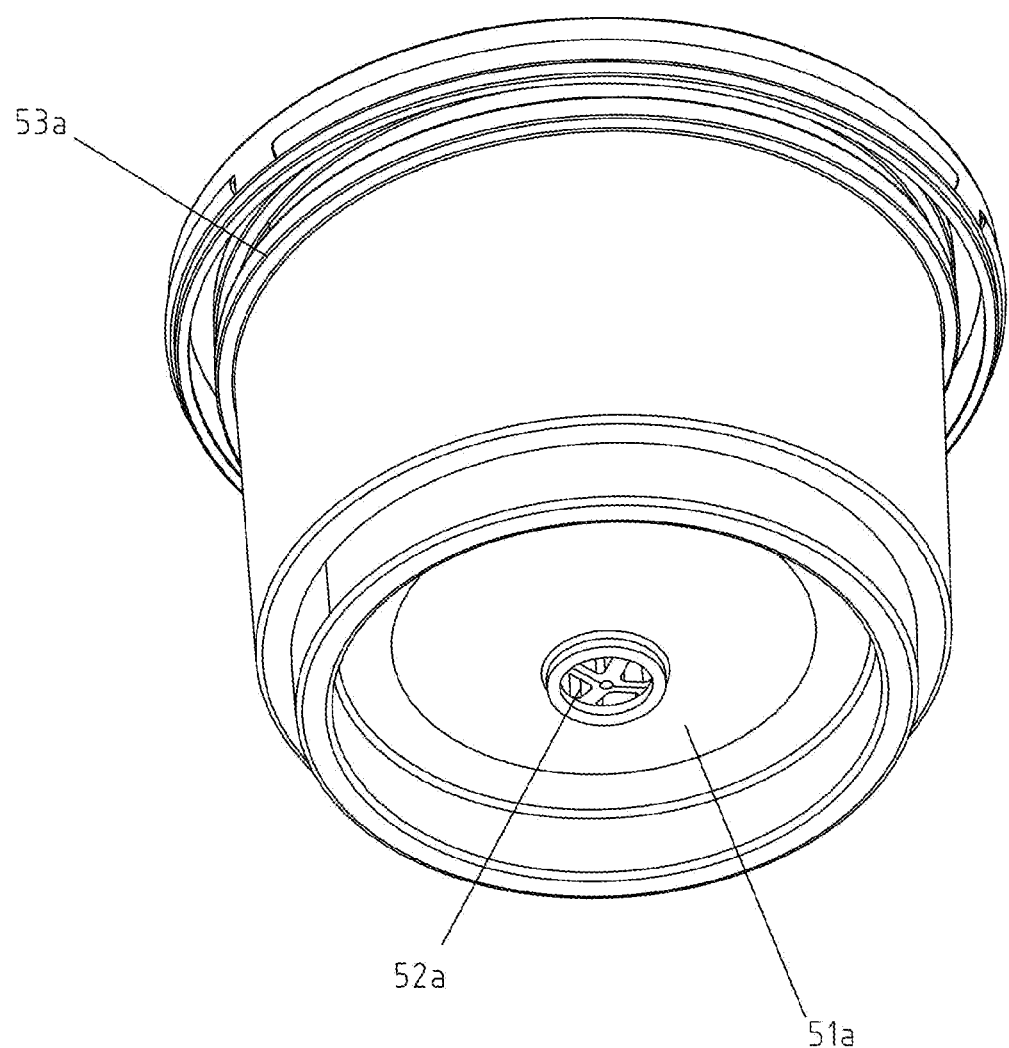
FIG. 20 is a top view of the supporting sleeve of the portable coffee machine according to the third embodiment of the present invention.
Figure 21:
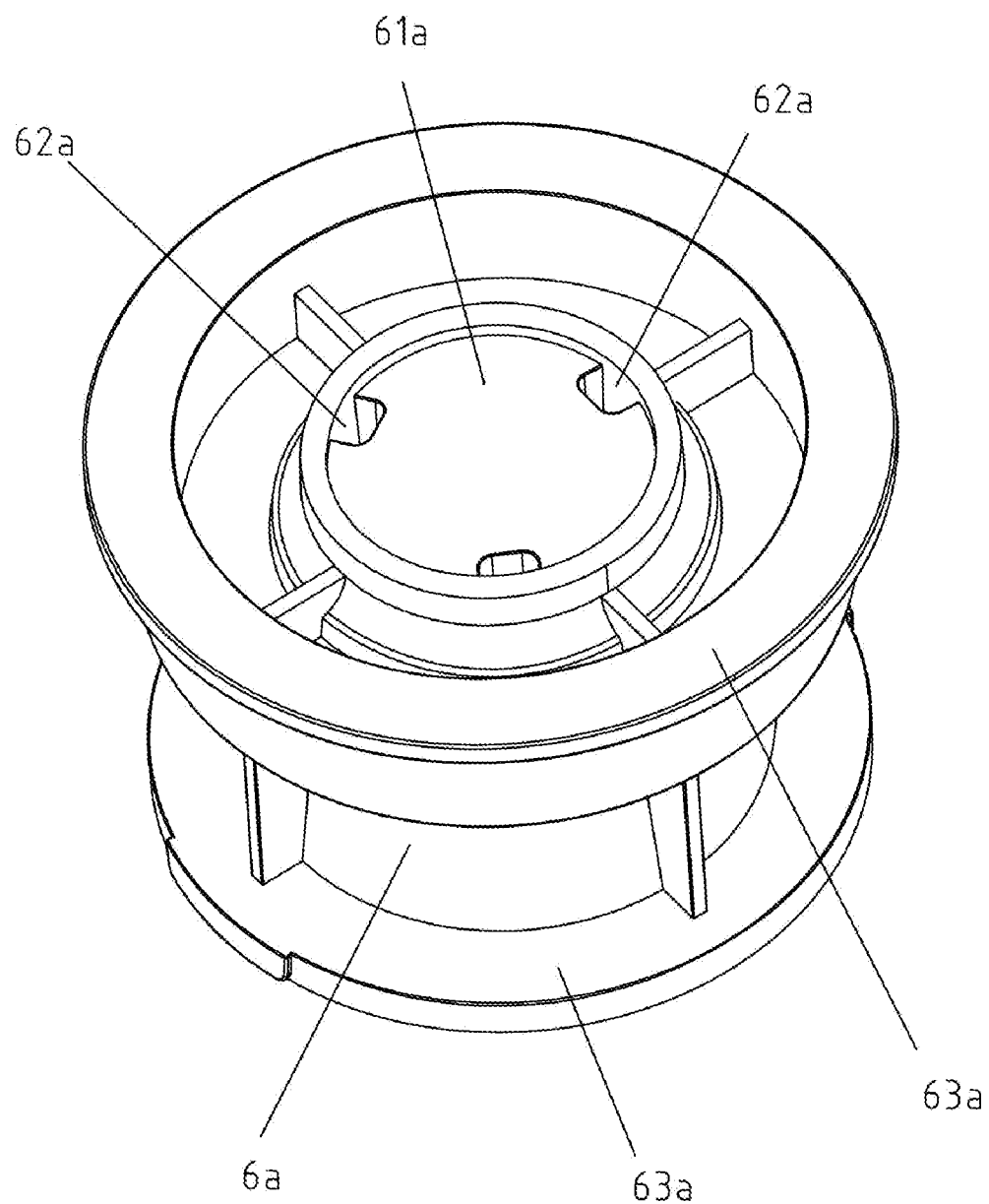
FIG. 21 is a perspective view of the diversion sleeve of the portable coffee machine according to the third embodiment of the present invention.
Figure 22:
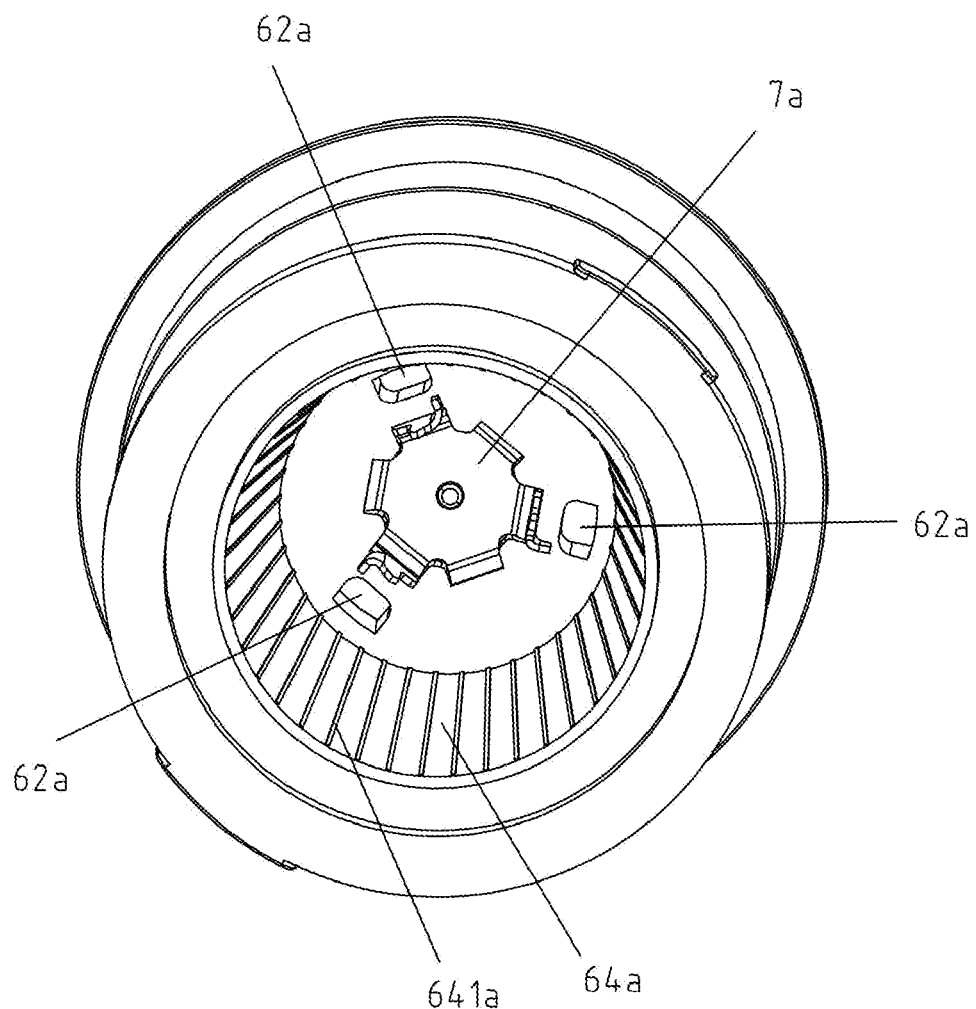
FIG. 22 is a top view of the diversion sleeve of the portable coffee machine according to the third embodiment of the present invention.

As shown in FIG. 1, FIG. 9A and FIG. 9B, the cup lid 11 is connected to the water storing cup 21. A sealing ring is provided at the connection between the outer edge of the cup lid 11 and the water pump 22 to prevent water leakage. The top of the cup lid 11 is provided with an exhaust hole for venting water vapor. The central area of the bottom of the cup lid 11 is equipped with a soft pad which has a plastic protrusion at its center. Small gaps are formed at the interface between the soft pad and the plastic protrusion for water vapor discharge to avoid the influence of water vapor pressure on the cup lid 11 and the water storing cup 21. The water storing cup 21 is located at the top of the housing 10 and is connected to the upper fixed foot 91. Three clipping slots are provided at the bottom periphery of the water storing cup 21, and fixing claws are provided on the upper fixing arms 91. The water storing cup 21 is connected to the fixing claws of the upper fixing arms 91 by the clipping slots, and a sealing ring is provided at the outer edge of the water storing cup 21 to seal the connection between the water storing cup 21 and the housing 10. A peripheral hole 211 is provided at the bottom edge of the water storing cup 21, and the peripheral hole 211 is formed by a plurality of densely distributed small holes. A hollow column 212 is extended vertically outward below the peripheral hole 211 on the outer bottom of the water storing cup 21, and the hollow column 212 is connected to one end of the conduit 23, and the conduit 23 is wrapped on the outer surface of the hollow column 212. The conduit 23 can be a plastic hose. Due to the surface tension and atmospheric pressure of water, this structure can prevent water in the water storing cup 21 from flowing out of the conduit 23 when the water pump 22 is not working.

Figure 7:
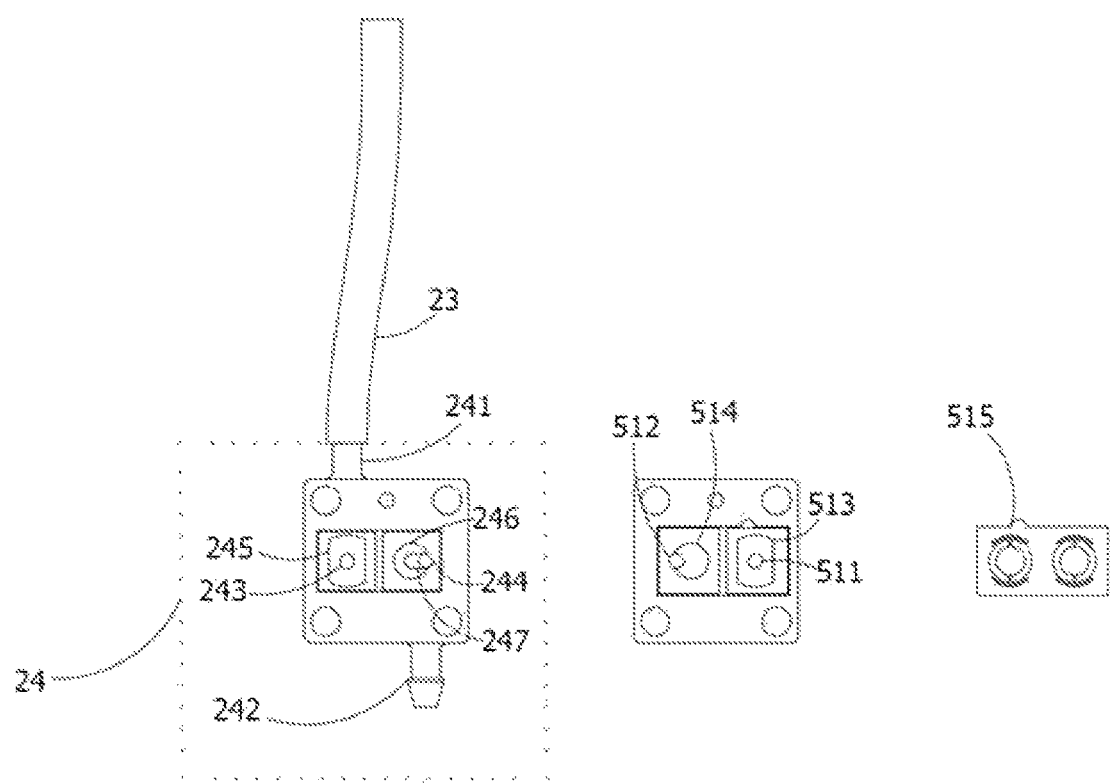
FIG. 7 is a schematic view of the joint of a drainage module and a water pump of the portable electric pumping coffee machine of the present invention.

As shown in FIG. 7, the drainage assembly 24 comprises an inlet end 241, an outlet end 242, a first inlet hole 244, and a first outlet hole 243. The inlet end 241 of the drainage assembly 24 is extended upwardly from the top thereof, and the outlet end 242 is extended downwardly from the bottom of the drainage assembly 24. The inlet end 241 is connected to one end of the conduit 23, and one end of the conduit 23 is wrapped around the outer surface of the inlet end 241. A first cavity is defined below the inlet end 241, and the first cavity is cylindrical in shape and extends downwardly to the first outlet hole 243. A second cavity is arranged below the first inlet hole 244, and the second cavity is cylindrical in shape and is extended downwardly to the outlet end 242. The outer surface of the drainage assembly 24 is provided with a first groove 245, a second groove 246, and a threaded hole. The second groove 246 is deeper than the first groove 245 and is arranged side by side with the first groove 245 to avoid excessive pressure on the drainage assembly or overflow of water due to high water flow rate. The first outlet hole 243 is provided in the first groove 245 which is hexagonal in shape, and is centered in the first groove 245. The first inlet hole 244 is provided in the second groove 246 which is circular in shape and is located on one side of the circular edge of the groove away from the center. A sloping groove 247 is also provided in the second groove 246 to facilitate water flow into the first inlet hole 244 and avoid water overflow.

On one side of the water pump 22, there is a threaded hole, a third groove 513 and a fourth groove 514, wherein the third groove 513 and the fourth groove 514 are arranged side by side. The third groove 513 is hexagonal, and the fourth groove 514 is circular. Compared to the third groove 513, the mouth of the fourth groove 514 is deeper and can avoid water overflow. The second water outlet hole 511 is provided in the third groove 513 at the center of the third groove 513, and the second water inlet hole 512 is provided in the fourth groove 514 on one side of the circumference away from the center of the circle.

In the drainage assembly 24, one side of the first groove 245 and the second groove 246 is coupled to one side of the third groove 513 and the fourth groove 514 in the water pump 22 by thread connection. The first groove 245 is connected to the fourth groove 514, and the second groove 246 is connected to the third groove 513. The first water outlet hole 243 corresponds to the center of the fourth groove 514, and the water flows into the center of the fourth groove 514 from the first water outlet hole 243 and then flows into the second water inlet hole 512. The water flows into the center of the second groove 246 from the second water outlet hole 511, and then flows along the inclined groove 247 into the first water inlet hole 244. A waterproof gasket 515 is provided between the joint surface of the drainage assembly 24 and the water pump 22 to prevent water from overflowing. The water flows into the water inlet end 241 through the conduit 23, flows out from the first water outlet hole 243 along the first cavity, flows into the second water inlet hole 512 and enters the water pump 22. After pressurization by the water pump 22, the water flows out from the second water outlet hole 511 and then flows into the first water inlet hole 244, and flows out from the outlet end 242 along the second cavity. At this time, the position of the water flow is laterally offset.

As shown in FIG. 1, the limiting frame 26 is connected to the drainage assembly 24. The first through hole 263 is provided at the edge of the upper surface of the limiting frame 26, and the outlet end 242 extends into the first through hole 263. The limiting frame 26 is provided with a raised threaded hole on the upper surface, and the bottom of the housing 10 is provided with a threaded hole. The limiting frame 26 is connected to the bottom of the housing 10 through a thread. The limiting frame 26 is provided with a short protrusion 262 for limiting the drainage assembly 24. A raised block 264 extends from the first through hole 263 on the lower surface of the limiting frame 26 toward the center of the limiting frame 26, and a threaded hole is provided on the lower surface of the limiting frame 26.

Figure 5:
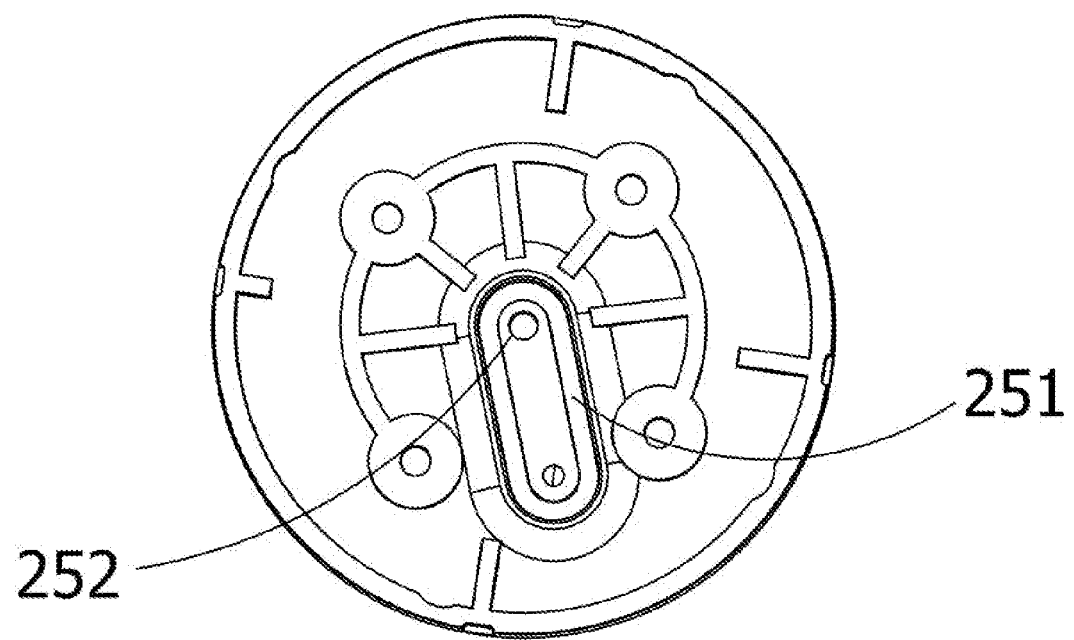
FIG. 5 is a schematic view of the fixing base of the portable electric pumping coffee machine of the present invention.

As shown in FIG. 5, the fixing base 25 is located below the bottom of the housing 10, and a connector block is provided on the fixing base 25, while a connector slot is provided at the bottom of the housing 10, wherein the fixing base 25 is clipped and connected to the housing 10, and a sealing gasket is provided in the central area of the fixing base 25. The bottom of the fixing base 25 is provided with a threaded hole, which corresponds to an opening at the bottom of the housing 10. The limiting frame 26 above the bottom of the housing 10 is connected to the fixing base 25 through a threaded connection through an opening at the bottom of the housing 10. Beneath the protruding block 264 of the limiting frame 26, the fixing base 25 is arranged to align with the fifth groove 251, and the edge of the protruding block 264 passes through the penetrating groove at the bottom of the housing 10 and is fitted to the edge of the fifth groove 251. The center position of the fixing base 25 in the fifth groove 251 is provided with a second through hole 252. Water flows into the fifth groove 251 from the first through hole 263 at the water outlet 242, and then flows out of the fifth groove 251 through the second through hole 252. A sealing ring is provided around the edge of the fifth groove 251 to prevent the leakage of water.

Figure 8A:
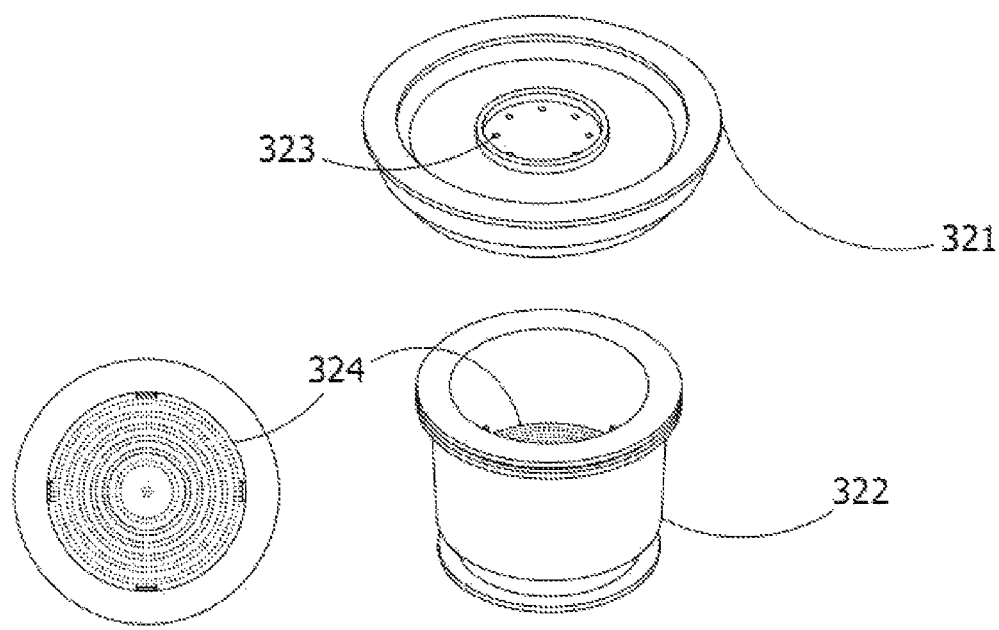
FIG. 8A and FIG. 8B are schematic views of the structure of a first extraction container of the portable electric pumping coffee machine of the present invention.
Figure 8B:
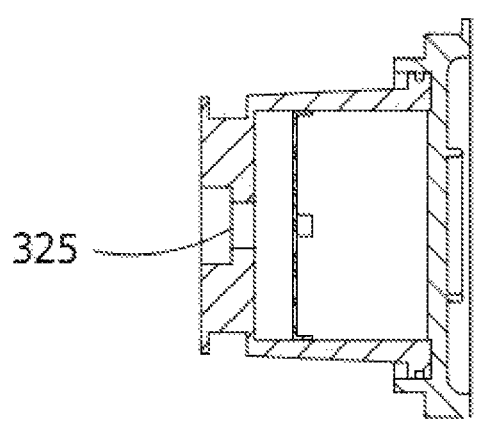

As shown in FIG. 8A and FIG. 8B, the first extraction container 32 comprises a cover body 321 and a container body 322 for extracting coffee powder. The top of the cover body 321 is provided with a third through hole 323 arranged in a ring shape, which can allow the water to flow in and form a circulation to fully extract the coffee powder. The bottom of the container body 322 is provided with a filtering layer 324 made of metal material, and the edge of the filtering layer 324 is provided with a plurality of upward extending buckles for convenient disassembly and cleaning. A one-way valve 325 is provided at the center of the outer bottom of the container body 322 to prevent the reflux of coffee liquid caused by high pressure after the water pump 22 stops running. After the water flows out from the second through hole 252, it flows into the third through hole 323 on the top of the cover body 321, and then enters the container body 322 through the third through hole 323. When the water pump 22 starts in operation, a pressure difference is formed near the water pump 22 due to the centrifugal force, and the water flow is sucked into the guide tube 23 and enters the drainage assembly 24. The pressurized water flow can open the one-way valve 325, and after passing through the filtering layer 324, the water flow flows out from the one-way valve 325. The filtering layer 324 contains a plurality of densely arranged small holes in a ring shape, which can form a circulation when the coffee liquid passes through, further increasing the pressure and facilitating the water flow to open the one-way valve 325.

Figure 6:
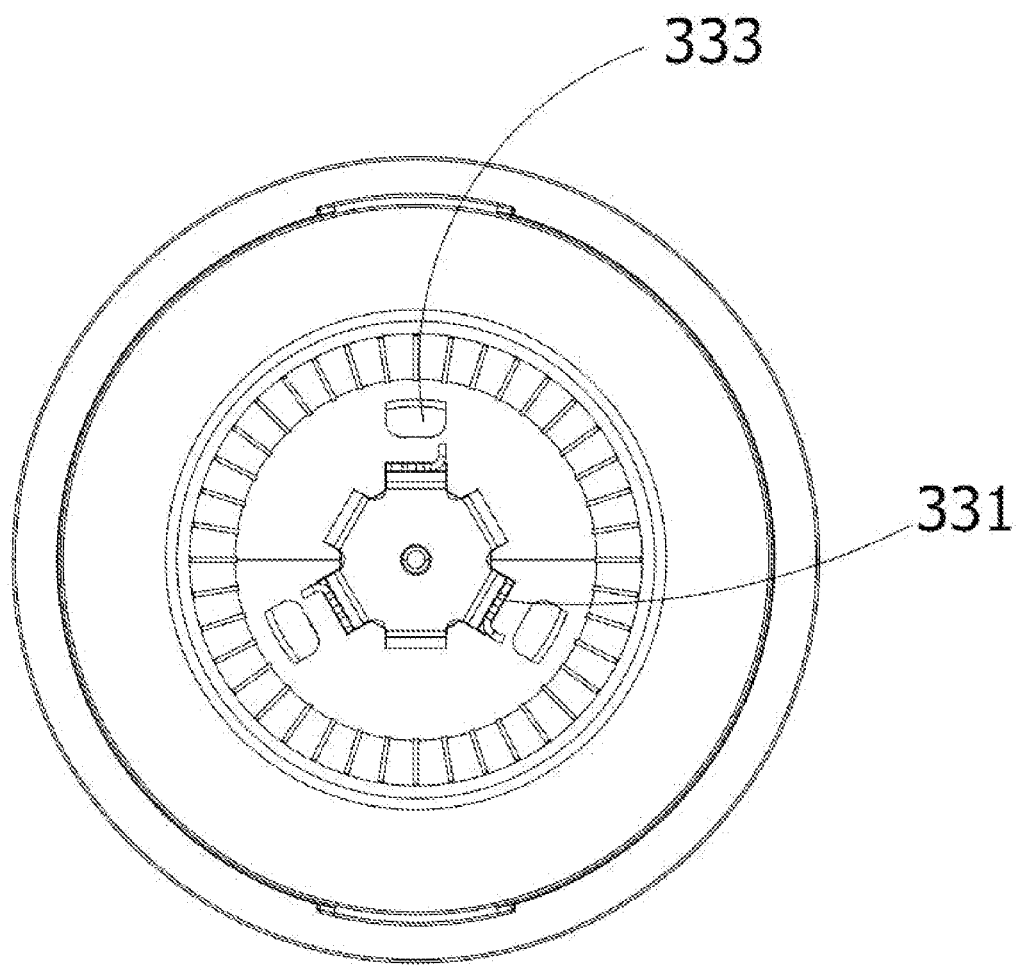
FIG. 6 is a schematic view of the structure of a second extraction container of the invention's portable electric pumping coffee machine.

As shown in FIG. 6, there is a hexagonal groove in the center of the bottom of the second extraction container 33, and there are a plurality of extraction blades 331 extending upward at the edge of the hexagonal groove. The outer wall of the second extraction container 33 is equipped with a fitting slot, and the inner wall of the second extraction container 33 is equipped with threads. The coffee capsule can rotate into the second extraction container 33, which is convenient for the extraction blades 331 to puncture the bottom of the coffee capsule. There is a fourth through hole 333 near the edge of the bottom of the second extraction container 33 where it is close to the extraction blade 331. Each extraction blade 331 is arranged at a position corresponding to a fourth through hole 333, and water flows in from the fourth through holes 333 so as to flow into the coffee capsule and extract the coffee in the coffee capsule. The extraction blades 331 are bent towards the direction of the fourth through holes 333 at the side, so that the water flow from the fourth through hole 333 fully flows into the coffee capsule along the extraction blades 331.

As shown in FIG. 9A and FIG. 9B, there is a plurality of protrusions arranged in a square array on the bottom center circular area of the transferring cup 31. The protrusions on the bottom of the transferring cup 31 can reserve the space required for the film expansion, make the film easier to be punctured, and adapt to the shape of the film on top of some models of coffee capsules. There are small holes between the protrusions, located in the center of the adjacent four protrusions. a plurality of clipping blocks is provided near the bottom of the inner wall of the transferring cup 31. A first extraction container 32 can be placed inside the transferring cup 31. The first extraction container 32 is filled with coffee powder. After extraction, the extracted coffee flows out through the small holes at the bottom of the transferring cup 31 and gathers along the inclined grooves to the transferring cup outlet 311, then flows out of the transferring cup 31. A second extraction container 33 can also be placed inside the transferring cup 31. The second extraction container 33 is filled with the coffee capsule. The clipping slots of the second extraction container 33 can be matched with the clipping blocks of the transferring cup 31 to limit the rotation of the second extraction container 33 in the transferring cup 31. During the extraction process, water flows into the coffee capsule and can flow along the extraction blades 331 to extract the coffee. When the internal pressure of the coffee capsule reaches a threshold, the coffee liquid punctures the film on top of the coffee capsule and flows out of the transferring cup 31 through the small holes. Then it flows into the coffee cup 12, which is connected to the fixing base 25, and the transferring cup 31 is provided in the coffee cup 12.

Figure 2:
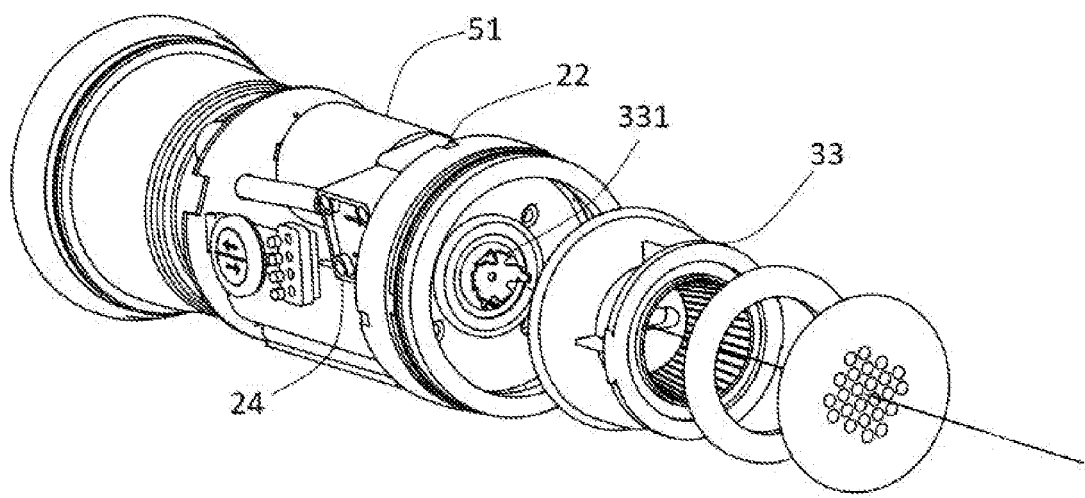
FIG. 2 is an exploded view of the portable electric pumping coffee machine of the present invention.
Figure 3:
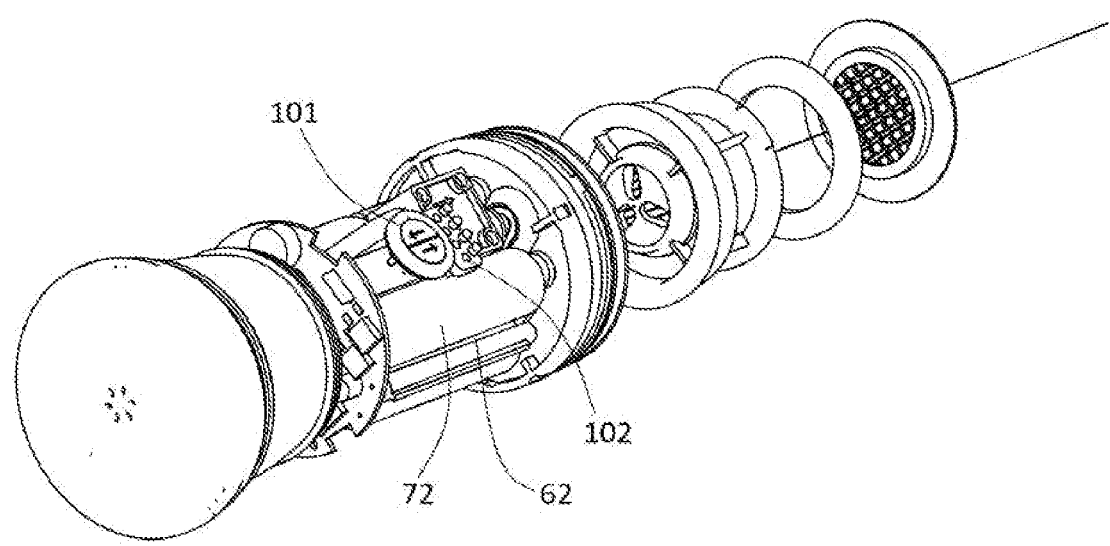
FIG. 3 is another exploded view of the portable electric pumping coffee machine according to the present invention.
Figure 4:
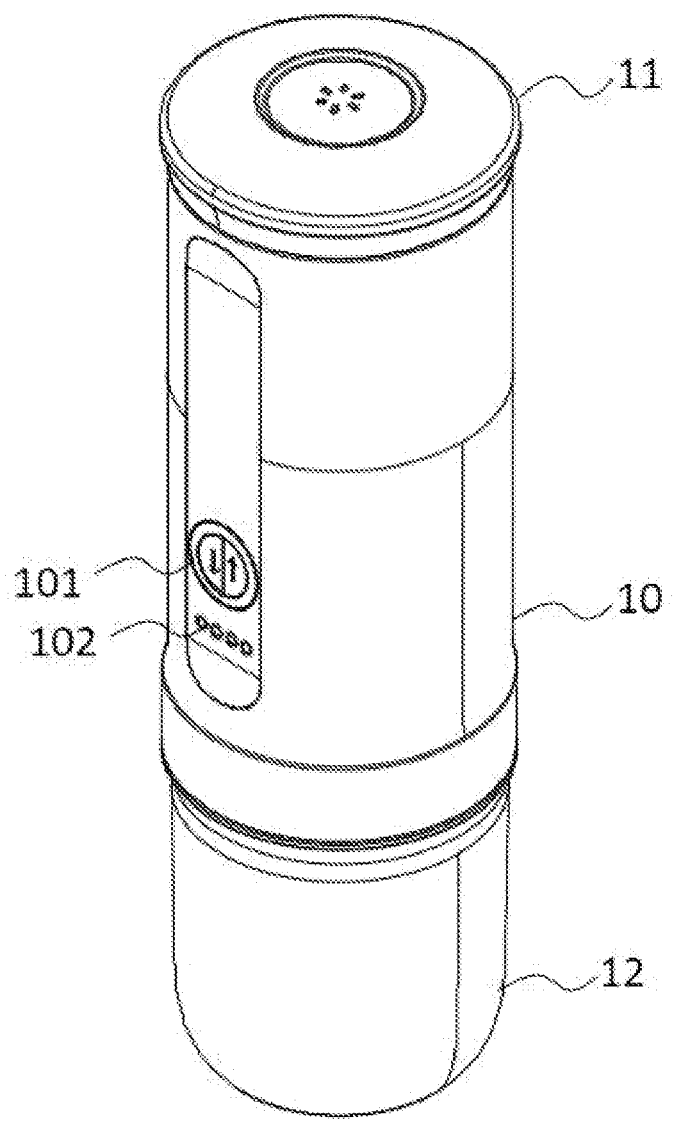
FIG. 4 is a side view of the portable electric pumping coffee machine of the present invention.

As shown in FIGS. 2-3, the first sensor 61 is located at the bottom of the water storing cup 21, and the second sensor 62 is located on the battery 72. The first sensor 61 and the second sensor 62 can be temperature sensors. The first sensor 61 is used to measure the water temperature in the water storing cup 21, and the second temperature sensor 62 is used to measure the temperature of the battery 72. When the first sensor 61 detects that the water temperature in the water storing cup 21 is 20° C.-40° C., it sends a sensing signal to the control module 41. The control module 41 sends an instruction to the indicator light 102, and one indicator light 102 lights up. When the first sensor 61 detects that the water temperature in the water storing cup 21 is 41° C.-60° C., it sends a sensing signal to the control module 41. The control module 41 sends an instruction to the indicator light 102, and two indicator lights 102 light up. When the first sensor 61 detects that the water temperature in the water storing cup 21 is 61° C.-80° C., it sends a sensing signal to the control module 41. The control module 41 sends an instruction to the indicator light 102, and three indicator lights 102 light up. When the first sensor 61 detects that the water temperature in the water storing cup 21 is 81° C.-96° C., it sends a sensing signal to the control module 41. The control module 41 sends an instruction to the indicator light 102, and four indicator lights 102 light up. When the second sensor 62 detects that the temperature of the battery 72 is greater than the preset value, it sends a sensing signal to the control module 41. The control module 41 sends an instruction to the buzzer on the controller 40 to make the buzzer beep, and at the same time, the control module 41 cuts off the power to avoid the battery 72 from overheating, where the controller can be used.

After the button 101 is continuously pressed for to seconds, the water pump 22 runs. When the water pump 22 runs, the water in the water storing cup 21 flows into the drainage assembly 24 along the conduit 23, flows out of the drainage assembly 24 after being pressurized by the water pump 22, and flows into the first extraction container 32 or the second extraction container 33 for extraction after passing through the limiting frame 26 and the fixing base 25, and then flows into the liquid cup 12 through the transferring cup 31. $T_o$ can be 1-3 seconds.

When the first sensor 61 detects that the water temperature within the water storing cup 21 exceeds the preset value $T_1$, it sends a sensing signal to the control module 41. The control module 41 sends instructions to the buzzer, which beeps to indicate that hot water is inside the water storing cup 21. At the same time, the control module 41 sends instructions to drive the water pump 22 through the driving motor 51. $T_1$ can 70° C.-100° C., or 80° C.-96° C.

Example 2

Referring to FIGS. 1-9 and FIGS. 12-13, the difference from the first Embodiment is that the portable coffee machine further comprises a heating module 80. The heating module 80 comprises a heating member 81 which is a heating plate, which may be a ceramic heating plate or a silicone heating plate. The heating member 81 is located at the bottom of the water storing cup 21. When the button 101 on the housing 10 is continuously pressed for a duration $t_1$ of several seconds, the control module 41 sends an instruction to the buzzer, and the buzzer emits a beep. At the same time, the control module 41 sends an instruction to the heating module 80 to heat and boil the water in the water storing cup 21 by the heating member 81. When the first sensor 61 detects that the temperature is higher than the provided value $T_1$, it sends a sensing signal to the control module 41. The control module 41 sends an instruction to the buzzer to beep, indicating that the water in the water storing cup 21 has been heated. The control module 41 then sends an instruction to the heating module 80 to stop working and an instruction to the driving motor 51 to drive the water pump 22. $T_1$ can 70° C.-100° C., or 80° C.-96° C., the duration $t_1$ may be 2-5 seconds, or otherwise as desired.

Example 3

As shown in FIGS. 14 to 17, the present invention discloses a heating assembly in the third embodiment which is applied in a portable coffee machine, the heating assembly comprises a heating cup 2a. The heating cup 2a is connected with a water pipe 21a. The heating element is arranged on the outer surrounding wall or the bottom of the heating cup 2a to heat and boil the water in the heating cup 2a. The water pipe 21a is arranged on the outer side of the bottom of the heating cup 2a. The heating element is a heating member 22a which is installed at the bottom of the heating cup 2a.

In this solution, the outlet of the heating cup 2a is located on a peripheral edge thereof, and the water pipe 21a of the heating cup 2a is connected to the edge of the heating cup 2a. This provides an installation area for the heating member 22a at the bottom of the heating cup, avoiding the water pipe 21a from passing through the heating member which is a heating plate. It can ensure the heating efficiency, avoid damage to the water pipe 21a, and reduce production costs.

The present invention discloses another solution for a heating component in one of its alternative embodiment, wherein the heating member is positioned at the bottom of the heating cup 2a, and the water pipe 21a is located at the center of the bottom of the heating cup 2a, and passes through the heating device.

Another embodiment of the present invention discloses an another heating solution, in which the heating device is a heating tube that is wound around the outer wall and bottom of the heating cup 2a. Space is left in the heating tube for the water pipe 21a to pass through.

Another alternative mode of the present invention discloses a heating member 22a which comprises a surrounding covering wall covered on the outer wall and the bottom of the heating cup 2a. Additionally, a hole is provided at a bottom of the heating member 22a for the water pipe 21a to pass through when the heating member 22a is extended to the bottom of the heating cup 2a. Alternatively, the heating member 22a may be only attached to the outer surrounding wall of the heating cup 2a.

As shown in FIGS. 14 to 22, the present invention discloses a portable coffee machine comprising the a machine main body 1a, wherein the machine main body 1a employs the heating assembly as disclosed.

The machine main body 1a, from top to bottom, comprises a top cover 12a, a housing 11a and a coffee cup 13a. The heating cup is located between the housing 11a and the top cover 12a. The brewing mechanism is located at the bottom of the housing 11a and between the coffee cup 13a.

The housing 11a is provided with an upper supporting plate 14a and a lower supporting plate 15a. The water pump 3a is installed on the lower supporting plate 15a, and the drain sleeve 4a is installed below it. The water pump 3a is connected to the heating cup 2a through the water pipe 21a.

The brewing mechanism comprises a water pump 3a, a drain sleeve 4a, a supporting sleeve 5a, and a diversion sleeve 6a. The drain sleeve 4a is threaded to connect with the supporting sleeve 5a. The diversion sleeve 6a is provided between the supporting sleeve 5a and the drain sleeve 4a. The coffee capsule 10a is installed inside the diversion sleeve 6a. The coffee cup 13a is then placed at the drain sleeve 4a and can be sealed with either a snap-fit or threaded connection.

During the brewing process, the water pump 3a draws water from the heating cup and pressurizes it to pass through drain sleeve 4a and diversion sleeve 6a, and the water acts on the coffee capsule 10a to achieve brewing, then the coffee liquid passes through the coffee outlet hole 52a of the supporting sleeve 5a and finally flows into the coffee cup 13a.

An electric battery 151a is placed in the space between the lower supporting plate 15a and the upper supporting plate 14a to provide power supply to this device.

On the upper supporting plate 14a, there is a control circuit board 141a installed, which is connected to a vertical sub-board 142a. The sub-board 142a has a control button 111a and an indicator light 112a below it. The housing 11a also has a charging port 113A, which is connected to the circuit board 141a installed on the upper supporting plate.

At the heating cup 2a, there is also a temperature sensor connected to the circuit board 141a for detecting if the water in heating cup 2a is hot water. After it is determined that it is not hot water, the heating member 22a will begin to work, and when it is determined that the water in the heating cup 2a is hot water, the water pump will be automatically driven to pump the hot water into the coffee capsule 10a.

In addition, to ensure pressure balance and avoid the problem of water not being discharged, there is a breath hole 121a at the top of the top cover 12a of this device, and a one-way valve is installed at the breath hole 121a to prevent water leakage from the heating cup. When the water pump 3a works to suck the water from the heating cup 2a into the drain sleeve 4a and the diversion sleeve 6a, the air pressure inside the heating cup 2a decreases, and air enters through the breath hole 121a to maintain pressure equilibrium.

Because the settings of the water pipe 21a and the heating member 22a are diversified, the device is equipped with the drain sleeve 4a, which is used to correctly guide the hot water to the diversion sleeve 6a. A collection groove 41a is provided on the top surface of the drain sleeve 4a, and a collection hole 42a is arranged at the center. The water pump 3a is provided with an outlet 31a, which is aligned with the collection groove 41a below the outlet 31a.

The drain sleeve 4a is provided with several connecting pins 43a, and is fixedly installed at the lower supporting plate 15a through the connecting pins 43a.

The purpose of the diversion sleeve 6a in this device is to evenly disperse the collected hot water, so as to fully act on the coffee powder in the coffee capsule and achieve the purpose of uniform mixing. Therefore, a diversion groove 61a is provided in the middle of the top surface of the diversion sleeve 6a, and a diversion hole 62a is provided on the outer side of the diversion groove 61a. The capsule compartment 64a is installed inside the diversion sleeve 6a, and one or more breaking blades 7a are installed on the top of the capsule compartment 64a. The breaking blade 7a is used to cut open the outer wall of the coffee capsule 10a, so that the water flowing down from the diversion hole 62a can fully mix with the coffee powder.

The diversion sleeve 6a is equipped with flanges 63a on both sides, and can be firmly retained between the supporting sleeve 5a and the drain sleeve 4a by the flanges 63a.

The inner wall of the capsule compartment 64a is provided with several protrusion strips 641a, which provide sufficient friction to prevent the coffee capsule 10a from slipping and provide guidance for the water flow.

The supporting sleeve 5a is equipped with a guide cone surface 51a at the bottom, and a coffee outlet hole 52a is provided at the convergence of the guide cone surface 51a. The bottom plate 8a is placed inside the supporting sleeve 5a, with several protrusions on the bottom plate 8a to hold the coffee capsule 10a, and several spikes are also provided on the bottom plate 8a.

The supporting sleeve 5a is provided with an external thread 53a, and the drain sleeve 4a is provided with an internal threaded portion 44a, and they are connected and installed through the threads.

Example 4

As shown in FIGS. 23 to 34, a portable coffee machine according to a fourth embodiment of the present invention is illustrated, the portable coffee machine 100 comprises a machine body 110, a transferring cup 120 detachably coupled to the machine body 110, and a coffee cup 130 detachably coupled to the transferring cup 120 or the machine body 110 for collecting coffee liquid product. The machine body 110 comprises a housing 111, a water storing cup 112 arranged on top of the housing 111 for storing water, a cup lid 113 which is detachably coupled to the water storing cup 112, a heating module 114 for heating and boiling the water in the water storing cup 112, a water pump assembly 115, an extraction container 116 integrated at a bottom of the housing 111 for receiving a coffee capsule, a controller 117 which is electrically connected to the heating module 114 and the water pump assembly 115 for controlling the operations of the heating module 114 and the water pump assembly 115, and a power module 118 for providing the electric power to the controller 117, the heating module 114 and the water pump assembly 115.

The transferring cup 120 is detachably coupled to the extraction container 116 for storing the coffee capsule between the extraction container 116 and the transferring cup 120, so that water in the water storing cup 112 is boiled by the heating module 114 and pumped into the extraction container 116 by the water pump assembly 115, so as to extract coffee in the coffee capsule, and finally coffee liquid product is harvested in the coffee cup 130 below the transferring cup 120.

The water storing cup 112 is made of a thermal conductive material, such as stainless steel, and has a water storing cavity 1120 for storing water. The water storing cup 112 is mounted at the top of the housing 111 within the housing 111, and the cup lid 113 can be disposed above the water storing cup 112 to seal the water in the water storing cavity 1120.

As show in FIGS. 24-25 and 28-29 of the drawings, the housing 111 is preferably embodied as a cylindrical structure, and a top circumferential edge portion of the water storing cup 112 is attached to a top circumferential edge portion of the housing 111 by a suitable connecting manner such as by glue bonding or welding. The water storing cavity 1120 has a cone shape having gradually reducing diameters from top towards bottom of the water storing cavity 1120.

The water storing cup 112 comprises a bottom wall 1121 and a surrounding wall 1122 integrally extended from the bottom wall 1121 to define the water storing cavity 1120 for storing water. Preferably, the water storing cup 112 may further comprise a water temperature senor 1123 disposed in the water storing cavity 1120 for detecting the temperature of the water in the water storing cup 112. For example, when the water temperature senor 1123 has detected that the water temperature in the water storing cavity 1120 is greater than a preset value $T_1$, such as 81° C.-96° C., the heating module 114 for heating and boiling the water in the water storing cup 112 will be stopped.

The cup lid 113 has one or more vapor holes 1130 which are communicated to the water storing cavity 1120 of the water storing cup 112. When the water in the water storing cavity 1120 of the water storing cup 112 is heated and boiled to produce water vapor, the water vapor can be discharged through the vapor holes 1130 of the cup lid 113.

Figure 26:
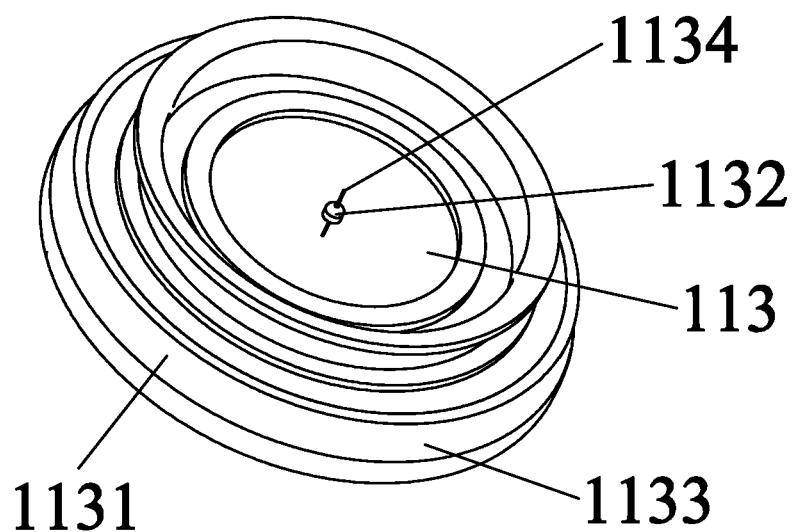
FIG. 26 is a perspective view of a cup lid of the portable coffee machine according to the fourth embodiment of the present invention.
Figure 27:
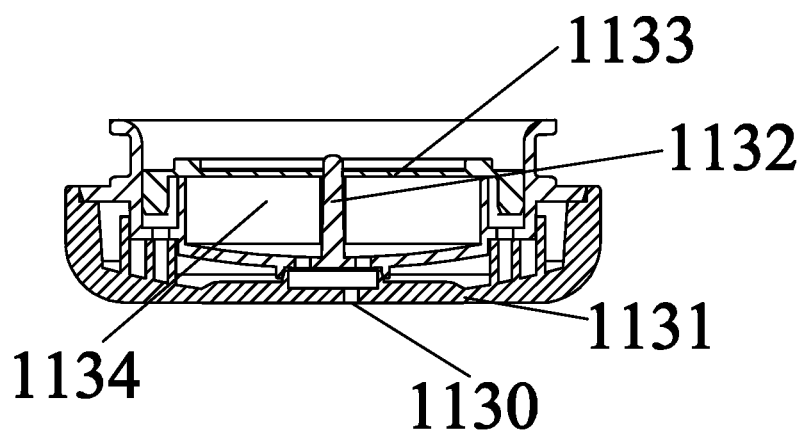
FIG. 27 is a sectional view of the cup lid of the portable coffee machine according to the fourth embodiment of the present invention.
Figure 28:
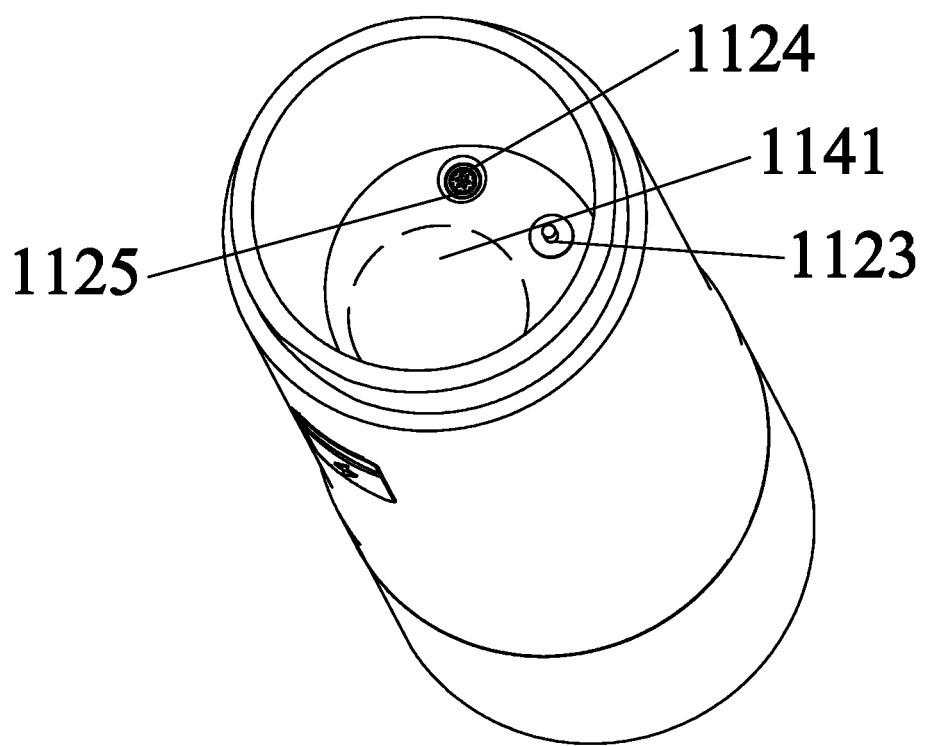
FIG. 28 is a perspective view illustrating a water storing cup of the portable coffee machine according to the fourth embodiment of the present invention.
Figure 29:
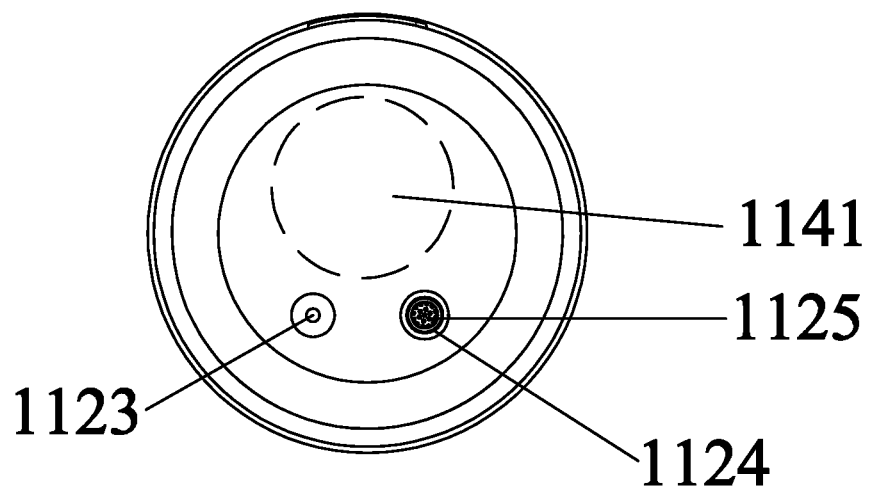
FIG. 29 is a top view illustrating the water storing cup of the portable coffee machine according to the fourth embodiment of the present invention.

More specifically, as shown in FIGS. 26 and 27, the cup lid 113 comprises a lid boy 1131, a connecting column 1132, and a flexible sealing film 1133 having a slit 1134, a cavity 1135 is defined between the sealing film 1133 and the lid body 1131, the vapor holes 1130 are communicated to the cavity 1135.

When the water storing cavity 1120 of the water storing cup 112 is filled with water, and the cup lid 113 is disposed on the water storing cup 112, the water is kept between the water storing cup 112 and the cup lid 113. When the heating module 114 is activated to heat and boil the water in the water storing cup 112, water vapor discharged in the water storing cavity 1120 will result in a pressure increase in the water storing cavity 1135, so that the sealing film 1133 is pushed by the water vapor to increase the size of the slit 1134 which is communicated to the cavity 1135, so that water vapor is able to discharge through the vapor holes 1130 of the cup lid 113 by passing through the cavity 1135.

In other words, when the water in the water storing cavity 1120 of the water storing cup 112 is not boiled to create a preset air pressure in the water storing cavity 1120, the slit 1134 of the sealing film 1133 is not opened for allowing the vapor to be discharged into the cavity 1135, so as to ensure the heating efficiency of the water in the water storing cavity 1120 of the water storing cup 112.

Figure 25:
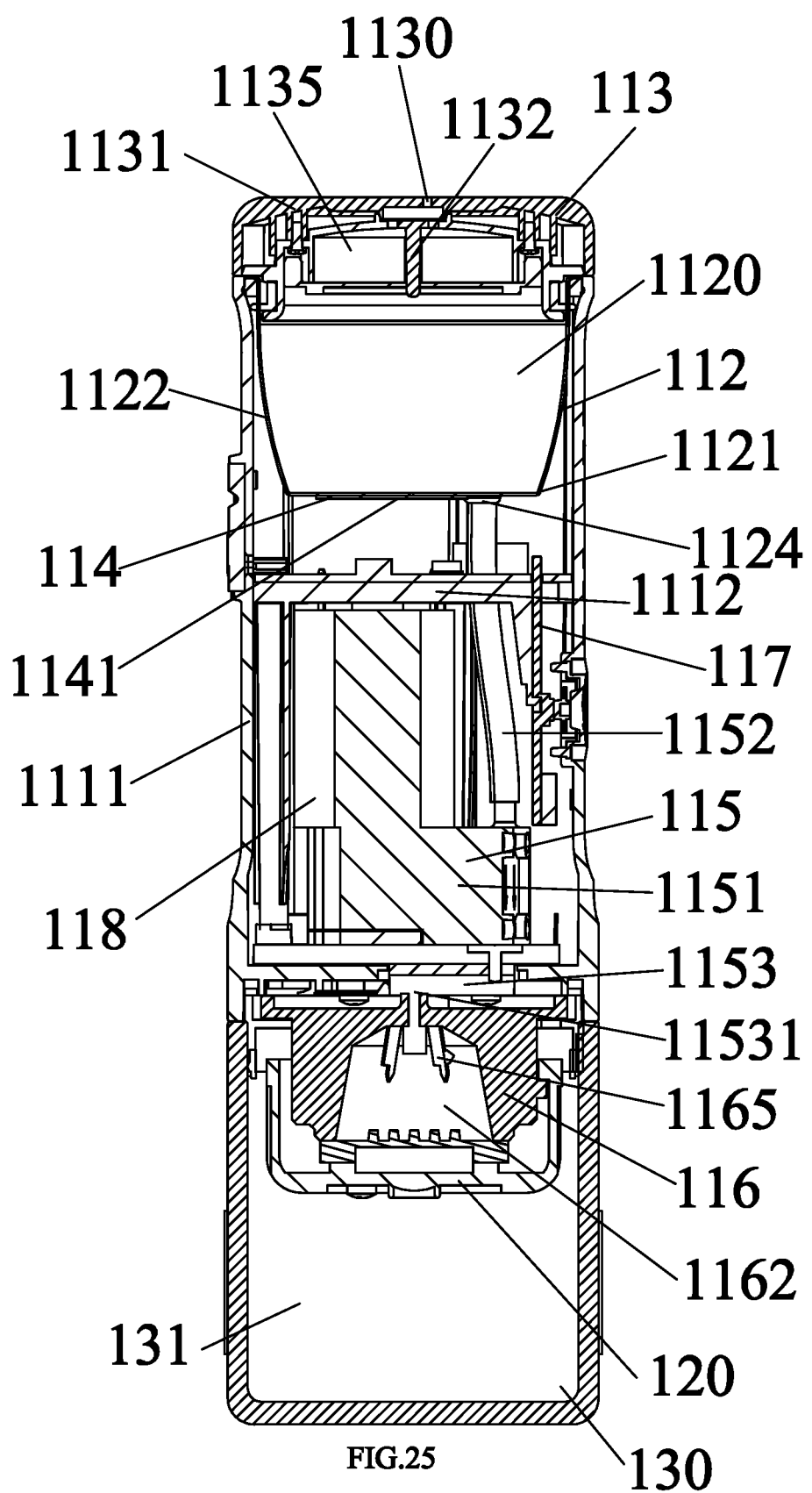
FIG. 25 is a sectional view of the portable coffee machine according to the fourth embodiment of the present invention.

As shown in FIG. 25 of the drawings, the heating module 114 of this embodiment comprises a heating member 1141 which is attached to a bottom of the bottom wall 1121 of the water storing cup 112. The heating member 1141 can be any suitable heating component such as a PTC heating element, a thick film heating layer, a heating resistance wire, a heating film, a metal ceramic heating member, or the like. Accordingly, the bottom of the bottom wall 1121 of the water storing cup 112 in this embodiment provide a flat bottom surface for conveniently attaching the heating member 1141, so that the heating member 1141 is able to efficiently transfer the heat to the water in the water storing cup 112.

The water storing cup 112 further comprises a discharging portion 1124 which is connected to the bottom wall 1121 for discharging the water in the water storing cavity 1120 of the water storing cup 112. More specifically, the water storing cup 112 has a plurality of discharging holes 1125 formed in a periphery at an edge of the bottom wall 1121 by penetrating the bottom wall 1121 and the discharging portion 1124. Accordingly, by arranging the discharging portion 1124 at a peripheral position of the bottom wall 1121, the area at the bottom of the bottom wall 1121 of the water storing cup 112 for attaching the heating member 1141 is ensured, so that the heating member 1141 with a larger size can be adopted for quickly heating and boiling the water in the water storing cup 112.

It is worth mentioning that each of the discharging holes 1125 has a relatively small pore size that when the water is added into the water storing cavity 1120 of the water storing cup 112, under a sucking force of the water pump assembly 115, the water into the water storing cavity 1120 of the water storing cup 112 can be pumped down towards the extraction container 116.

In other embodiments, the heating module 114 may comprise a heating member 1141 which is mounted in the water storing cavity 1120 of the water storing cup 112, or may be attached to the outer side of the surrounding wall 1122 of the water storing cup 112.

Referring to FIG. 25, the water pump assembly 115 comprises a water pump unit 1151, a connecting conduit 1152 which is connected between the discharging portion 1124 of the water storing cup 112 and the water pump unit 1151 for guiding the water in the water storing cup 112 int the water pump unit 1151, and a feeding conduit 1153 for feeding the water in the water pump unit 1151 into the extraction container 116 for coffee extraction. As shown in FIG. 25 of the drawings, the feeding conduit 1153 of this embodiment has a feeding outlet 11531 that is formed at a middle position of the housing 111 for communicating with the extraction container 116.

The water pump unit 1151 can be any type of pumps that can pump water, such as a positive displacement pump, a rotary displacement pump, a dynamic pump, a centrifugal pump, a reciprocating pump, a diaphragm pump, a submersible pump, and a peristaltic pump.

The connecting conduit 1151 may be a flexible tube that is mounted to the discharging portion 1124 of the water storing cup 112, or the connecting conduit 1151 may be integrally formed with the discharging portion 1124 of the water storing cup 112.

In this embodiment, the extraction container 116 is fixed to the housing 111. In other words, different from the extraction module 30 which is detachably mounted to the housing 10 in the first embodiment, the extraction container 116 of this embodiment can be integrated with the housing 111 and is not detached for installing the coffee capsule during usage.

The extraction container 116 comprises a body portion 1161 having an extraction cavity 1162, and a mounting portion 1163 for mounting the body portion 1161 with the housing 111. The extraction container 116 has a top inlet 1164 which is communicated to the feeding outlet 11531 of the feeding conduit 1153 of the water pump assembly 115, so that the water in the water pump unit 1151 can be pumped into the extraction cavity 1162 through the top inlet 1164.

Figure 30:
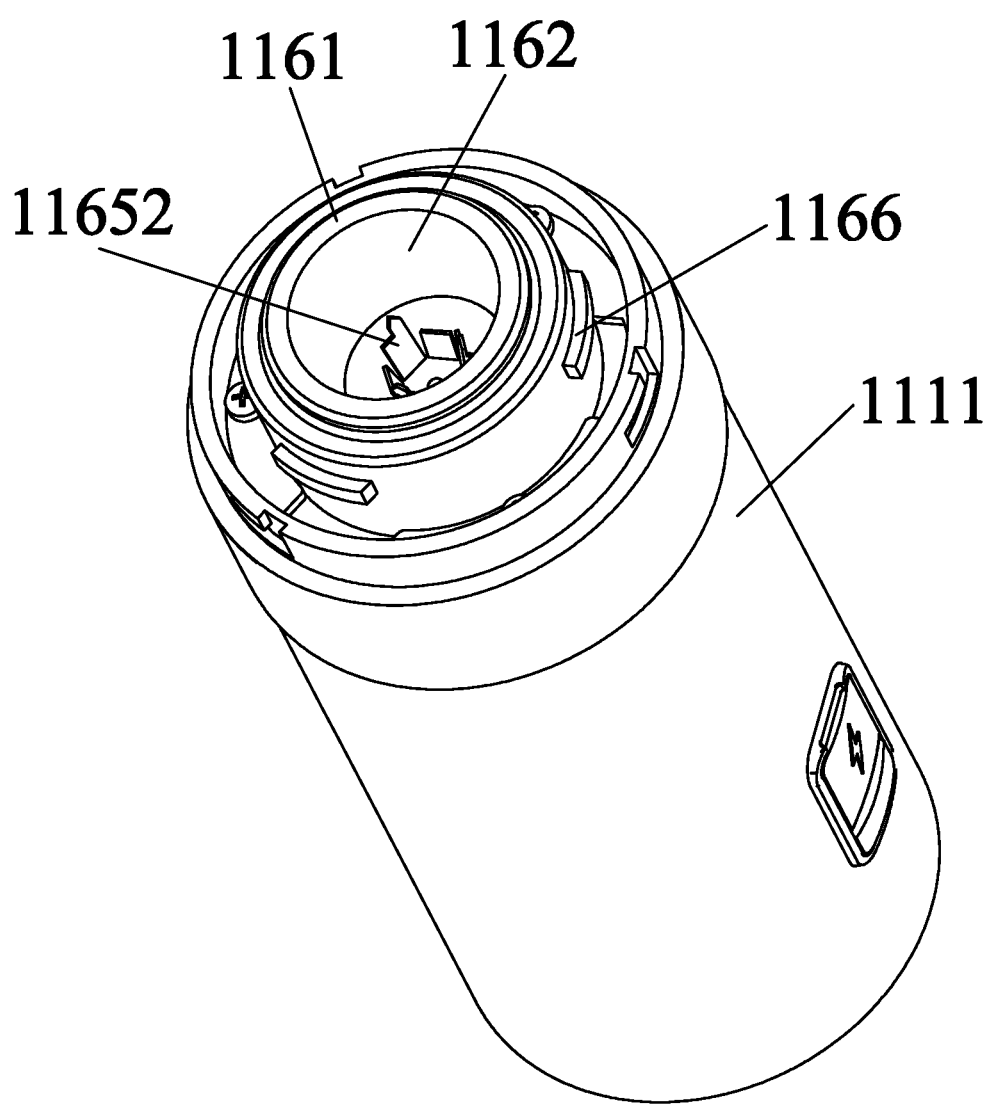
FIG. 30 is a perspective view illustrating an extraction container of the portable coffee machine according to the fourth embodiment of the present invention.
Figure 31:
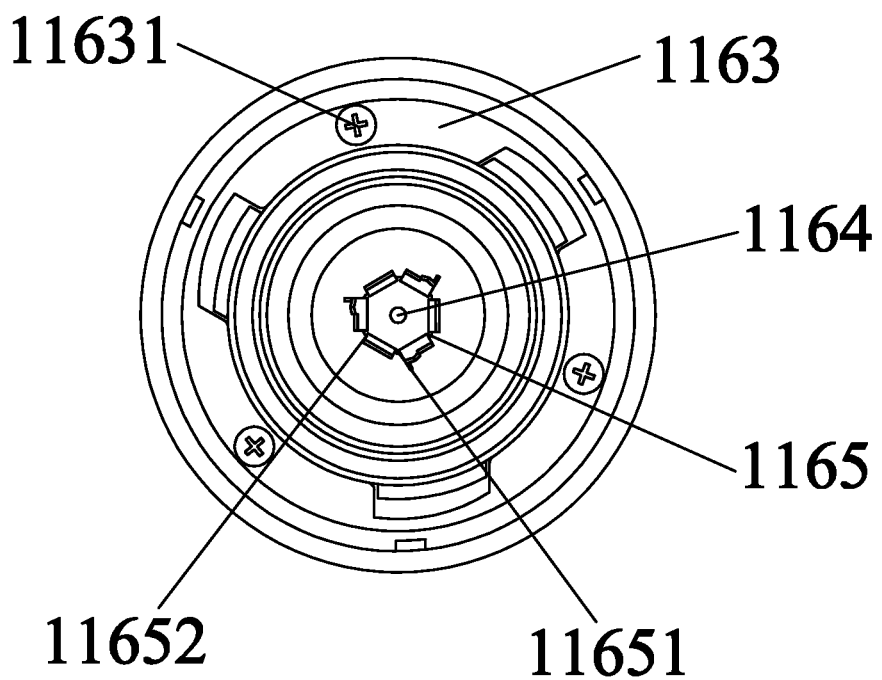
FIG. 31 is a bottom view illustrating the extraction container of the portable coffee machine according to the fourth embodiment of the present invention.
Figure 32:
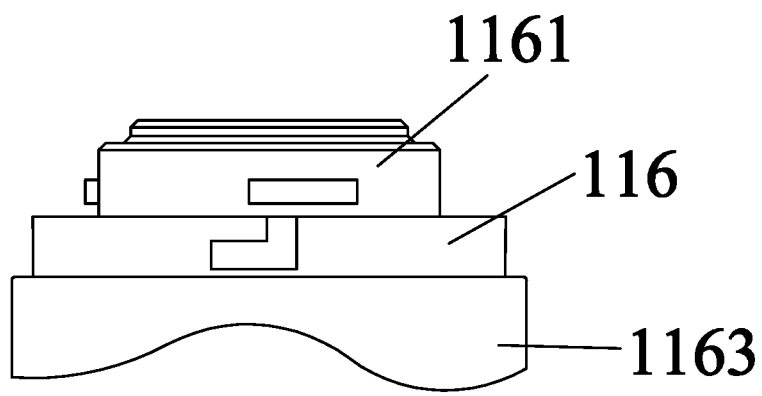
FIG. 32 is a side view illustrating the extraction container of the portable coffee machine according to the fourth embodiment of the present invention.

As shown in FIGS. 30 to 32 of the drawings, the mounting portion 1163 is connected to the body portion 1161, and one or more connecting members 11631 such as three connecting bolts are used to connect the mounting portion 1163 which is circular in shape with the housing 111, so that the extraction container 116 is not easy to be detached from the housing 111.

In this embodiment, the mounting portion 1163 has an outer surface which can be detachably coupled with the coffee cup 130 by a suitable connecting manner such as engaging screws, tongue-groove engaging manner, clipping and hooking manner.

In this embodiment, as shown in FIG. 25, the housing 111 comprises a cylindrical housing body 1111 and a mounting bracket 1112, the mounting portion 1163 of the extraction container 116 and the water storing cup 112 are respectively mounted to the bottom and the top of the housing body 1111, so as to form a mounting cavity 1113 in the housing 111, the heating module 114, the water pump assembly 115, the controller 117 and the power module 118 are assembled in the mounting cavity 1113 of the housing 111.

The extraction container 116 further comprises a blade assembly 1165 which comprises a base 11651 and a plurality of blades 11652 which are extended from the base 11651 for piercing a top of the coffee capsule in the extraction cavity 1162 of the extraction container 116, so that hot water can flow into the coffee capsule for coffee extraction.

The transferring cup 120 can be coupled to the extraction container 116 to seal a bottom of the extraction cavity 1162 of the extraction container 116 for storing and retaining the coffee capsule in the extraction cavity 1162 of the extraction container 116. Accordingly, the coffee capsule can be put in the transferring cup 120 and then the transferring cup 120 can be assembled to the extraction container 116, so that the coffee capsule is guided into the extraction cavity 1162 of the extraction container 116. Alternatively, the coffee capsule also can be inserted into the extraction cavity 1162 of the extraction container 116, and then the transferring cup 120 can be mounted to the extraction container 116 to retain the coffee capsule between the transferring cup 120 and the extraction container 116.

Figure 33:
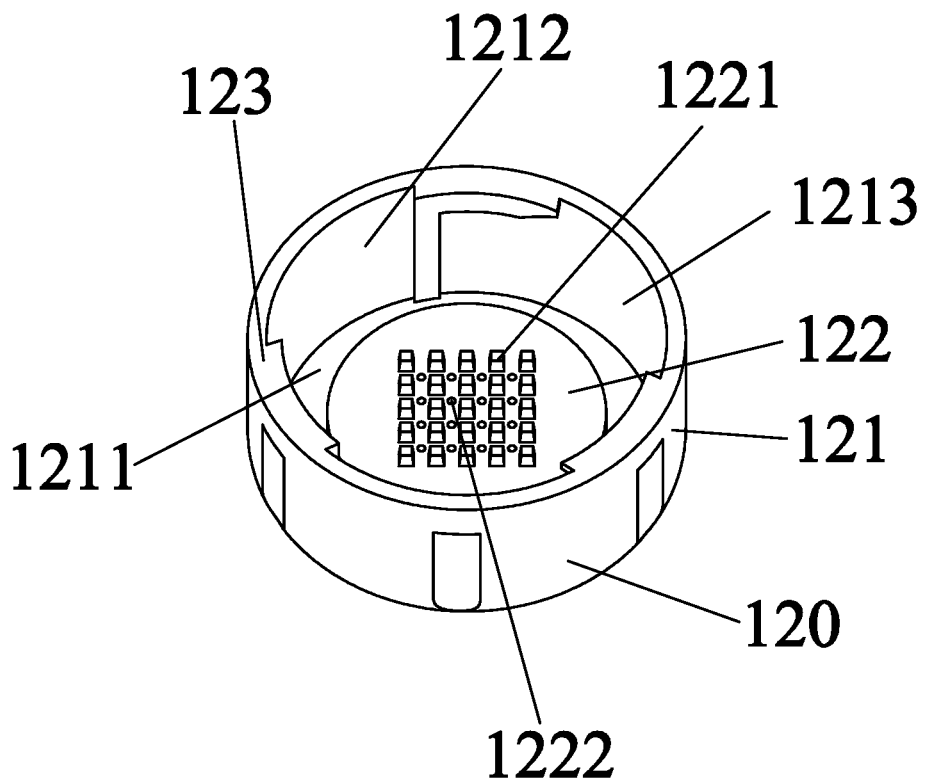
FIG. 33 is a perspective view of a transferring cup of the portable coffee machine according to the fourth embodiment of the present invention.
Figure 34:
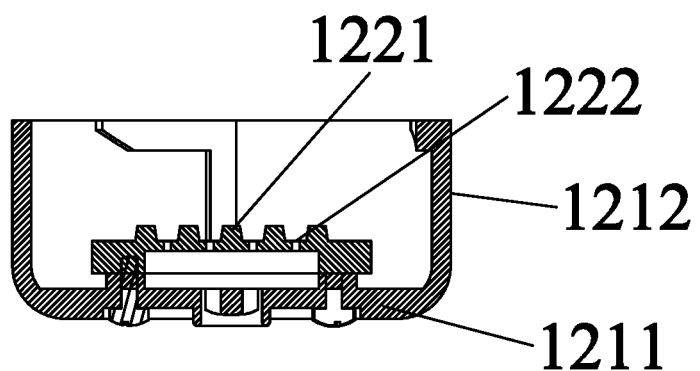
FIG. 34 is a sectional view of the transferring cup of the portable coffee machine according to the fourth embodiment of the present invention.

More specifically, as shown in FIGS. 33 and 34, the transferring cup 120 comprises a cup body 121 and a sealing portion 122 which is integrally protruded from the cup body 121. The cup body 121 comprises a bottom wall 1211 and a surrounding wall 1212 integrally extended from the bottom wall 1211 to define a receiving chamber 1213, the sealing portion 122 of this embodiment is extended into the receiving chamber 1213 and is protruded from the bottom wall 1211 of the cup body 121.

With reference to FIG. 25 of the drawings, according to this embodiment, the sealing portion 122 of the transferring cup 120 can be aligned with the extraction cavity 1162 of the extraction container 116 to seal the coffee capsule in the extraction container 162. The sealing portion 122 further comprises a plurality of protrusions 1221 and has a plurality of discharge outlet holes 1222 which are arranged to communicate the extraction cavity 1162 of the extraction container 116 to a coffee receiving cavity 131 of the coffee cup 130.

In addition, when the coffee capsule is inserted into the extraction cavity 1162 of the extraction container 116, the coffee capsule is retained by the blade assembly 1165 and the protrusions 1221, so that the blades 11652 and the protrusions 1221 are able to be puncture the coffee capsule, so that the water flow from the water pump assembly 115 will flow into the coffee capsule to extract coffee and then flow out of the coffee capsule and is finally guided into the coffee cup 130 through the discharge outlet holes 1222 of the sealing portion 122 of the transferring cup 120, so as to prepare a cup of coffee for the user.

The transferring cup 120 is detachably coupled to the extraction container 116 by a suitable connecting manner. As shown in FIGS. 33 and 34 of the drawings, the transferring cup 120 further comprises a plurality of retaining blocks 123 which are spacedly and integrally protruded from the inner side of the surrounding wall 1212 of the cup body 121, the extraction container 116 further comprises a plurality of retention blocks 1166 which are spacedly and integrally protruded from the outer side of the body portion 1161 of the extraction container 116 for engaging with the corresponding retaining blocks 123 for securing the extraction container 116 with the transferring cup 120 and preventing the rotation of the transferring cup 120 with respect to the extraction container 116.

Figure 23:
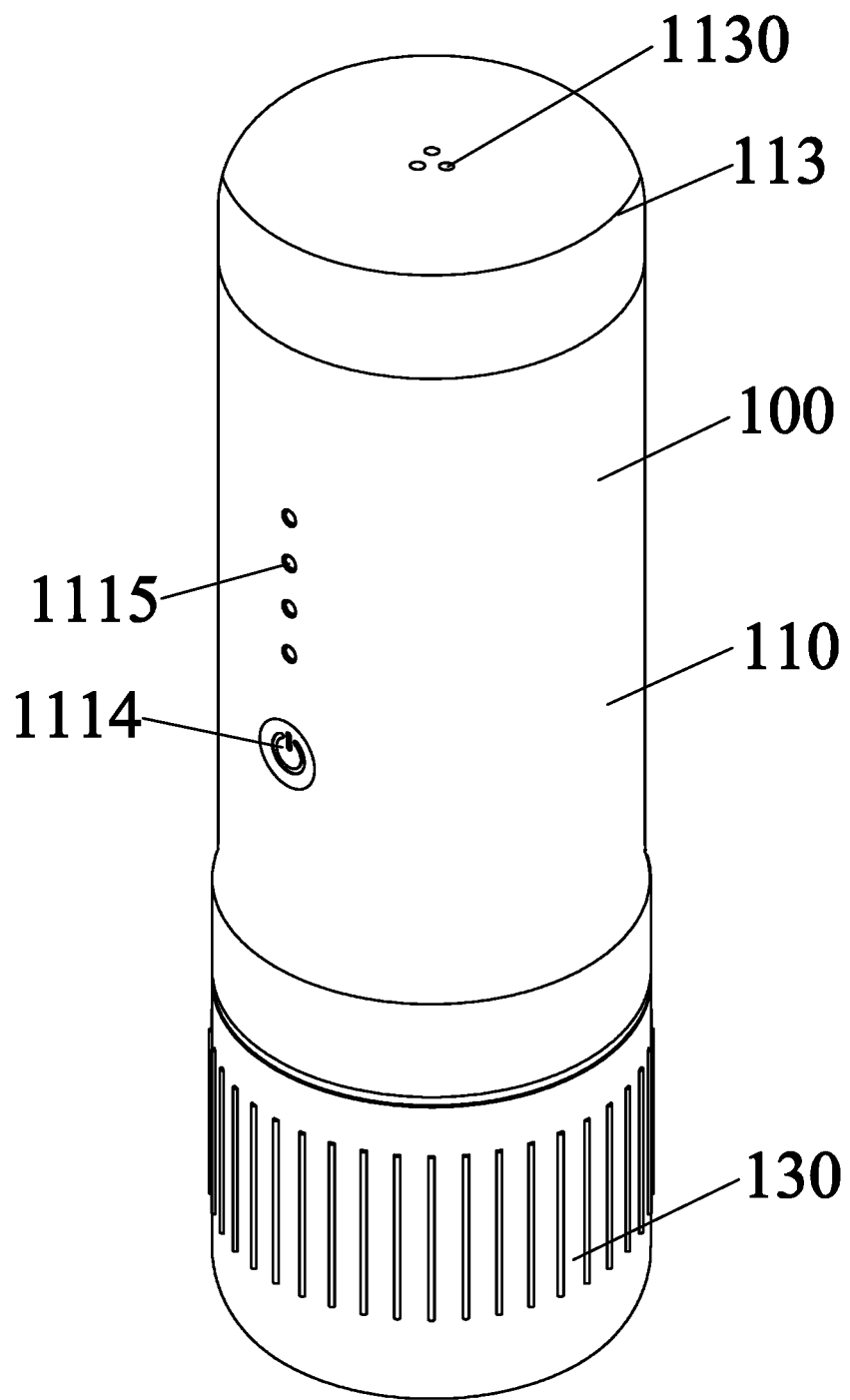
FIG. 23 is a perspective view of a portable coffee machine according to a fourth embodiment of the present invention.
Figure 24:
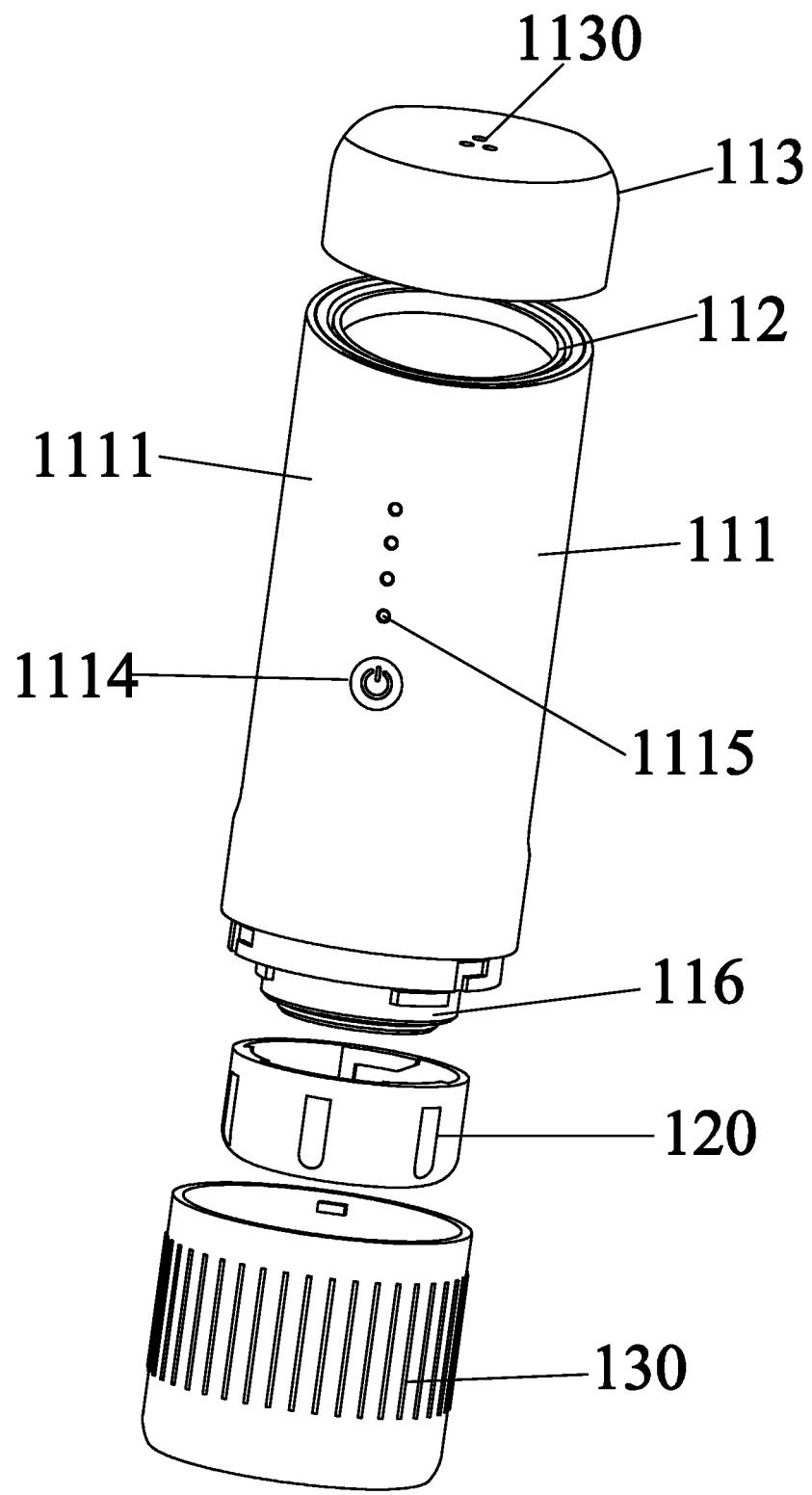
FIG. 24 is an exploded view of the portable coffee machine according to the fourth embodiment of the present invention.

As shown in FIGS. 23 and 24 of the drawings, the housing 111 further comprises a switch 1114 which is embodied as a button that is electrically connected to the controller 117 for controlling the operation of the portable coffee machine, and one or more indicator lights 1115 for indicating the temperature of the water in the water storing cavity 1120 of the water storing cup 112.

The manner of activating the operation of the portable coffee machine can be achieved by programming the control manner of the switch 1114. For example, when the button is pressed for a predetermined time period, such as 2-5 seconds, the heating module 114 is activated to heat the water in the water storing cavity 1120 of the water storing cup 112, and when the water in the water storing cavity 1120 of the water storing cup 112 is heated to a preset temperature, the operation of the heating module 114 is stopped and the water pump unit 1151 is automatically activated to pump the boiled water in the water storing cup into the extraction container 116 for coffee extraction, and finally, coffee flow will flow into the coffee cup 130 through the discharge outlet holes 1222 of the transferring cup 120.

The power module 118 comprises a rechargeable battery for supplying power to the controller 177, the heating module 114 and the water pump assembly 115, so as to allow the user to carry the portable coffee machine during outdoor activities such as travelling and camping.

Example 5

As shown in FIGS. 35 to 46 of the drawings, a portable coffee machine according to a fifth embodiment of the present invention is illustrated, similar to the above fourth embodiment, the portable coffee machine 100 comprises a machine body 110, a transferring cup 120 detachably coupled to the machine body 110, and a coffee cup 130 detachably coupled to the transferring cup 120 or the machine body 110 for collecting coffee liquid product. The machine body 110 comprises a housing 111, a water storing cup 112 arranged on top of the housing 111 for storing water, a cup lid 113 which is detachably coupled to the water storing cup 112, a heating module 114 for heating and boiling the water in the water storing cup 112, a water pump assembly 115, an extraction container 116 integrated at a bottom of the housing 111 for receiving a coffee capsule, a controller 117 which is electrically connected to the heating module 114 and the water pump assembly 115 for controlling the operations of the heating module 114 and the water pump assembly 115, and a power module 118 for providing the electric power to the controller 117, the heating module 114 and the water pump assembly 115.

Figure 40:
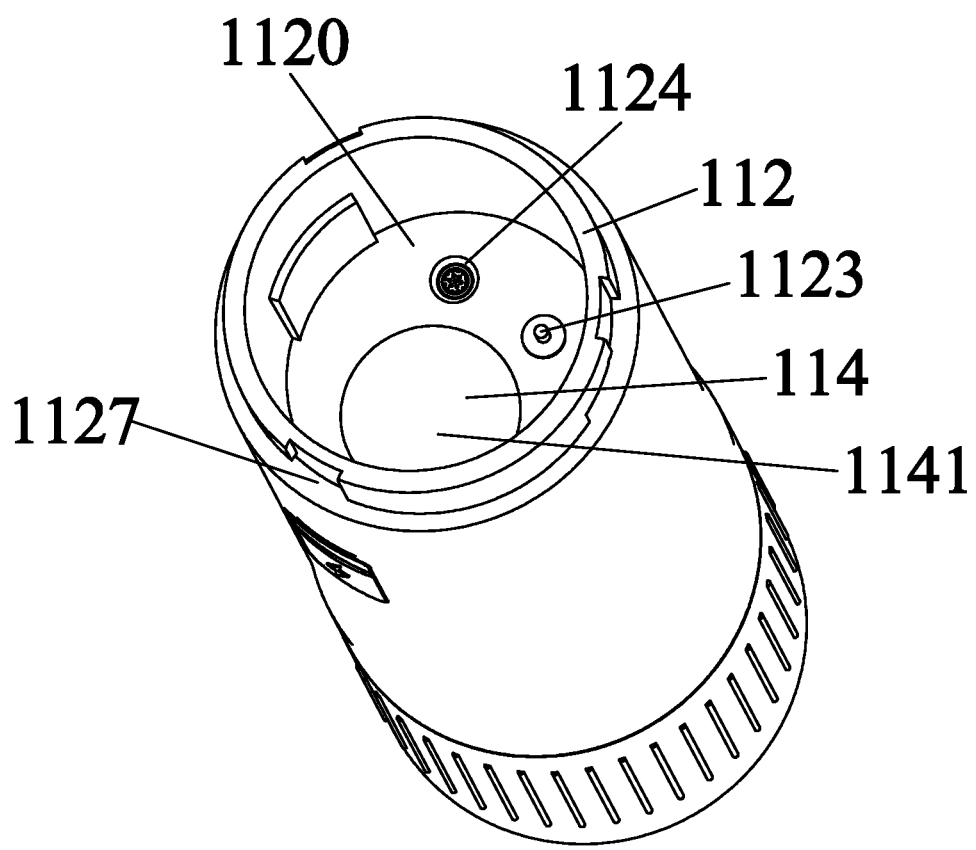
FIG. 40 is a perspective view illustrating a water storing cup of the portable coffee machine according to the fifth embodiment of the present invention.
Figure 41:
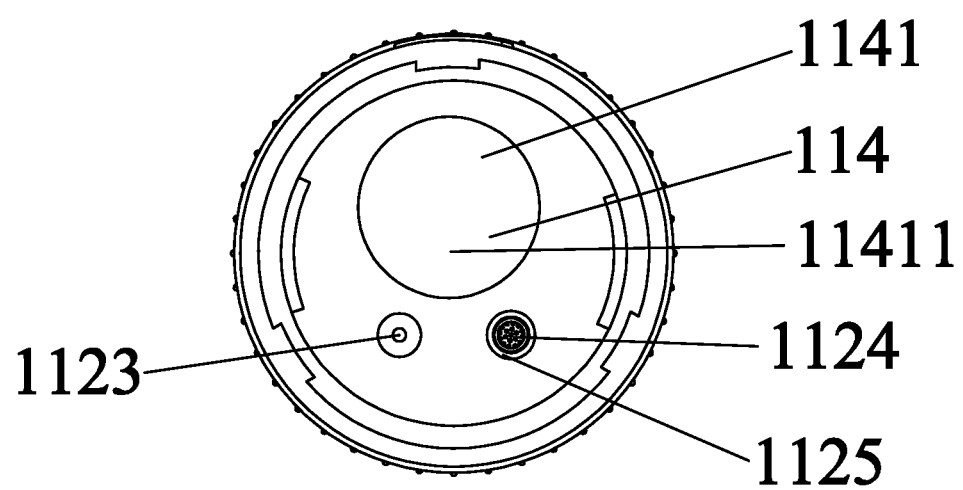
FIG. 41 is a top view illustrating the water storing cup of the portable coffee machine according to the fifth embodiment of the present invention.

In this embodiment, the water storing cup 112 may not be made of a thermal conductive material and can be plastic material or ceramic material, and has a water storing cavity 1120 for storing water. The heating module 114 comprises a heating member 1141 which is provided at the bottom of the water storing cup 112. As shown in FIGS. 40 and 41 of the drawings, a top surface 11411 of the heating member 1141 forms a part of the bottom surface of the water storing cup 112, so that the water in the water storing cup 112 is having direct contact with the top surface 11411 of the heating member 1141, so as to be heated by the heating member 1141.

Figure 37:
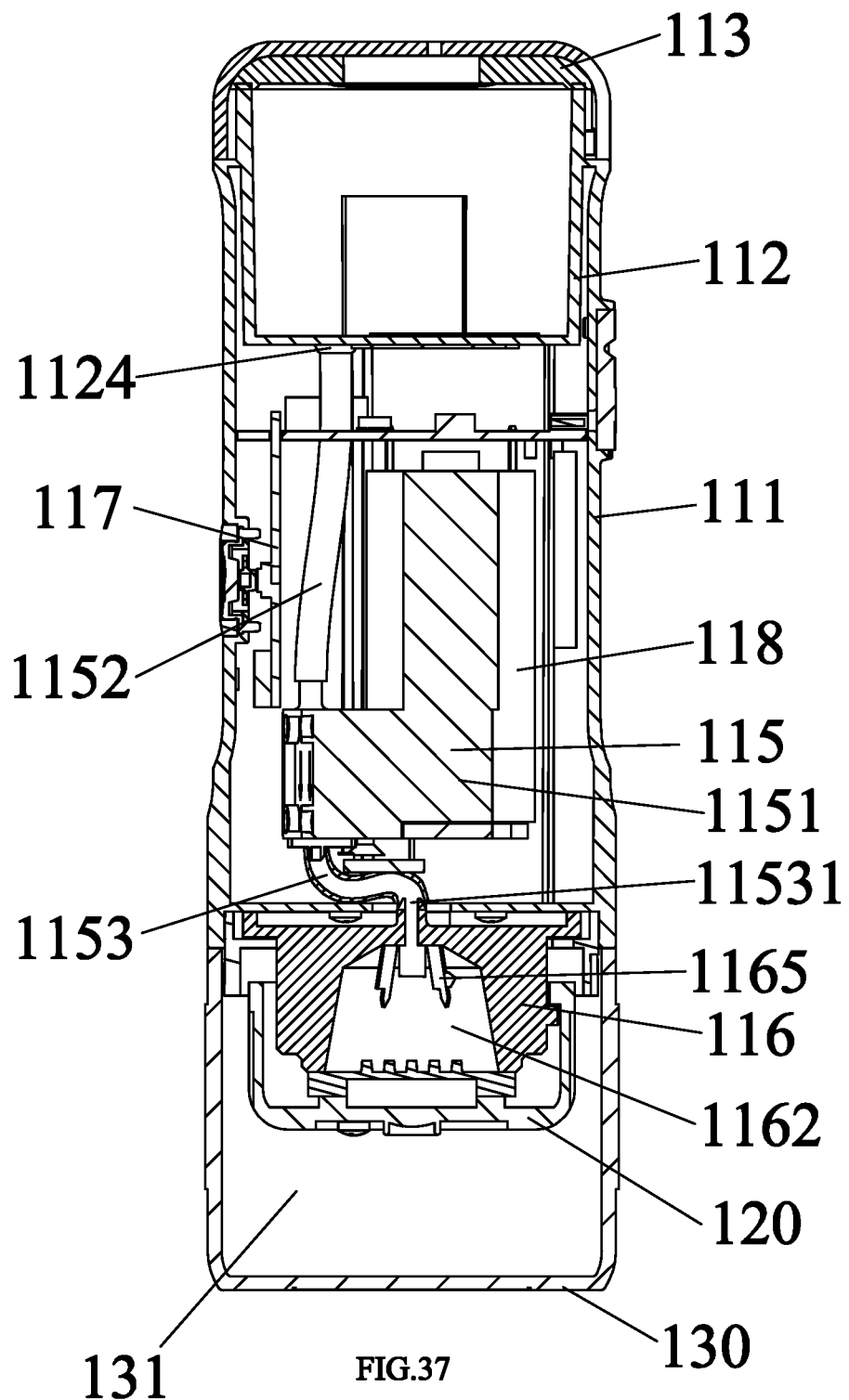
FIG. 37 is a sectional view of the portable coffee machine according to the fifth embodiment of the present invention.
Figure 38:
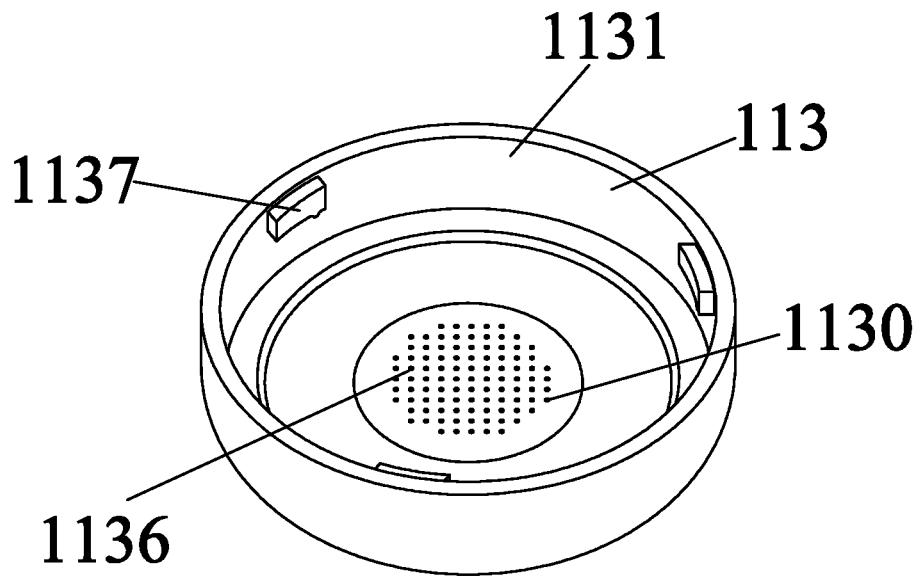
FIG. 38 is a perspective view of a cup lid of the portable coffee machine according to the fifth embodiment of the present invention.
Figure 39:
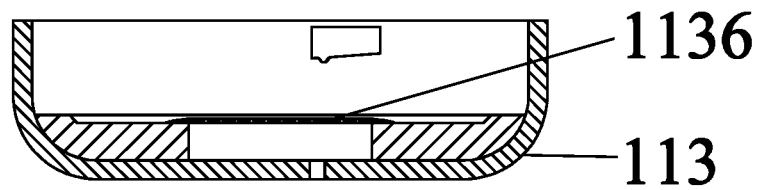
FIG. 39 is a sectional view of the cup lid of the portable coffee machine according to the fifth embodiment of the present invention.

Referring to FIGS. 37 to 39, the water storing cup 112 is mounted at the top of the housing 111 and may be protruded from the top of the housing 111, and the cup lid 113 can be disposed around the water storing cup 112 to seal the water in the water storing cavity 1120. The water storing cup 112 comprises a bottom wall 1121 and a surrounding wall 1122 integrally extended from the bottom wall 1121 to define the water storing cavity 1120 for storing water. Preferably, the water storing cup 112 may further comprise a water temperature senor 1123 disposed in the water storing cavity 1120 for detecting the temperature of the water in the water storing cup 112. For example, when the water temperature senor 1123 has detected that the water temperature in the water storing cavity 1120 is greater than a preset value T1, such as 81° C.-96° C., the heating module 114 for heating and boiling the water in the water storing cup 112 will be stopped.

As shown in FIGS. 40 and 41 of the drawings, the heating member 1141 is integrated with the bottom wall 1121 of the water storing cup 112 to form a bottom surface of the water storing cup 112, so that the water in the water storing cup 112 can be directly heated by the heating member 1141.

In this embodiment, as shown in FIGS. 38 and 39 of the drawings, the cup lid 113 comprises a lid body 1131 and a vapor discharging portion 1136 having one or more vapor holes 1130 which are communicated to the water storing cavity 1120 of the water storing cup 112. The lid body 1131 can be made of plastic material while the vapor discharging portion 1136 can be made of a metal material and is fixed to the lid body 1131 by one or more fixing members such as fixing blots. When the water in the water storing cavity 1120 of the water storing cup 112 is heated and boiled to produce water vapor, the water vapor can be discharged through the vapor holes 1130 of the vapor discharging portion 1136.

When the water storing cavity 1120 of the water storing cup 112 is filled with water, and the cup lid 113 is disposed on the water storing cup 112, the water is kept between the water storing cup 112 and the cup lid 113. When the heating module 114 is activated to heat and boil the water in the water storing cup 112, water vapor discharged in the water storing cavity 1120 will escape through the vapor holes 1130 of the vapor discharging portion 1136.

The cup lid 113 further comprises a plurality of positioning blocks 1137 spacedly and integrally extended from the inner wall of the lid body 1131, the water storing cup 112 further comprises a plurality of position grooves 1127 for engaging with the corresponding plurality of positioning blocks 1137 of the cup lid 113, so as to detachably mount the cup lid 113 to the water storing cup 112 in position while prevent the further rotation of the cup lid 113.

Similarly, in this embodiment, the water storing cup 112 further comprises a discharging portion 1124 which is connected to the bottom wall 1121 for discharging the water in the water storing cavity 1120 of the water storing cup 112. The discharging portion 1123 can be made of a material different than the water storing cup 112, such a metal material.

The discharging portion 1124 which is provided at a periphery at an edge of the bottom wall 1121 and has a plurality of discharging holes 1125. Accordingly, by arranging the discharging portion 1124 at a peripheral position of the bottom wall 1121, the area at the bottom of the bottom wall 1121 of the water storing cup 112 for mounting the heating member 1141 is ensured, so that the heating member 1141 with a larger size can be adopted for quickly heating and boiling the water in the water storing cup 112.

Similar to the above fourth embodiment, as shown in FIG. 37, the water pump assembly 115 comprises a water pump unit 1151, a connecting conduit 1152 which is connected between the discharging portion 1124 of the water storing cup 112 and the water pump unit 1151 for guiding the water in the water storing cup 112 int the water pump unit 1151, and a feeding conduit 1153 for feeding the water in the water pump unit 1151 into the extraction container 116 for coffee extraction.

The connecting conduit 1151 may be a flexible tube that is mounted to the discharging portion 1124 which is protruded from the bottom wall 1121 of the water storing cup 112, or the connecting conduit 1151 may be integrally formed with the discharging portion 1124 of the water storing cup 112.

In this embodiment, the extraction container 116 is also fixed to the housing 111. In other words, different from the extraction module 30 which is detachably mounted to the housing 10 in the first embodiment, the extraction container 116 of this embodiment can be integrated with the housing 111 and is not detached for installing the coffee capsule during usage.

The extraction container 116 comprises a body portion 1161 having an extraction cavity 1162, and a mounting portion 1163 for mounting the body portion 1161 with the housing 111. The extraction container 116 has a top inlet 1164 which is communicated to the feeding outlet 11531 of the feeding conduit 1153 of the water pump assembly 115, so that the water in the water pump unit 1151 can be pumped into the extraction cavity 1162 through the top inlet 1164.

Figure 42:
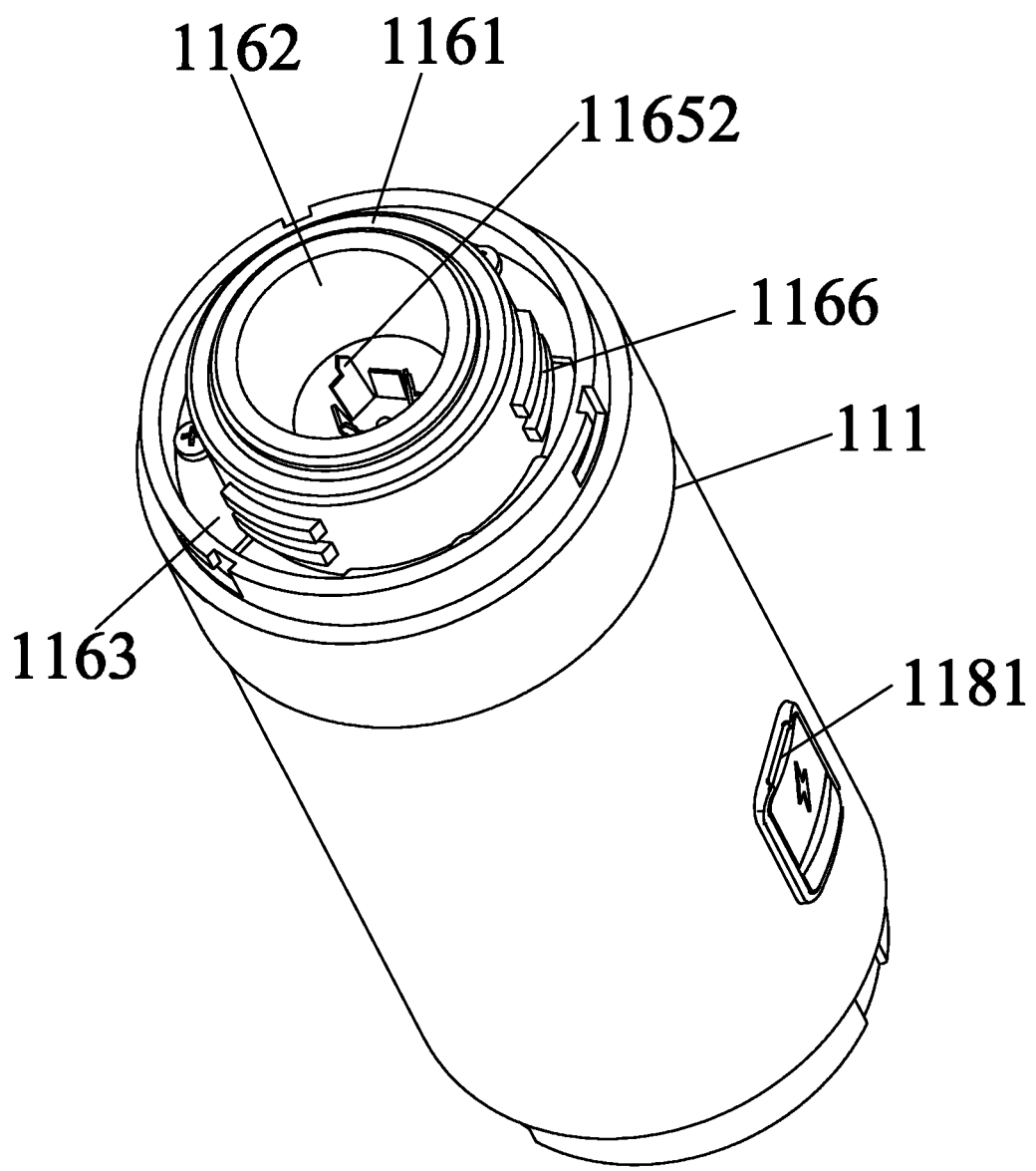
FIG. 42 is a perspective view illustrating an extraction container of the portable coffee machine according to the fifth embodiment of the present invention.
Figure 43:
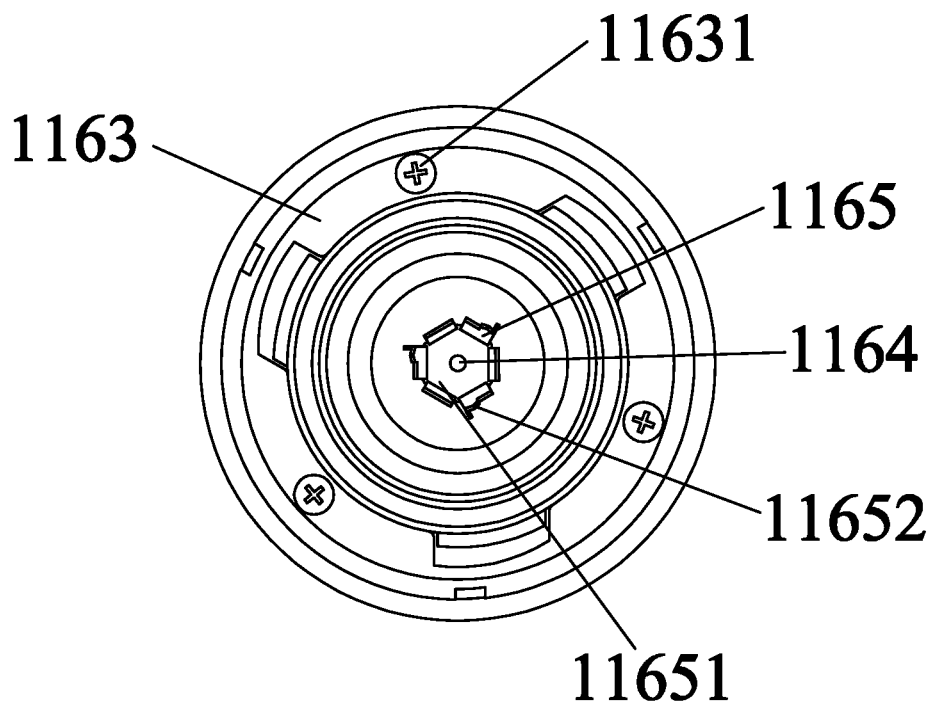
FIG. 43 is a bottom view illustrating the extraction container of the portable coffee machine according to the fifth embodiment of the present invention.
Figure 44:
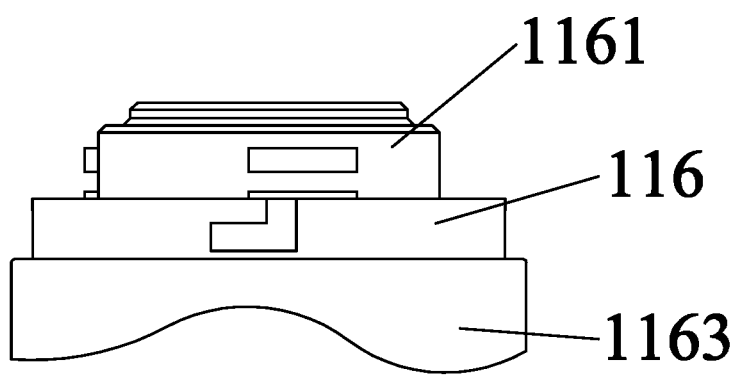
FIG. 44 is a side view illustrating the extraction container of the portable coffee machine according to the fifth embodiment of the present invention.

As shown in FIGS. 42 to 44 of the drawings, the mounting portion 1163 is connected to the body portion 1161, and one or more connecting members 11631 such as three connecting bolts are used to connect the mounting portion 1163 which is circular in shape with the housing 111, so that the extraction container 116 is not easy to be detached from the housing 111.

In this embodiment, an inner space of the housing 111 may be divided into several chambers for receiving the power module 118 and the water pump assembly 115 respectively.

The extraction container 116 further comprises a blade assembly 1165 which comprises a base 11651 and a plurality of blades 11652 which are bent and extended from the base 11651 for piercing a top of the coffee capsule in the extraction cavity 1162 of the extraction container 116, so that hot water can flow into the coffee capsule for coffee extraction. In this embodiment, six blades 11652 are shown to be disposed in the extraction cavity 1162.

Figure 45:
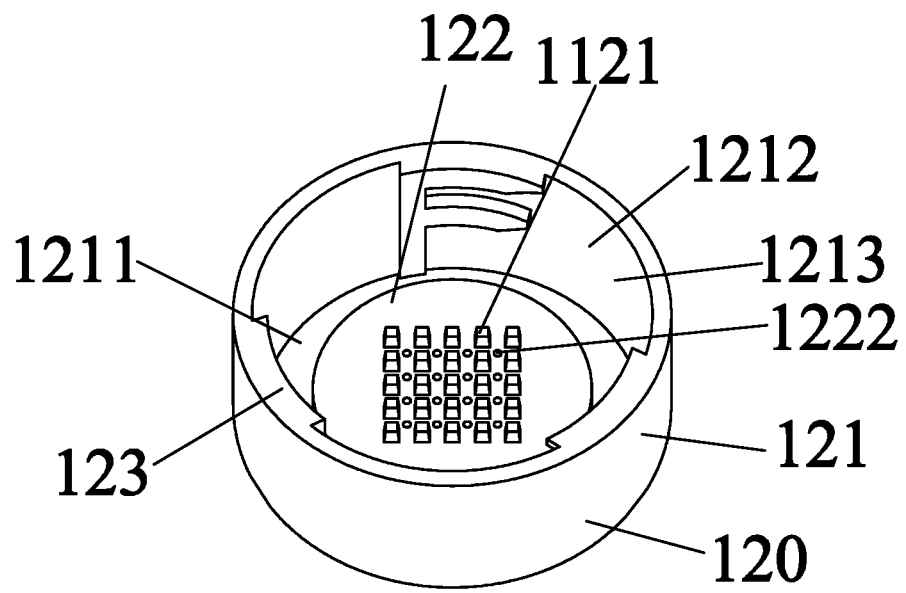
FIG. 45 is a perspective view of a transferring cup of the portable coffee machine according to the fifth embodiment of the present invention.
Figure 46:
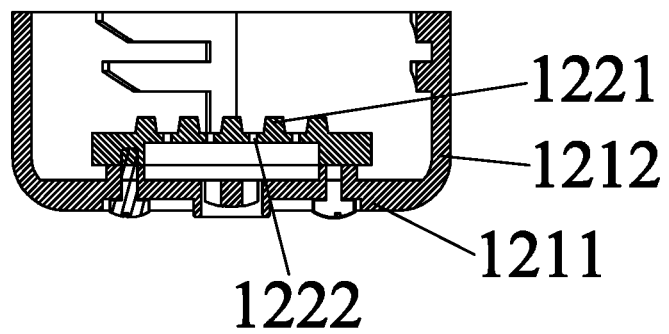
FIG. 46 is a sectional view of the transferring cup of the portable coffee machine according to the fifth embodiment of the present invention.
Figure 47:
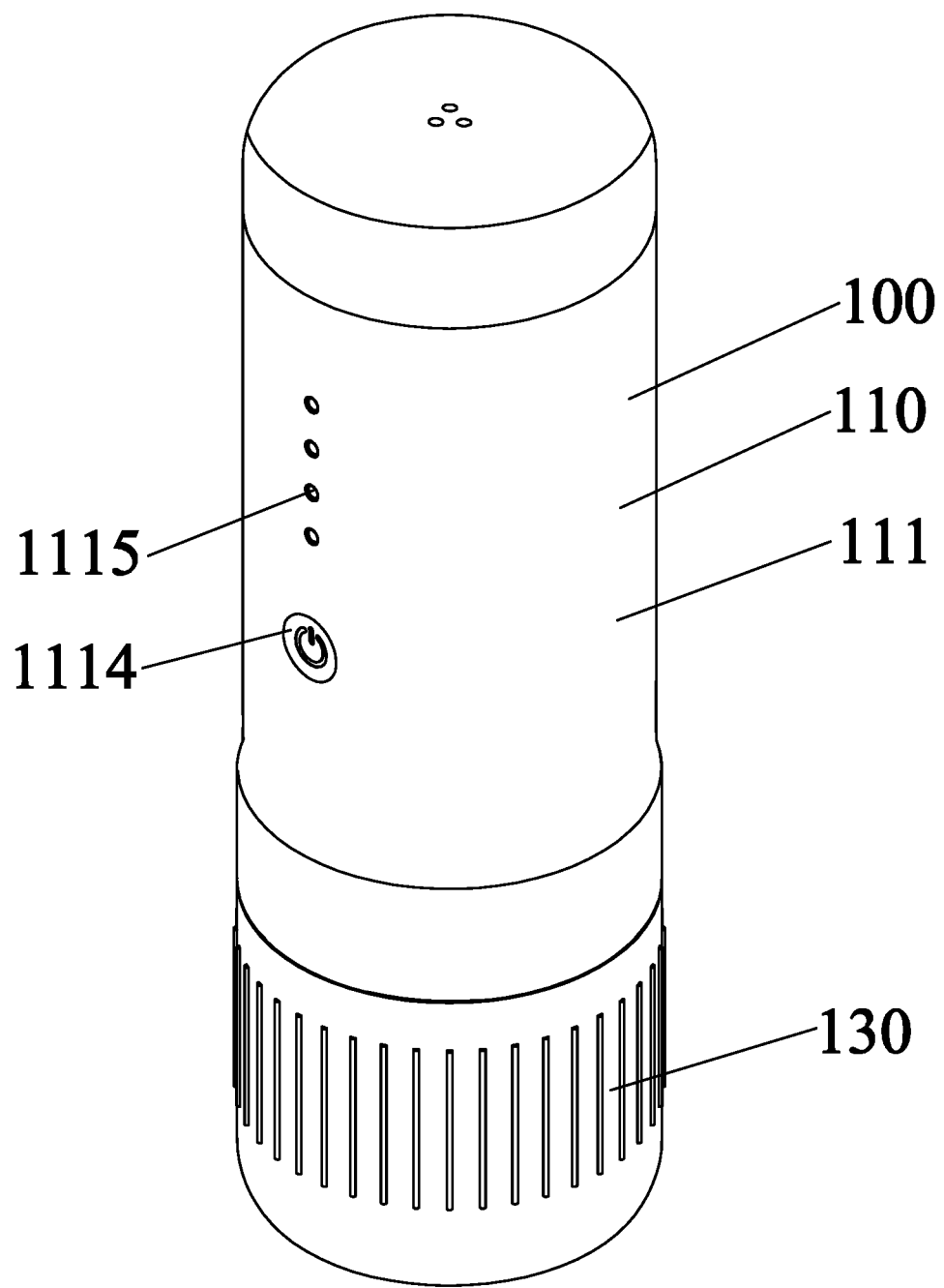
FIG. 47 is a perspective view of a portable coffee machine according to a sixth embodiment of the present invention.
Figure 48:
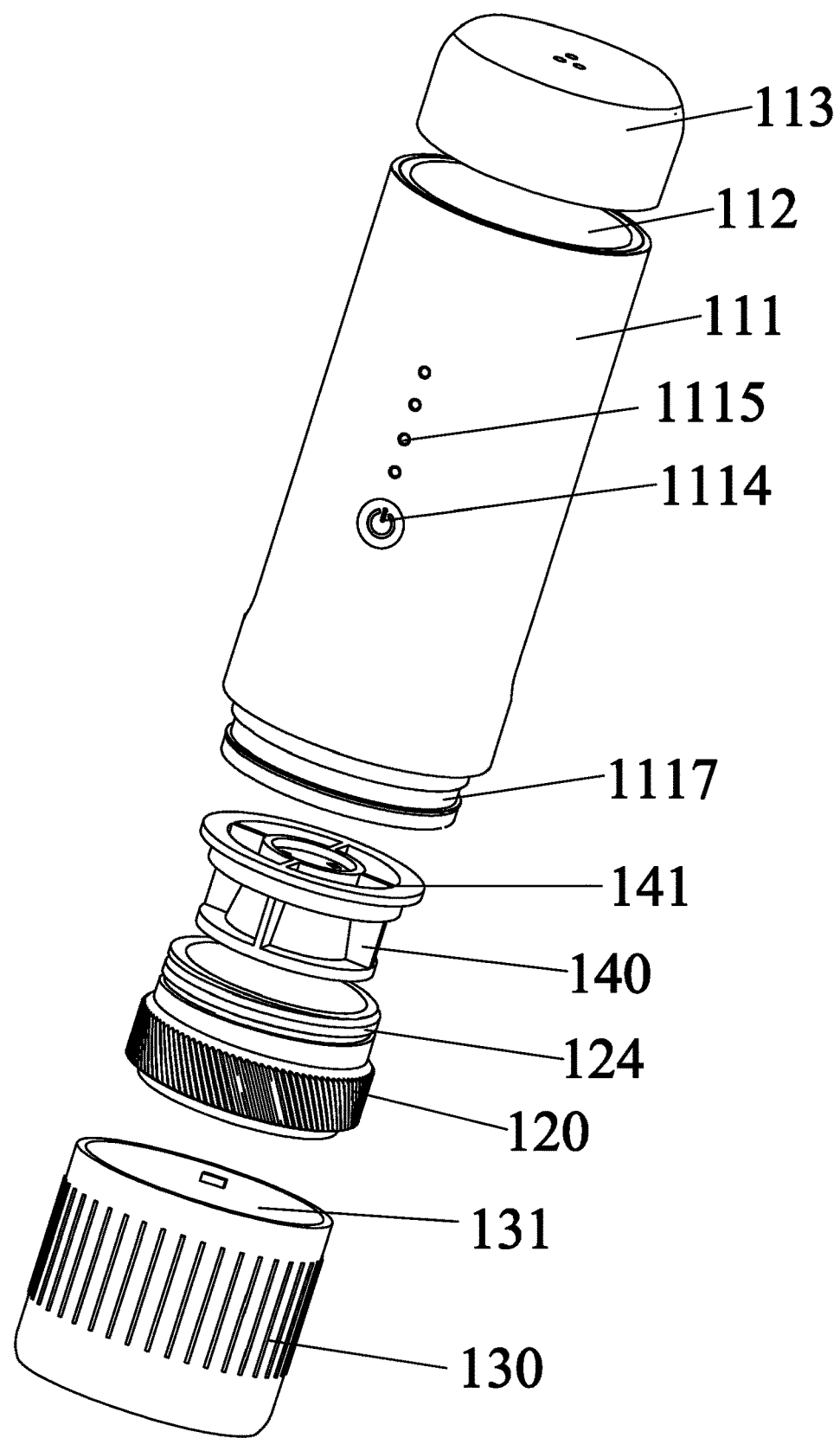
FIG. 48 is an exploded view of the portable coffee machine according to the sixth embodiment of the present invention.

Referring to FIGS. 45 to 46, the transferring cup 120 can be coupled to the extraction container 116 to seal a bottom of the extraction cavity 1162 of the extraction container 116 for storing and retaining the coffee capsule in the extraction cavity 1162 of the extraction container 116. The transferring cup 120 comprises a cup body 121 and a sealing portion 122 which is integrally protruded from the cup body 121. The cup body 121 comprises a bottom wall 1211 and a surrounding wall 1212 integrally extended from the bottom wall 1211 to define a receiving chamber 1213, the sealing portion 122 of this embodiment is extended into the receiving chamber 1213 and is protruded from the bottom wall 1211 of the cup body 121. The sealing portion 122 of the transferring cup 120 can be aligned with the extraction cavity 1162 of the extraction container 116 to seal the coffee capsule in the extraction container 162. The sealing portion 122 further comprises a plurality of protrusions 1221 for puncturing the coffee capsule and has a plurality of discharge outlet holes 1222 which are arranged to communicate the extraction cavity 1162 of the extraction container 116 to a coffee receiving cavity 131 of the coffee cup 130.

The person of ordinary skilled in the art should understand the detachable coupling manner between the transferring cup 120 and the extraction container 116 is not limiting. For example, in this embodiment, the plurality of retaining blocks 123 and the corresponding retention blocks 1166 in the above fourth embodiment may be replaced by engaging screw threads.

Figure 35:
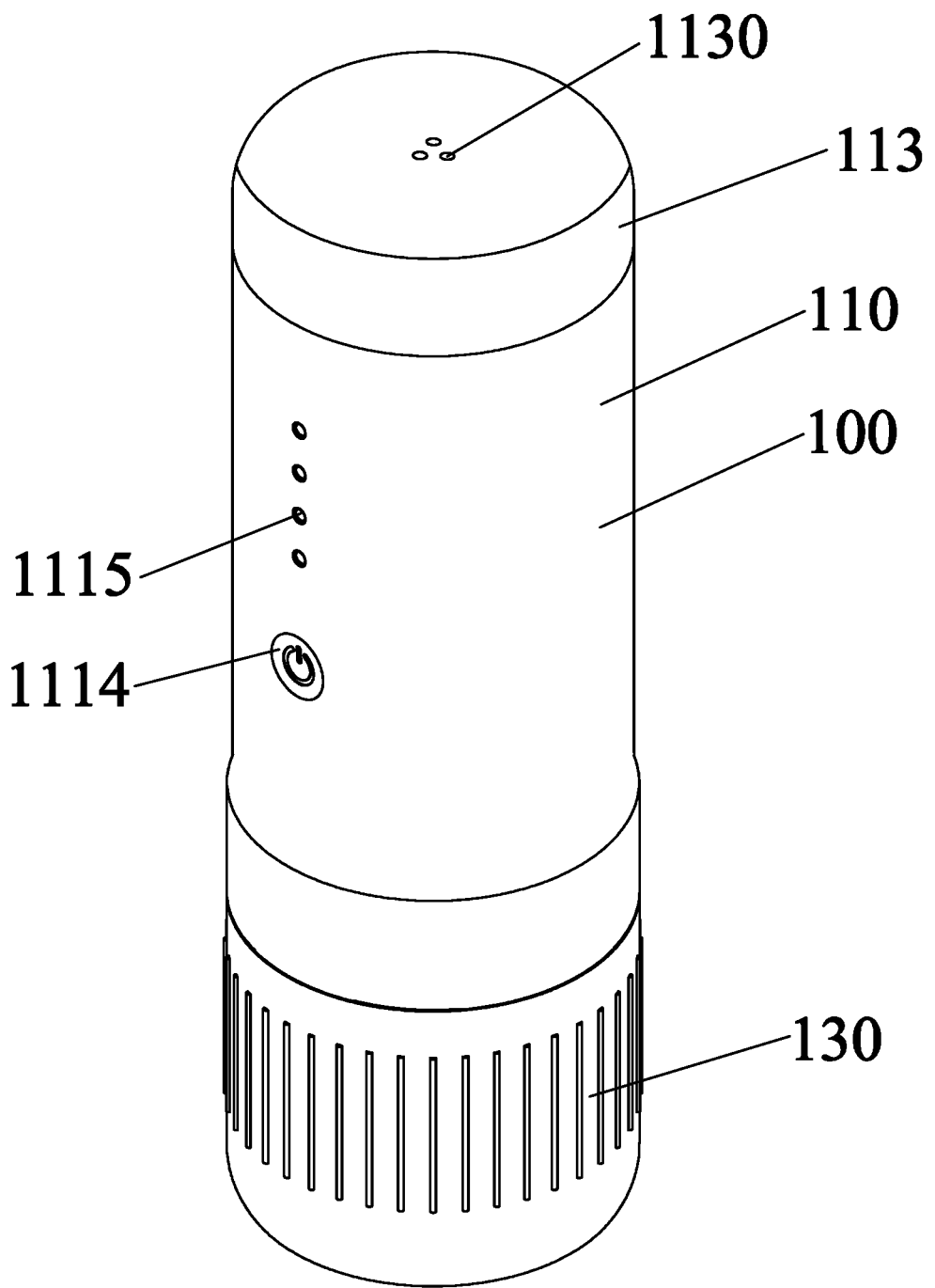
FIG. 35 is a perspective view of a portable coffee machine according to a fifth embodiment of the present invention.
Figure 36:
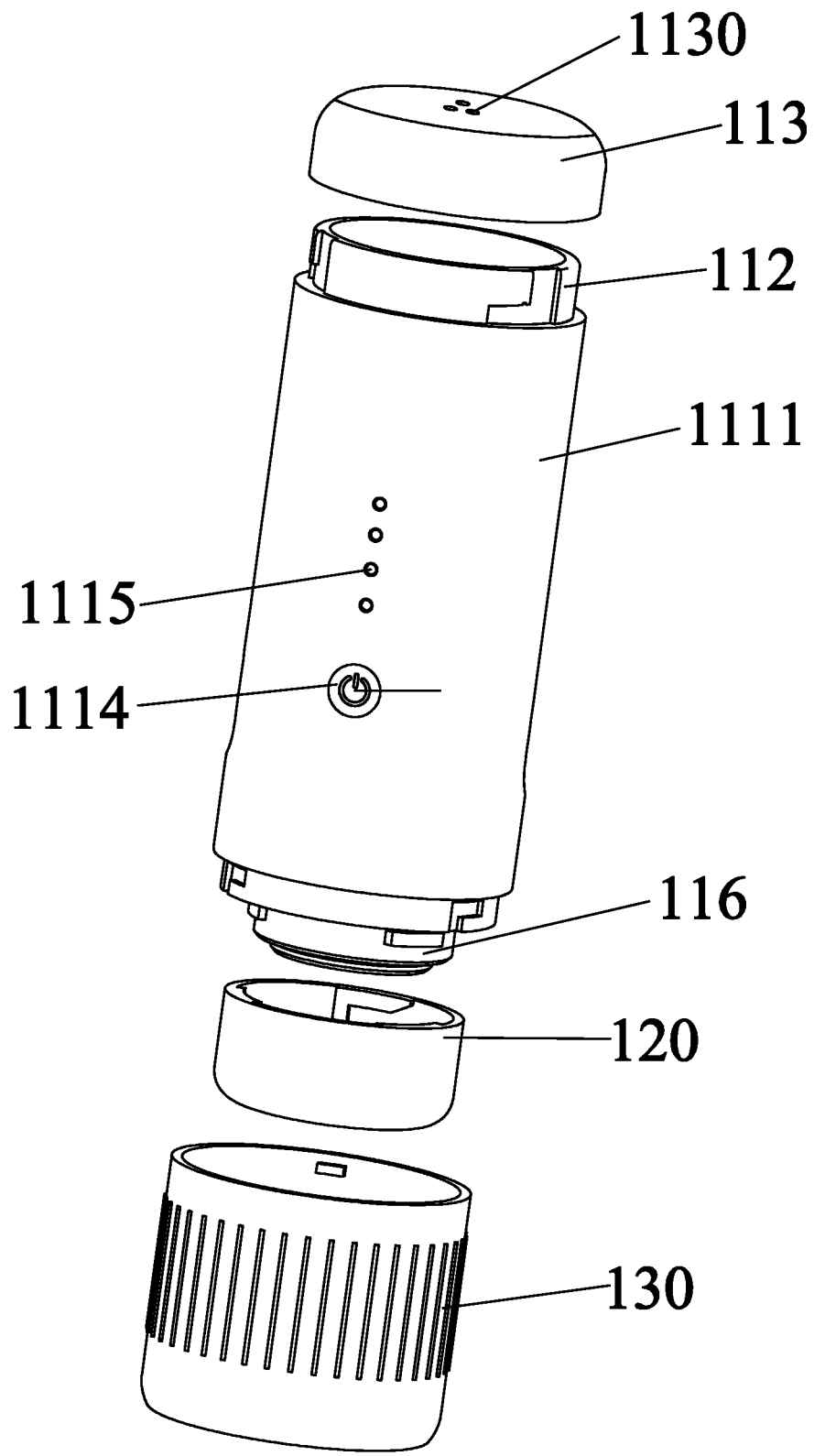
FIG. 36 is an exploded view of the portable coffee machine according to the fifth embodiment of the present invention.

As shown in FIGS. 35 and 36 of the drawings, the housing 111 further comprises a switch 1114 which is embodied as a button that is electrically connected to the controller 117 for controlling the operation of the portable coffee machine, and one or more indicator lights 1115 for indicating the temperature of the water in the water storing cavity 1120 of the water storing cup 112. As shown in FIG. 42 of the drawings, the power module 118 further comprises one or more electrical charging interfaces 1181 which are provided on the housing 111 and can be electrically connected to an external electrical charging power source. The electrical charging interfaces 1181 may comprise a USB electrical charging interface and a vehicle electrical charging interface.

During usage of the portable coffee machine of the present invention, the coffee capsule is installed in the extraction cavity 1162 of the extraction container 116 and the transferring cup 120 is mounted to the extraction container 116, and then the coffee cup 130 is mounted below the extraction container 116 by coupling to the mounting portion 1163 of the extraction container 116. And then the cup lid 113 is removed from the water storing cup 112, and water can be filled into the water storing cup 112.

When the water added into the water storing cup 112 is hot water that there is no need to heat and boil the water again, the user can press the switch 1114 for starting the water pump unit 1151 for pumping the hot water from the water storing cup 112 into the extraction container 116 for coffee extraction, and the flow of coffee liquid will then pass through the transferring cup 120 and finally be collected in the coffee cup 130.

When the water added into the water storing cup 112 is cold water that is required to be heated and boiled, the user can press the switch 1114 with a predetermined operation such as continually pressing for a preset time duration for starting heating module 114 for heating and boiling the water in the water storing up 112, and when the water temperature in in the water storing cup 112 reaches to a predetermined value and the water in the water storing cup 112 is determined to be boiled ready, the heating module 114 will stop operation, and the water pump unit 1151 controlled by the controller 117 is automatically activated for pumping the hot water from the water storing cup 112 into the extraction container 116 for coffee extraction, and the flow of coffee liquid will then pass through the transferring cup 120 and finally be collected in the coffee cup 130.

Example 6

As shown in FIGS. 47 to 68, a portable coffee machine 100 according to a sixth embodiment of the present invention is illustrated, the portable coffee machine 100 comprises a machine body 110, an extraction assembly 140 detachably coupled to the machine body 110 for receiving a coffee capsule, a transferring cup 120 detachably coupled to the extraction assembly 140, and a coffee cup 130 detachably coupled to the transferring cup 120, the machine body 110 can prepare and deliver boiled water into the extraction assembly 140 for coffee extraction, and the produced coffee will pass through the transferring cup 120, so as to be collected in the coffee cup 130 for the user to drink.

More specifically, the machine body 110 comprises a housing 111, a water storing cup 112 arranged on top of the housing 111 for storing water, a cup lid 113 which is detachably coupled to the water storing cup 112, a heating module 114 for heating and boiling the water in the water storing cup 112, a water pump assembly 115, a controller 117 which is electrically connected to the heating module 114 and the water pump assembly 115 for controlling the operations of the heating module 114 and the water pump assembly 115, and a power module 118 for providing the electric power to the controller 117, the heating module 114 and the water pump assembly 115.

The housing 111 comprises a cylindrical housing body 1111 and a mounting bracket 1112, and form a mounting cavity 1113 in the housing 111, the heating module 114, the water pump assembly 115, the controller 117 and the power module 118 are assembled in the mounting cavity 1113 of the housing 111.

The transferring cup 120 is detachably coupled to the extraction assembly 140 for storing the coffee capsule between the extraction assembly 140 and the transferring cup 120, so that water in the water storing cup 112 is boiled by the heating module 114 and pumped into the extraction assembly 140 by the water pump assembly 115, so as to extract coffee in the coffee capsule, and finally coffee liquid product is harvested in the coffee cup 130 below the transferring cup 120.

The water storing cup 112 is made of a thermal conductive material, such as stainless steel, and has a water storing cavity 1120 for storing water. The water storing cup 112 is mounted at the top of the housing 111 within the housing 111, and the cup lid 113 can be disposed above the water storing cup 112 to seal the water in the water storing cavity 1120. Alternatively, the water storing cup 112 can be integrally formed by an inner wall of the housing 111.

Figure 49:
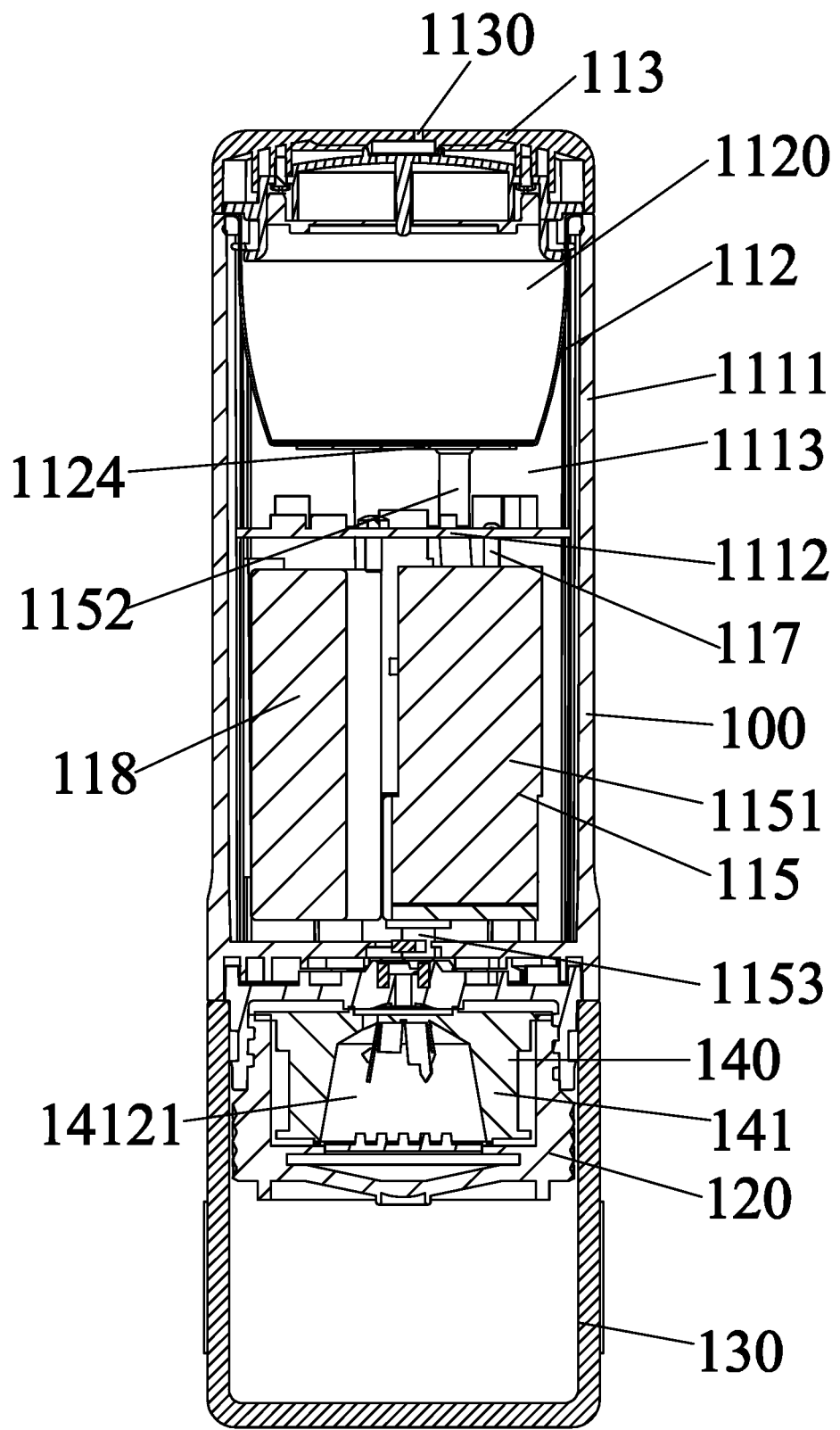
FIG. 49 is a sectional view of the portable coffee machine according to the sixth embodiment of the present invention.

As show in FIG. 49 of the drawings, the housing 111 is preferably embodied as a cylindrical structure, and a top circumferential edge portion of the water storing cup 112 is attached to a top circumferential edge portion of the housing 111 by a suitable connecting manner such as by glue bonding or welding. The water storing cavity 1120 has a cone shape having gradually reducing diameters from top towards bottom of the water storing cavity 1120.

Figure 52A:
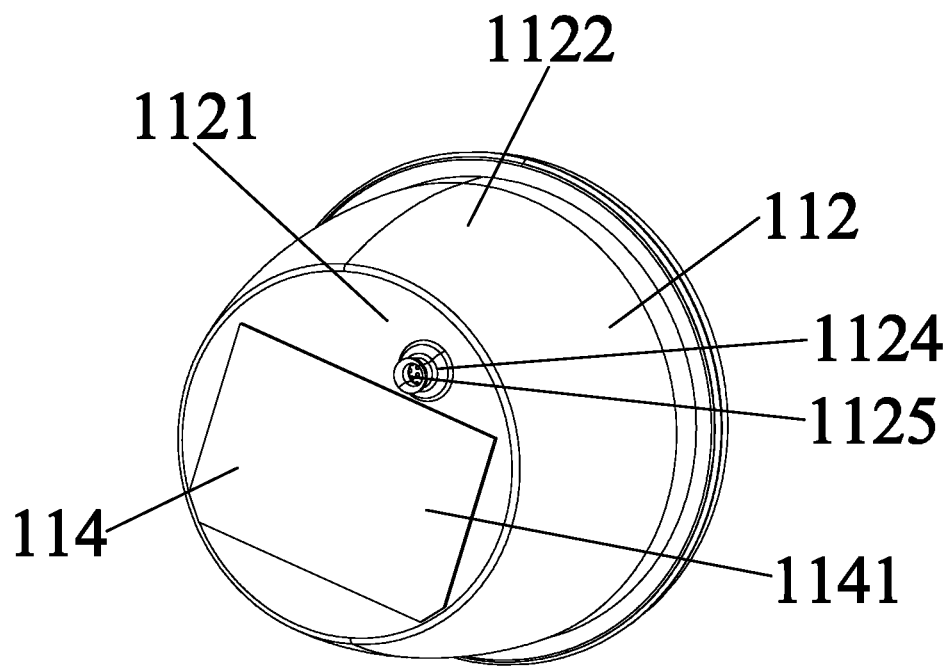
FIG. 52A is a perspective view illustrating a water storing cup of the portable coffee machine according to the sixth embodiment of the present invention.
Figure 52B:
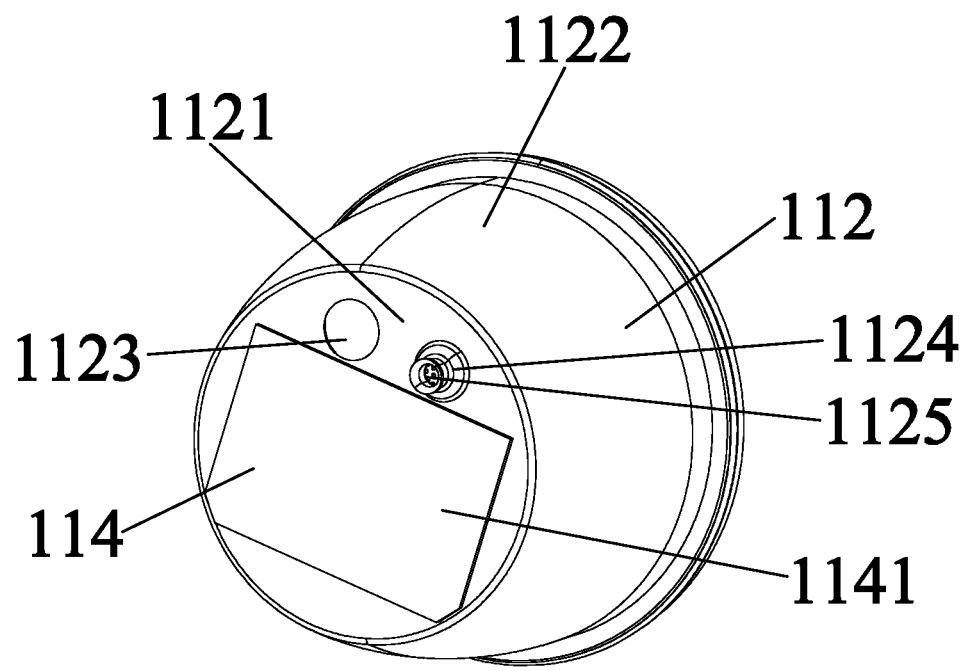
FIG. 52B is a perspective view illustrating a water storing cup of the portable coffee machine according to an alternative mode of the sixth embodiment of the present invention.
Figure 53:
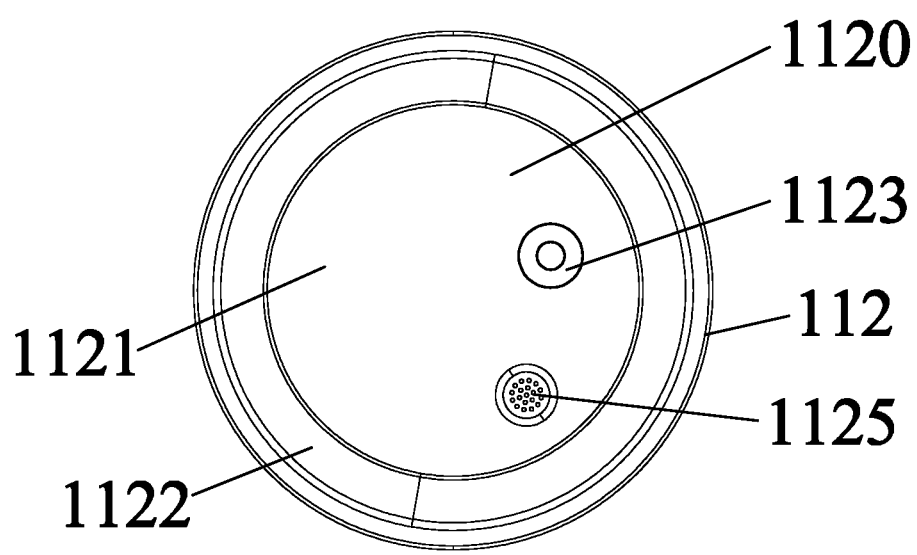
FIG. 53 is a top view illustrating the water storing cup of the portable coffee machine according to the sixth embodiment of the present invention.
Figure 54A:
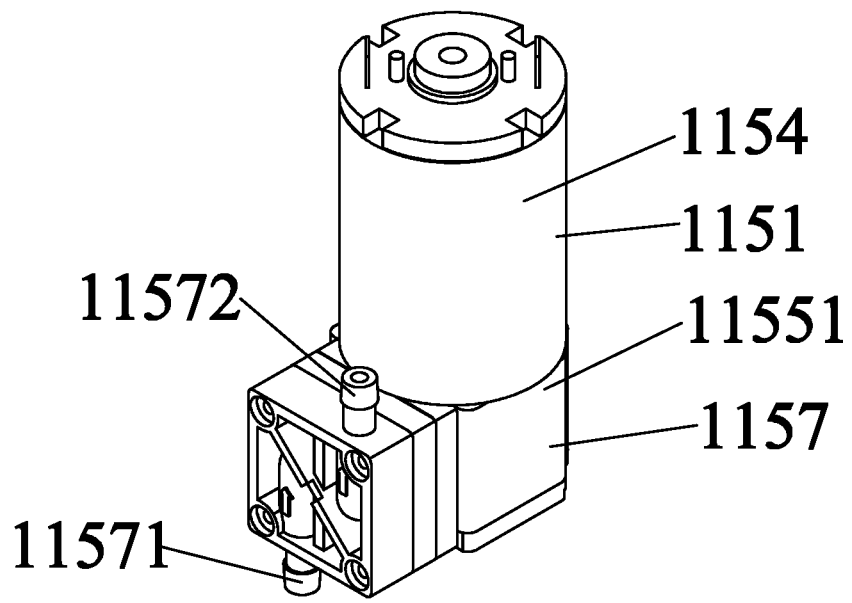
FIG. 54A is a perspective view illustrating a water pump unit of the portable coffee machine according to the sixth embodiment of the present invention.
Figure 54B:
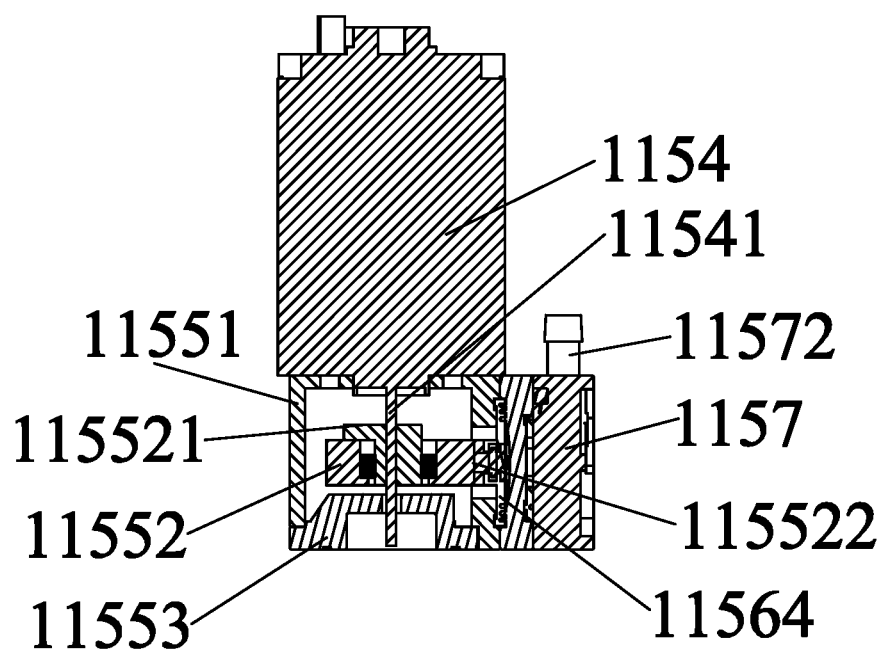
FIG. 54B is a sectional view illustrating the water pump unit of the portable coffee machine according to the sixth embodiment of the present invention.
Figure 55:
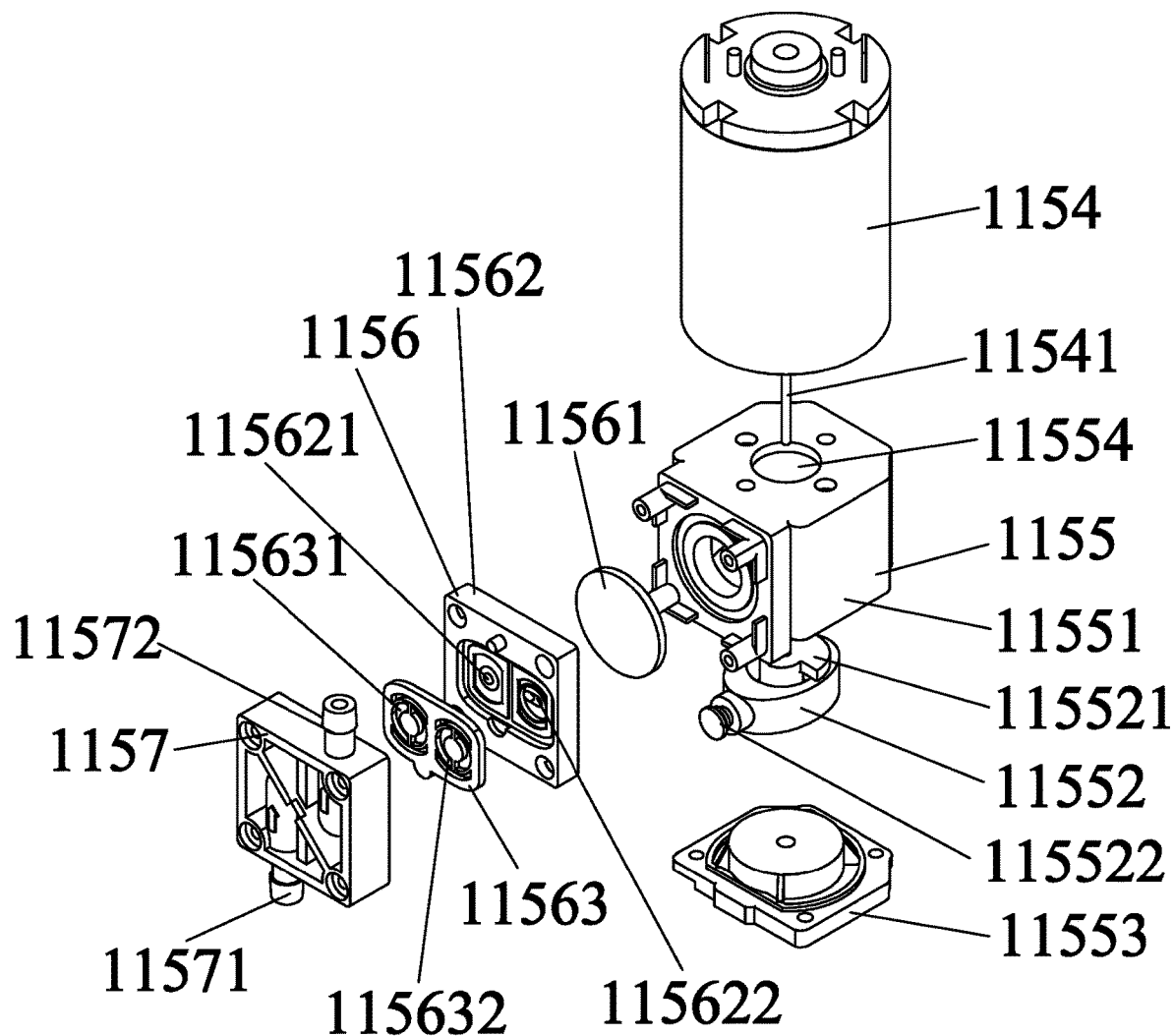
FIG. 55 is an exploded view illustrating the water pump unit of the portable coffee machine according to the sixth embodiment of the present invention.
Figure 56:
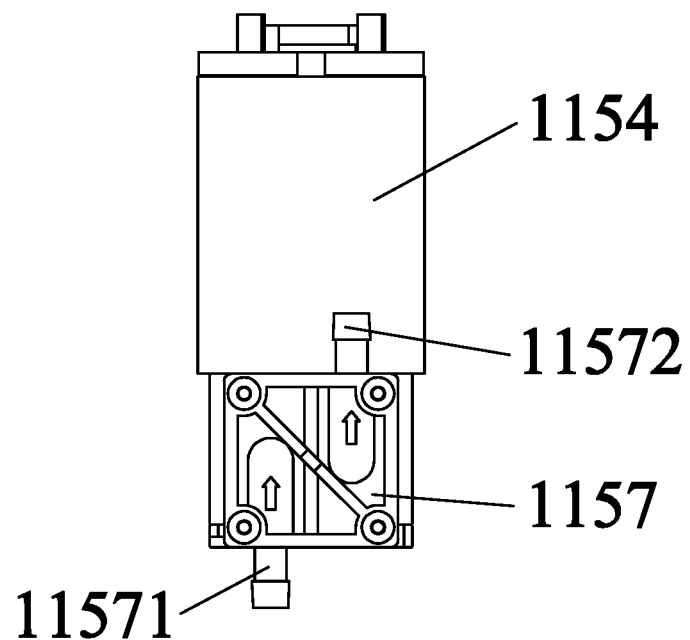
FIG. 56 is a side view illustrating the water pump unit of the portable coffee machine according to the sixth embodiment of the present invention.
Figure 57:
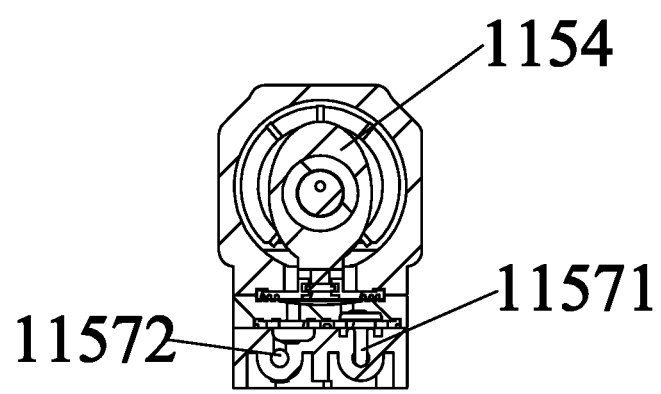
FIG. 57 is a top view illustrating the water pump unit of the portable coffee machine according to the sixth embodiment of the present invention.

As shown in FIGS. 52A and 53, the water storing cup 112 comprises a bottom wall 1121 and a surrounding wall 1122 integrally extended from the bottom wall 1121 to define the water storing cavity 1120 for storing water. Preferably, the water storing cup 112 may further comprise a water temperature senor 1123 disposed in the water storing cavity 1120 for detecting the temperature of the water in the water storing cup 112. For example, when the water temperature senor 1123 has detected that the water temperature in the water storing cavity 1120 is greater than a preset value T1, such as 81° C.-96° C., the heating module 114 for heating and boiling the water in the water storing cup 112 will be stopped. Alternatively, the water storing cup 112 may not be provided with the water temperature sensor 1123, and an air pressure sensor may be disposed in the water storing cavity 1120 for detecting the air pressure in the water storing cavity, or a temperature senor 1123 is attached to the bottom of the bottom wall 1121 for aiding to detect the water temperature in the water storing cavity 1120.

In this embodiment, the cup lid 113 comprises a flexible sealing film 1133 having a slit 1134 formed by two abutting edges 11331, when the water storing cup 112 is filled with water and the cup lid 113 is disposed on the water storing cup 112, the two abutting edges 11331 are having contact with each other, so that the water storing cavity 1120 is in a sealed state, and the water is retained between the flexible sealing film 1133 and the water storing cup 112. When the heating module 114 is activated to heat the water in the water storing cup 112, the air pressure in the water storing cavity 1120 will be increased. When the water in the water storing cavity 1120 of the water storing cup 112 is heated and boiled to produce water vapor, and the air pressure in the space between the water storing cup 112 and the sealing film 1133 is large enough, the increased air pressure will apply a pushing force to the abutting edges 11331 to pull the two abutting edges 11331 away from each other, so that the size of the slit 1134 will be increased, so as to allow the water vapor to escape from the water storing cavity 1120 and get out of the cup lid 113.

When the water in the water storing cavity 1120 is not boiled, the slit 1134 is in a closed state, so as to provide a good air tightness performance, so that the water in the water storing cavity 1120 can be quickly heated to the boil point.

Figure 50:
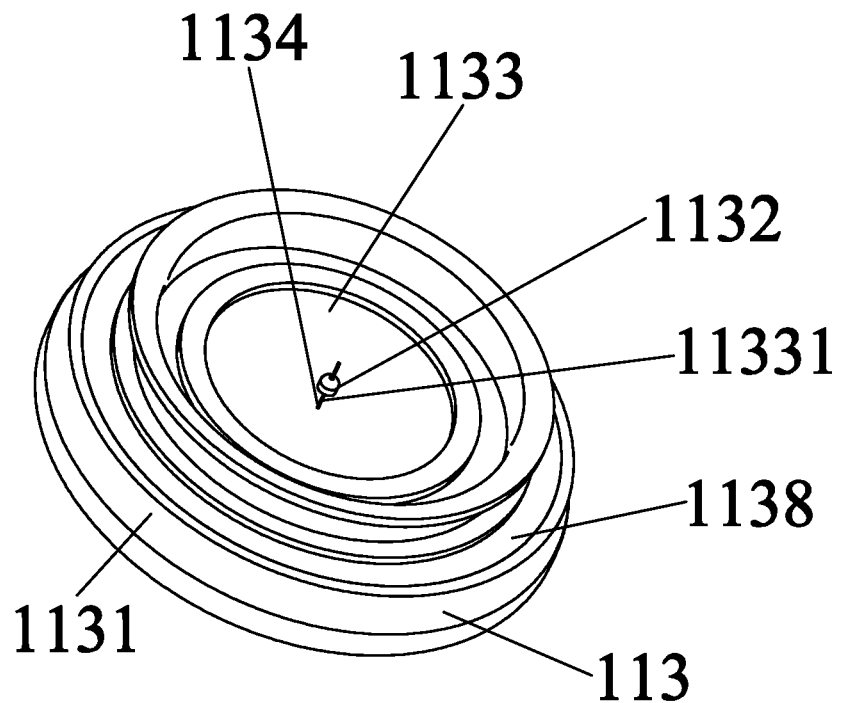
FIG. 50 is a perspective view of a cup lid of the portable coffee machine according to the sixth embodiment of the present invention.
Figure 51:
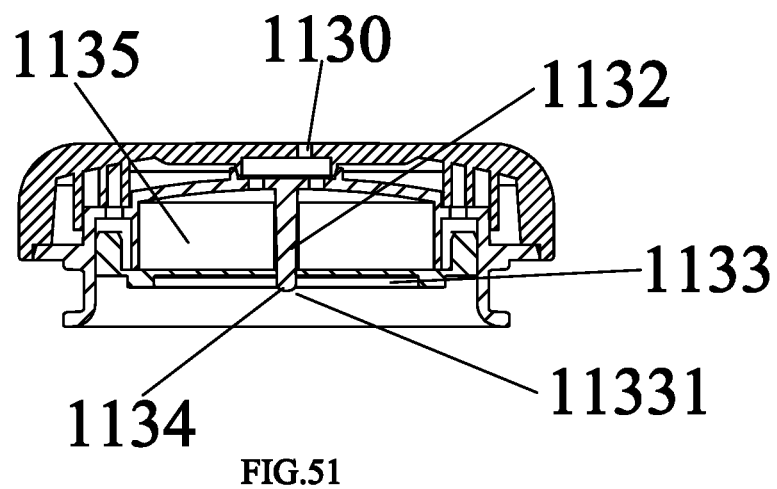
FIG. 51 is a sectional view of the cup lid of the portable coffee machine according to the sixth embodiment of the present invention.

More specifically, as shown in FIG. 50 and FIG. 51, the cup lid 113 comprises a lid boy 1131 having one or more vapor holes 1130, and a connecting column 1132, a cavity 1135 is defined between the sealing film 1133 and the lid body 1131, the vapor holes 1130 are communicated to the cavity 1135, the slit 1134 is able to communicate the cavity 1135 with the water storing cavity 1120.

When the water storing cavity 1120 of the water storing cup 112 is filled with water, and the cup lid 113 is disposed on the water storing cup 112, the water is kept between the water storing cup 112 and the cup lid 113. When the heating module 114 is activated to heat and boil the water in the water storing cup 112, water vapor discharged in the water storing cavity 1120 will result in a pressure increase in the water storing cavity 1135, so that the two abutting edges 11331 of sealing film 1133 are pushed by the water vapor to increase the size of the slit 1134 which is communicated to the cavity 1135, so that water vapor is able to discharge through the vapor holes 1130 of the cup lid 113 by passing through the cavity 1135.

In other words, when the water in the water storing cavity 1120 of the water storing cup 112 is not boiled to create a preset air pressure in the water storing cavity 1120, the slit 1134 of the sealing film 1133 is not opened for allowing the vapor to be discharged into the cavity 1135, so as to ensure the heating efficiency of the water in the water storing cavity 1120 of the water storing cup 112.

As shown in FIG. 50 of the drawings, the cup lid 113 further comprises a sealing ring 1138 wound around the lid body 1131, the sealing ring 1138 can made of a resilient material such as rubber and silicon. When the cup lid 113 is disposed on the water storing cup 112, the sealing ring 1138 is disposed into the water storing cavity 1120 and is sandwiched between the circumferential edges of the cup lid 113 and the water storing cup 112, so as to ensure the air tightness of the water storing cavity 1120.

As shown in FIGS. 49 and 52A of the drawings, the heating module 114 of this embodiment comprises a heating member 1141 which is attached to a bottom of the bottom wall 1121 of the water storing cup 112. The heating member 1141 can be any suitable heating component such a a PTC heating element, a thick film heating layer, a heating resistance wire, a heating film, a metal ceramic heating member, or the like. Accordingly, the bottom of the bottom wall 1121 of the water storing cup 112 in this embodiment provide a flat bottom surface for conveniently attaching the heating member 1141, so that the heating member 1141 is able to efficiently transfer the heat to the water in the water storing cup 112.

The water storing cup 112 further comprises a discharging portion 1124 which is connected to the bottom wall 1121 for discharging the water in the water storing cavity 1120 of the water storing cup 112. More specifically, the water storing cup 112 has a plurality of discharging holes 1125 formed in a periphery at an edge of the bottom wall 1121 by penetrating the bottom wall 1121 and the discharging portion 1124. Accordingly, by arranging the discharging portion 1124 at a peripheral position of the bottom wall 1121, the area at the bottom of the bottom wall 1121 of the water storing cup 112 for attaching the heating member 1141 is ensured, so that the heating member 1141 with a larger size can be adopted for quickly heating and boiling the water in the water storing cup 112. In other embodiments, the heating module 114 may comprise a heating member 1141 which is mounted in the water storing cavity 1120 of the water storing cup 112, or may be attached to the outer side of the surrounding wall 1122 of the water storing cup 112.

Figure 58:
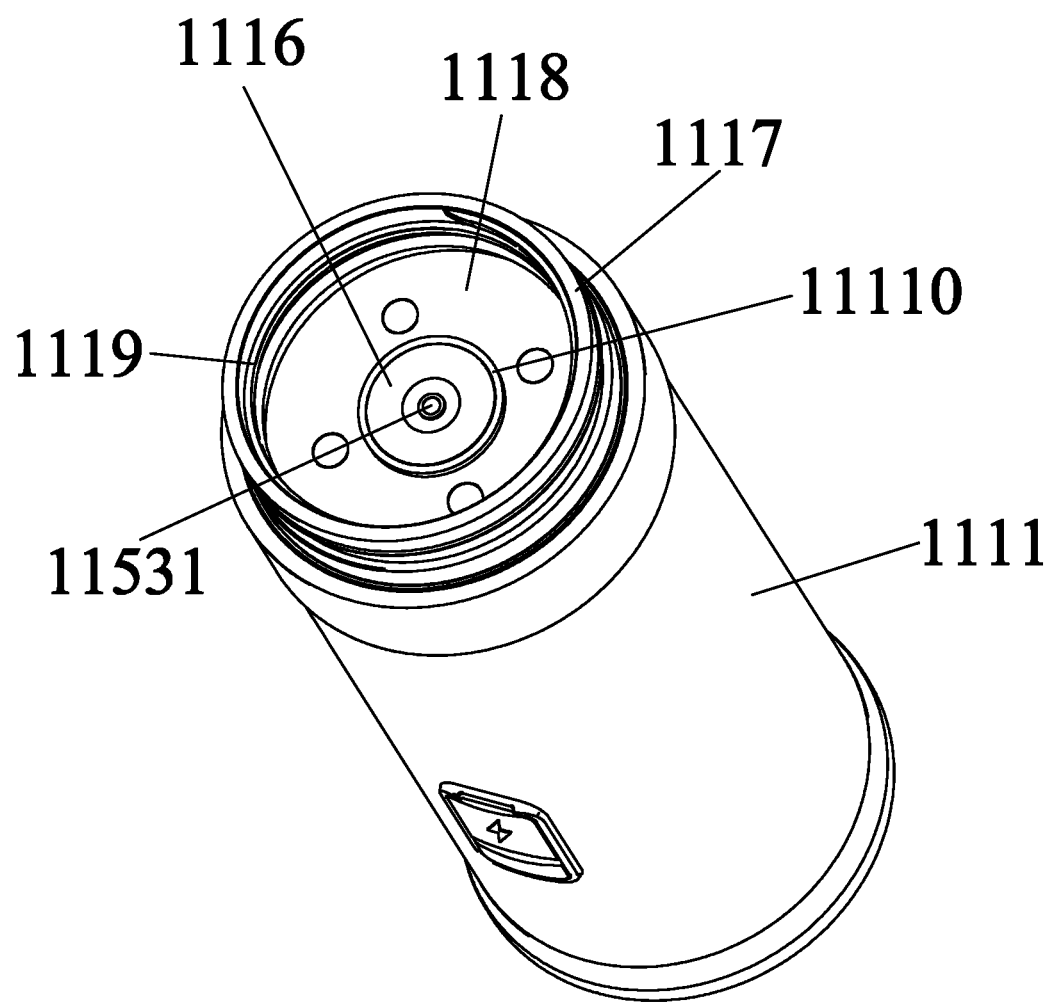
FIG. 58 is a perspective view illustrating a bottom of a housing of the portable coffee machine according to the sixth embodiment of the present invention.
Figure 59:
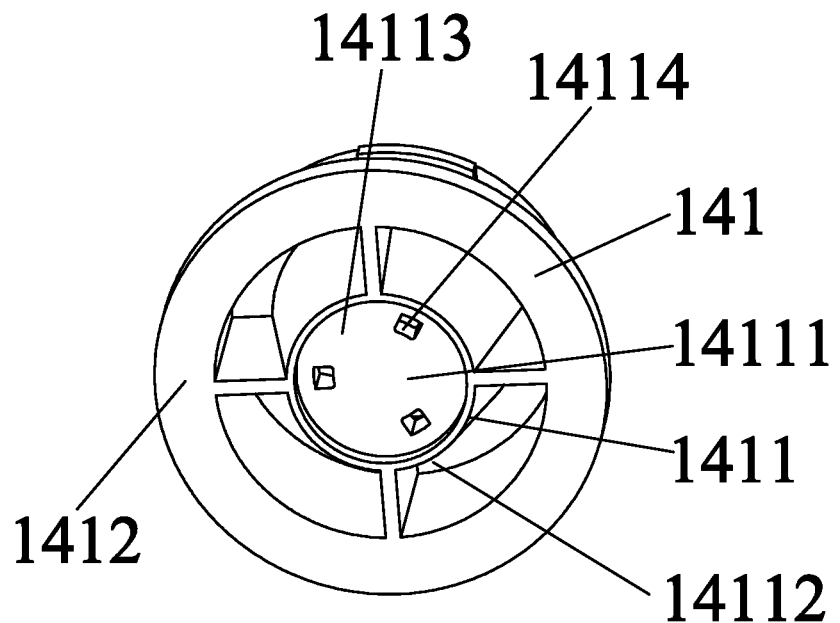
FIG. 59 is a perspective view illustrating a capsule extraction container of the portable coffee machine according to the sixth embodiment of the present invention.
Figure 60:
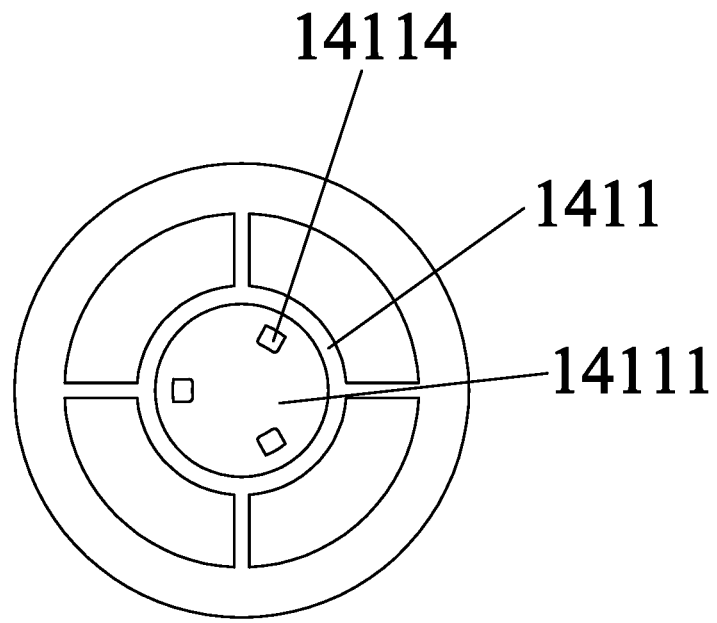
FIG. 60 is a top view illustrating the capsule extraction container of the portable coffee machine according to the sixth embodiment of the present invention.

Referring to FIG. 49 and FIGS. 54A to 57, the water pump assembly 115 comprises a water pump unit 1151, a connecting conduit 1152 which is connected between the discharging portion 1124 of the water storing cup 112 and the water pump unit 1151 for guiding the water in the water storing cup 112 int the water pump unit 1151, and a feeding conduit 1153 for feeding the water in the water pump unit 1151 into the extraction container 116 for coffee extraction. As shown in FIG. 58 of the drawings, the feeding conduit 1153 of this embodiment has a feeding outlet 11531 that is formed at a middle position of the housing 111 for communicating with the extraction assembly 140.

The connecting conduit 1151 may be a flexible tube that is mounted to the discharging portion 1124 of the water storing cup 112, or the connecting conduit 1151 may be integrally formed with the discharging portion 1124 of the water storing cup 112.

The water pump unit 1151 can be any type of pumps that can pump water, such as a positive displacement pump, a rotary displacement pump, a dynamic pump, a centrifugal pump, a reciprocating pump, a diaphragm pump, a submersible pump, and a peristaltic pump.

In this embodiment, the water pump unit 1151 comprises an operation motor 1154 having a driving shaft 11541, a motion transmission element 1155, a pump element 1156 and a water guiding element 1157. When the operation motor 1154 is activated, the driving shaft 11541 will be driven to rotate, and the rotation will be transmitted to the pump element 1156 by the motion transmission element 1155, so as to drive the water guiding element 1157 to suck in water from the water storing cavity 1120 and discharge the water towards the extraction assembly 140.

More specifically, the motion transmission element 1155 comprises a casing 11551, a driving unit 11552 comprising an eccentric member 115521 and a linkage member 115522 connected to the eccentric member 115521, and a sealing member 11553 mounted at a bottom of the casing 11551 to define a chamber 11554 for receiving the driving unit 11552. The driving shaft 11541 is also rotatably mounted to the sealing member 11553, so that the sealing member 11553 ensures the stable rotation of the driving shaft 11541.

The pump element 1156 comprises a diaphragm member 11561 connected to the linkage member 11552, a water transition plate 11562, and a channel member 11563. The diaphragm member 11561 is attached to the water transition plate 11562 to define a transition chamber 11564 between the diaphragm member 11561 and the water transition plate 11562. The water transition plate 11562 has an inlet 115621 and an outlet 115622, the inlet 115621 and the outlet 115622 are communicated to the transition chamber 11564. The channel member 11563 is made of flexible material and has an inlet channel 115631 and an outlet channel 115632, the inlet channel 115631 is communicated to the inlet 115621 of the water transition plate 11562 and the outlet channel 115632 is communicated to the outlet 115622 of the water transition plate 11562.

The water guiding element 1157 comprises an inlet portion 11571 and an outlet portion 11572, the inlet portion 11571 is connected to the water storing cup 112 by the connecting conduit 1152, the outlet portion 11572 is connected to the feeding conduit 1153.

Accordingly, when the operation motor 1154 is activated, the driving shaft 1152 will drive the eccentric member 115521 to rotate, and the linkage member 115522 is driven by the eccentric member 115521 to reciprocate, so as to drive the diaphragm member 11562 to deform, so as to create pressure change in the transition chamber 11564 between the diaphragm member 11562 and the water transition plate 11562, so as to suck water from the water storing cavity 1120 of the water storing cup 112 into the transition chamber 11564 and discharge the water in the transition chamber 11564 to the extraction assembly 140.

More specifically, when the water pump unit 1151 is in operation, the water from the water storing cavity 1120 of the water storing cup 112 is sucked into the inlet portion 11571 of the water guiding element 1157 through the connecting conduit 1152, so that water pass through the inlet channel 115631 and the inlet 115621 of the water transition plate to enter the transition chamber 11564.

The water in the transition chamber 11564 between the diaphragm member 11562 and the water transition plate 11562 will get out of the transition chamber 11564 through the outlet 115622 of the water transition plate 11562, and then the water will pass through the outlet channel 115632 of the channel member 11563 and reach the outlet portion 11572 of the water guiding element 1157, so that the water in the water pump unit 1151 can be feed to the extraction assembly 140 by the feeding conduit 1153 which is connected to the outlet portion 11572 of the water guiding element 1157.

The feeding conduit 1153 has a feeding outlet hole 11531 which is provided at a center of the housing 111, so that water from the outlet portion 11572 of the water guiding element 1157 at a peripheral position in the housing 111 is guided to a center position for discharging through the central feeding outlet hole 11531.

In this embodiment, the extraction assembly 140 is detachably coupled to the housing 111. The housing 111 comprises a resilient protrusion 1116 provided at a bottom thereof, the feeding outlet hole 11531 is formed in the center of the resilient protrusion 1116 for water discharging. The housing 111 further comprises a retention ring 11110 which is also resilient and is provided at an outer side of the resilient protrusion 1116 to retain the resilient protrusion 1116 in position and prevent the unwanted excessive deformation of the resilient protrusion 1116 when the extraction assembly 140 is coupled to housing 111 by biasing against the resilient protrusion 1116.

As shown in FIG. 49 and FIGS. 59 to 62 of the drawings, in this embodiment, the extraction assembly 140 comprises a capsule extraction container 141 for receiving a coffee capsule. The capsule extraction container 141 comprises a top engaging portion 1411 for engaging with the bottom of the housing 111, a capsule retaining portion 1412 having an extraction cavity 14121 for receiving the coffee capsule, and a blade assembly 1413 for piercing the coffee capsule.

More specifically, the top engaging portion 1411 is protruded from the capsule retaining portion 1412 and comprises a bottom wall 14111, a surrounding wall 14112 connected to the bottom wall 14111 to define an indented groove 14113, a plurality of inlets 14114 is formed in the bottom wall 14111 of the top engaging portion 1411.

When the capsule extraction container 141 is attached to the housing 111, the top engaging portion 1411 is attached to the resilient protrusion 1116 of the housing 111 to ensure a tight connection therebetween, so that the feeding outlet hole 11531 is communicated to the indented groove 14113 between the top engaging portion 1411 of the capsule extraction container 141 and the resilient protrusion 1116 of the housing 111, so that water from the water pump unit 1511 is able to enter the indented groove 14113 through the feeding outlet hole 11531 of the feeding conduit 1153, so as to further enter the extraction cavity 14121 of the capsule retaining portion 1412.

In this embodiment, three inlets 14114 are formed around a circumferential edge of the bottom wall 14111, so that when water in the water storing cup 112 is pumped into the indented groove 14113, the water will evenly enter the extraction cavity 14121 of the capsule retaining portion 1412 through the three inlets 14114 which are communicated to the extraction cavity 14121.

The blade assembly 1413 comprises a base 14131 and a plurality of blades 14132 which are extended from the base 14131 for piercing a top of the coffee capsule in the extraction cavity 14121 of the capsule retaining portion 1412, so that hot water can flow into the coffee capsule for coffee extraction.

Figure 61:
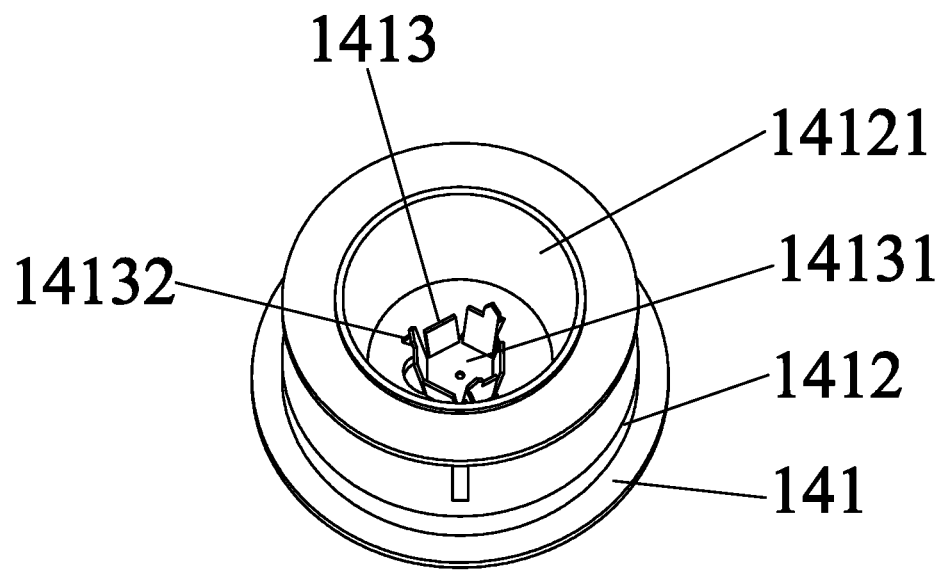
FIG. 61 is another perspective view illustrating the capsule extraction container of the portable coffee machine according to the sixth embodiment of the present invention.
Figure 62:
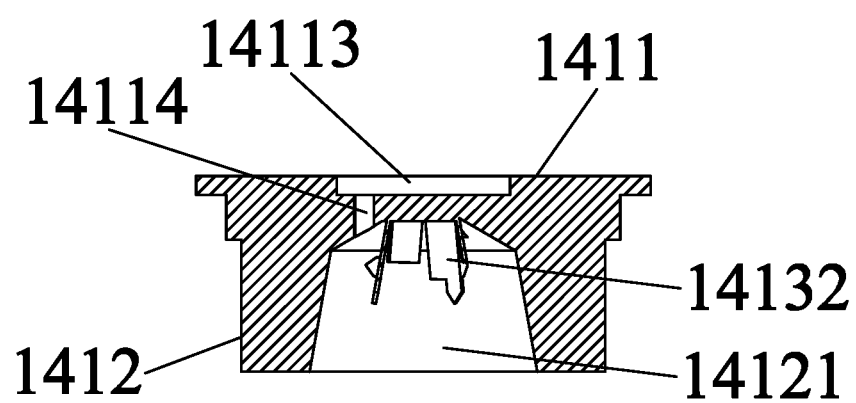
FIG. 62 is sectional view illustrating the capsule extraction container of the portable coffee machine according to the sixth embodiment of the present invention

As shown in FIG. 61 of the drawings, three blades 14132 are arranged in a circumferential direction, and each blade 14132 is provided under the corresponding inlet 14114 of the top engaging portion 1411, so that hot water enters the extraction cavity 14121 through the inlets 14114 will reach the pierced positions on the coffee capsule by the corresponding blades 14132, so as to facilitate the hot water to enter into the coffee capsule for coffee extraction.

The extraction cavity 14121 of the capsule retaining portion 1412 is preferred to be constructed to have a cone shape which has increasing diameters from the top engaging portion 1411 to the bottom end of the capsule retaining portion 1412, so as to fit with the shape of the coffee capsule, and facilitate the hot water to flow from the top towards the bottom for extraction coffee in the coffee capsule.

Referring to FIG. 49 and FIGS. 63 to 65 of the drawings, the transferring cup 120 can be detachably coupled to the extraction assembly 140. More specifically, the capsule extraction container 141 is disposed in the transferring cup 120 to seal a bottom of extraction cavity 14121 of the capsule retaining portion 1412 for storing and retaining the coffee capsule in the extraction cavity 14121 of the capsule retaining portion 1412. Accordingly, the coffee capsule can be put in the transferring cup 120 and then the transferring cup 120 can be assembled to the capsule extraction container 141, or the coffee capsule can be inserted into the capsule extraction container 141, and then the capsule extraction container 141 is put into the transferring cup 120, so that the coffee capsule is guided into the extraction cavity 14121 of the capsule retaining portion 1412 of the capsule extraction container 141, so as to retain the coffee capsule between the transferring cup 120 and the capsule extraction container 141.

Figure 63:
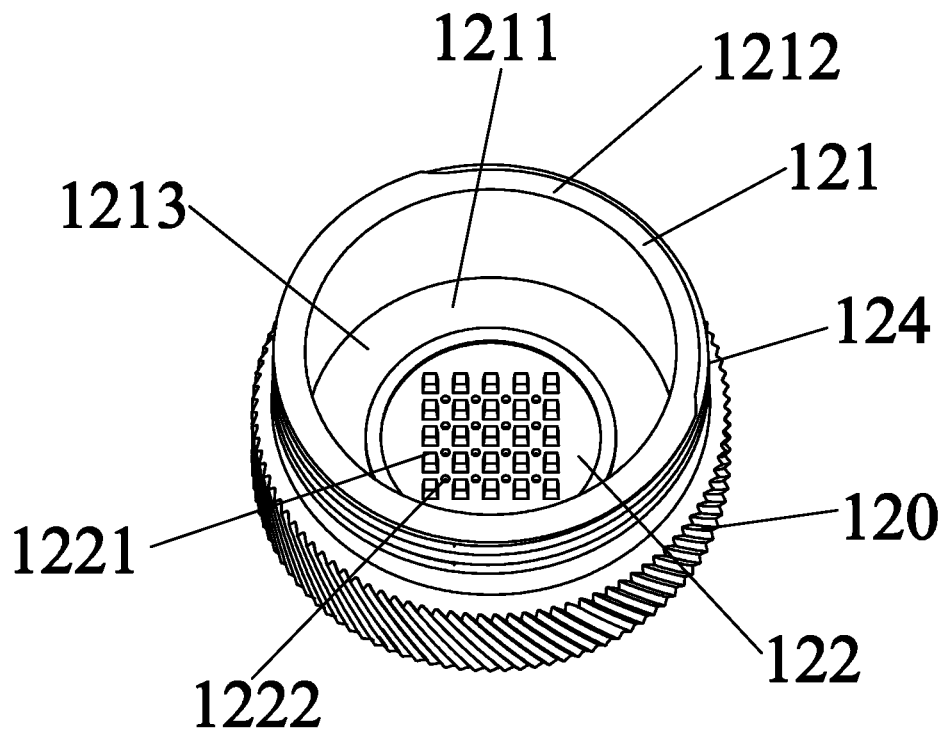
FIG. 63 is a perspective view illustrating a transferring cup of the portable coffee machine according to the sixth embodiment of the present invention.
Figure 64:
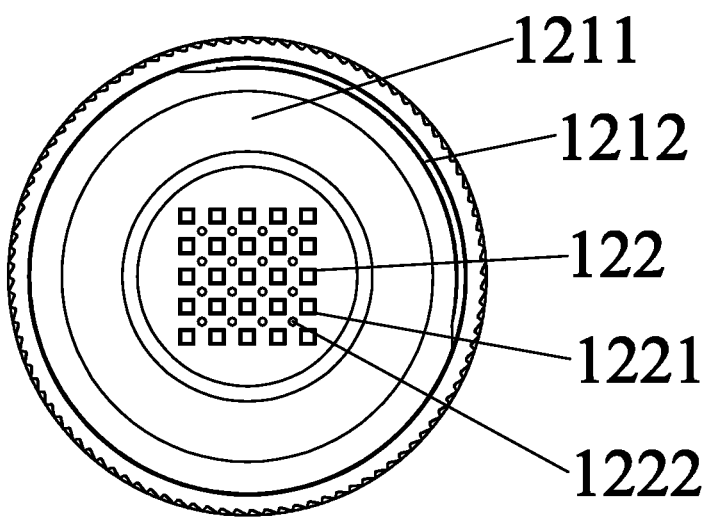
FIG. 64 is a top view illustrating the transferring cup of the portable coffee machine according to the sixth embodiment of the present invention
Figure 65:
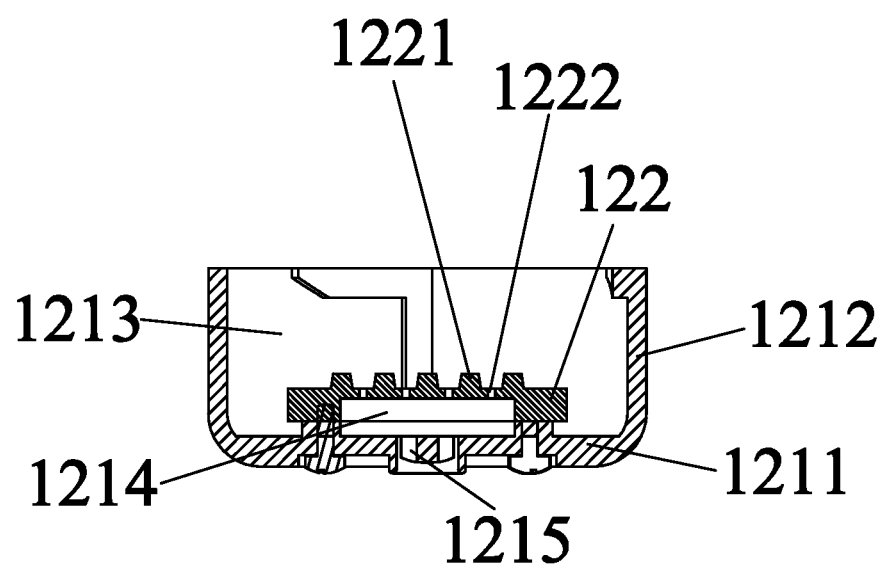
FIG. 65 is a sectional view illustrating the transferring cup of the portable coffee machine according to the sixth embodiment of the present invention.

More specifically, as shown in FIGS. 63 to 65, the transferring cup 120 comprises a cup body 121 and a sealing portion 122 which is integrally protruded from the cup body 121. The cup body 121 comprises a bottom wall 1211 and a surrounding wall 1212 integrally extended from the bottom wall 1211 to define a receiving chamber 1213, the sealing portion 122 of this embodiment is extended into the receiving chamber 1213 and is protruded from the bottom wall 1211 of the cup body 121.

With reference to FIG. 49 of the drawings, according to this embodiment, the sealing portion 122 of the transferring cup 120 can be aligned with the extraction cavity 14121 of the capsule retaining portion 1412 of the capsule extraction container 141 to seal the coffee capsule in the capsule extraction container. The sealing portion 122 further comprises a plurality of protrusions 1221 and has a plurality of discharge outlet holes 1222 which are arranged to communicate the extraction cavity 14121 of the capsule retaining portion 1412 of the capsule extraction container 1411 to a coffee receiving cavity 131 of the coffee cup 130.

As shown in FIG. 65 of the drawings, the bottom wall 1211 of the cup body 121 further has a collecting chamber 1214 formed below the sealing portion 122 and is communicated to the discharge outlet holes 1222 of the sealing portion 12, as well as a central outlet 1215 communicated to the collecting chamber 1214, and the coffee flow enters the collecting chamber 1214 through the discharge outlet holes 1222 of the sealing portion 12 will finally discharge trough the central outlet 1215 at a bottom of the collecting chamber 1214 into the coffee receiving cavity 131 of the coffee cup 130.

It is worth mentioning that the central outlet 1215 at the bottom wall 1211 of the cup body 121 of the transferring cup 120 is provided at a central position, and the inlets 14114 of the top engaging portion 1411 are provided at peripheral edge of the bottom wall 14111, so that the central outlet 1215 at the bottom wall 1211 of the cup body 121 of the transferring cup 120 is not aligned with the inlets 14114 of the top engaging portion 1411, so as to prevent the water flow to directly flow through the inlets 14114 of the top engaging portion 1411 towards the central outlet 1215 at the bottom wall 1211 of the cup body 121 of the transferring cup 120, so that water in the extraction cavity 14121 is able to completely achieve the coffee extraction with the coffee capsule.

In addition, when the coffee capsule is inserted into the extraction cavity 14121 of the capsule retaining portion 1412 of the capsule extraction container 141, the coffee capsule is retained by the blade assembly 1413 and the protrusions 1221, so that the blades 14131 and the protrusions 1221 are able to be puncture the coffee capsule, so that the water flow from the water pump unit 1151 will flow into the coffee capsule to extract coffee and then flow out of the coffee capsule and is finally guided into the coffee cup 130 through the central outlet 1215 of the transferring cup 120, so as to prepare a cup of coffee for the user. It is worth mentioning that each of the protrusions 1221 is preferred to have a top flat surface and is not formed with a tip end, so that only when the coffee capsule is retained between the blades 14131 and the protrusions 1221, and the water pump unit 1151 is in operation to pump water in the extraction cavity 14121 to apply a force to the coffee capsule, the bottom of the coffee capsule is pierced by one or more of the protrusions 1221. In addition, each of the protrusions 1221 can be embodied to have a trapezoidal shape or cone shape.

The capsule extraction container 141 is shaped to be fitted into the transferring cup 120, and the transferring cup 120 is detachably coupled to the housing 111 by a suitable connecting manner. As shown in FIG. 63 and of the drawings, the transferring cup 120 further comprises a plurality of engaging threads 124 provided at an outer side of the surrounding wall 1212 of the cup body 121, as shown in FIG. 58 of the drawings, the housing 111 further comprises a bottom coupling portion 1117 which has a ring shape and define a coupling groove 1118, the resilient protrusion 1116 is disposed in the coupling groove 1118, the top engaging portion 1411 of the capsule extraction container 141 can be disposed into the coupling groove 1118.

In addition, a plurality of engaging threads 1119 is formed at an inner side of the bottom coupling portion 1117 for detachably coupling with the engaging threads 124 at the surrounding wall 1212 of the cup body 121 of the transferring cup 120.

Figure 66:
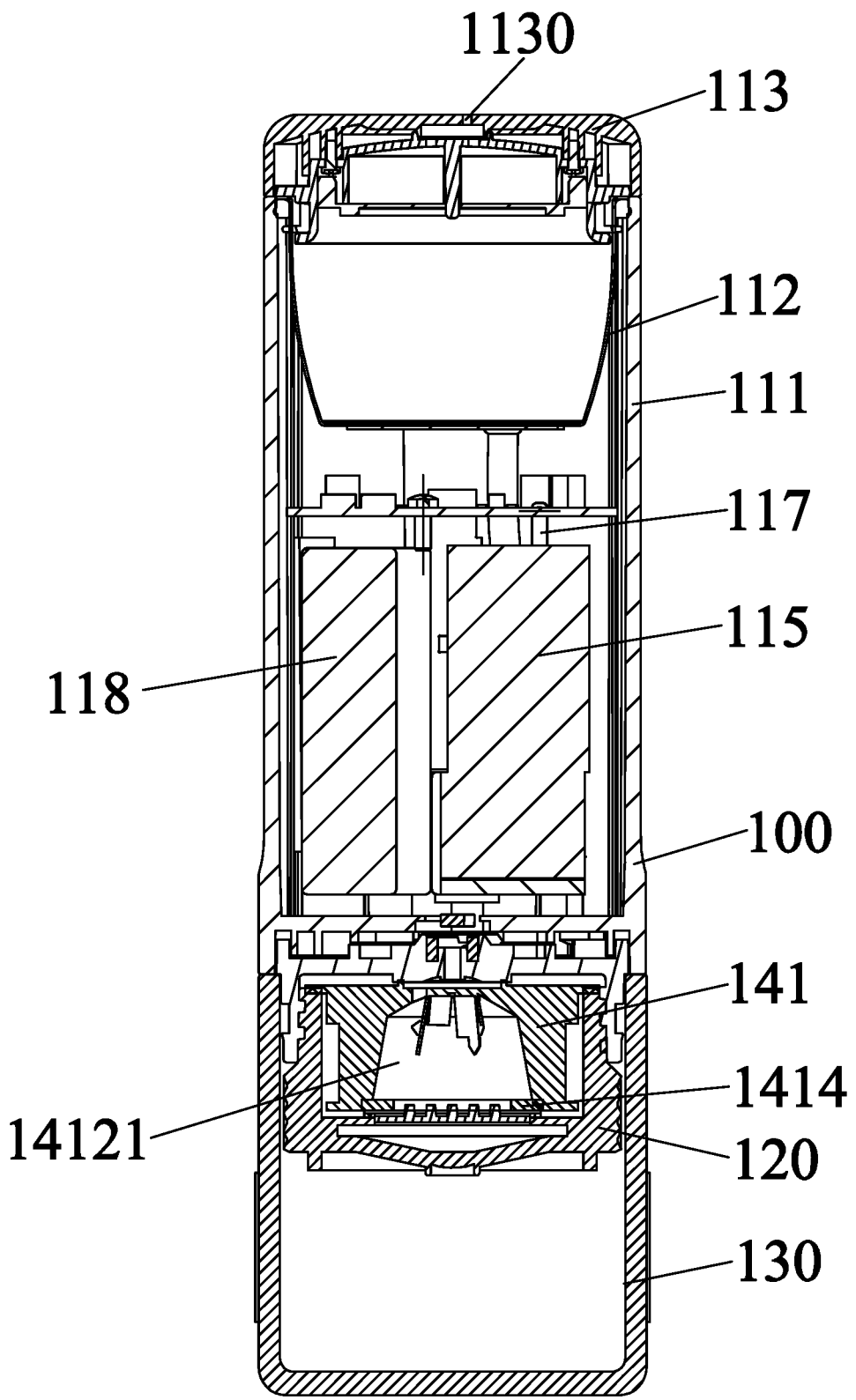
FIG. 66 is a sectional view illustrating a portable coffee machine according to an alternative mode of the sixth embodiment of the present invention.
Figure 67:
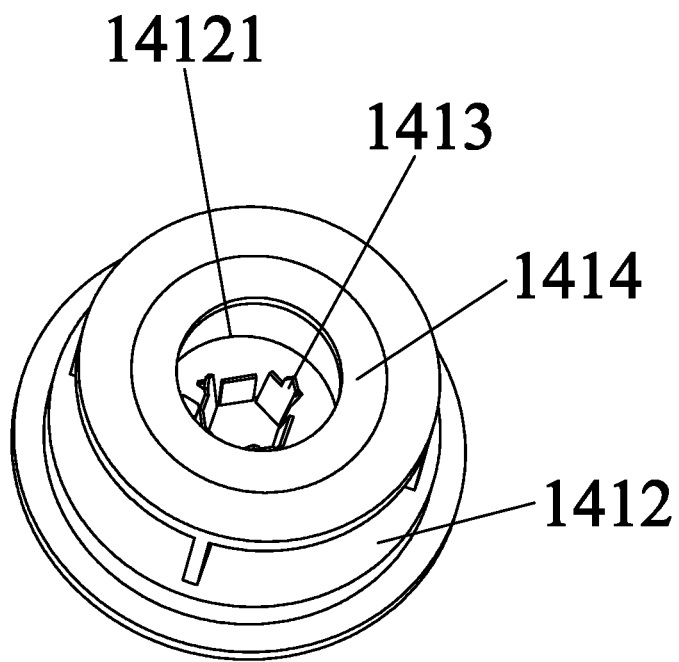
FIG. 67 is a perspective view illustrating a capsule extraction container of the portable coffee machine according to the alternative mode of the sixth embodiment of the present invention.
Figure 68:
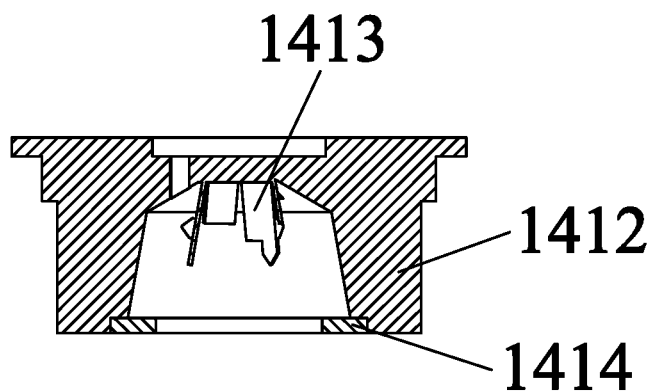
FIG. 68 is a sectional view illustrating the capsule extraction container of the portable coffee machine according to the alternative mode of the sixth embodiment of the present invention.
Figure 69:
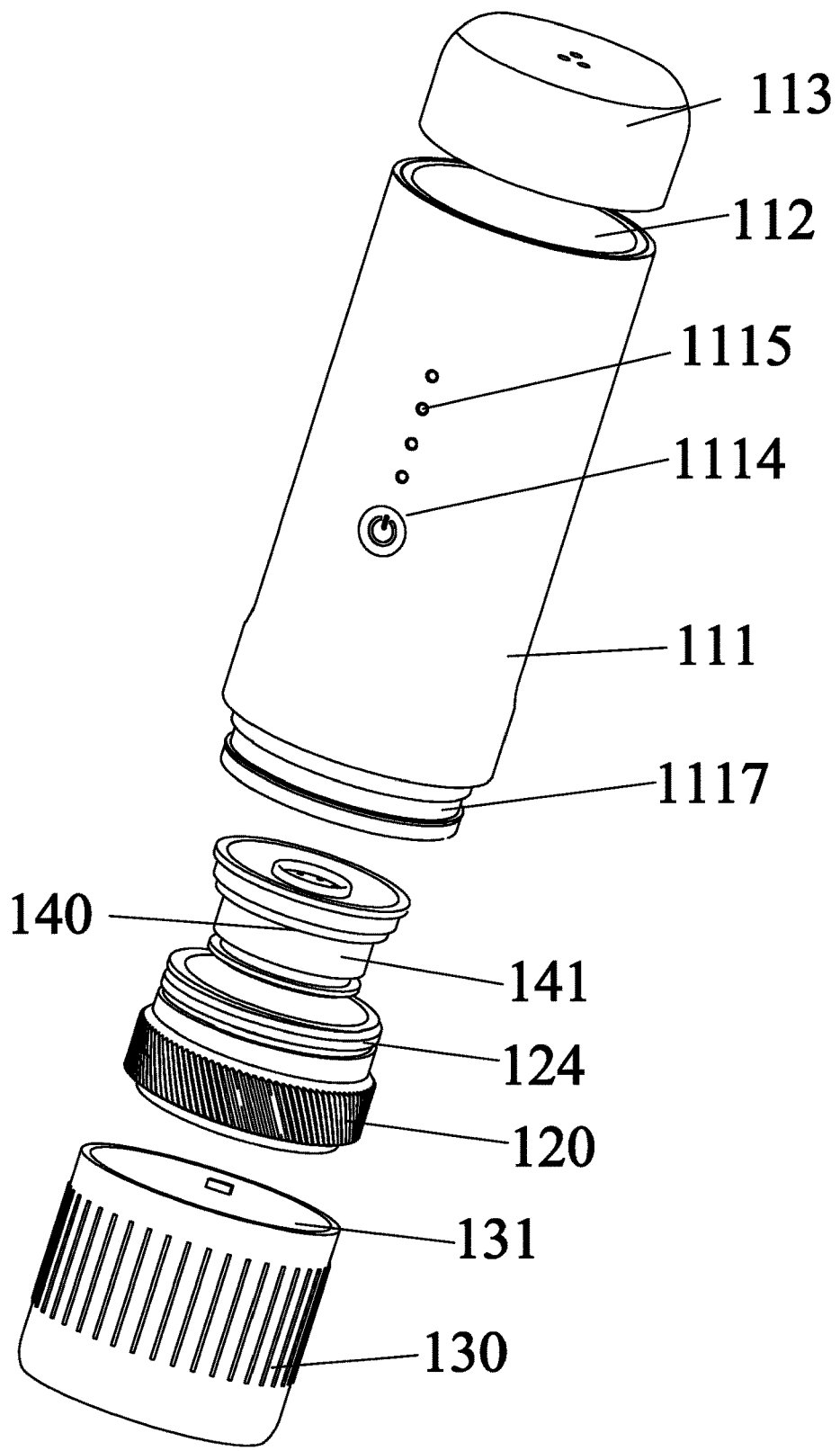
FIG. 69 is an exploded view of a portable coffee machine according to a seventh embodiment of the present invention.
Figure 70:
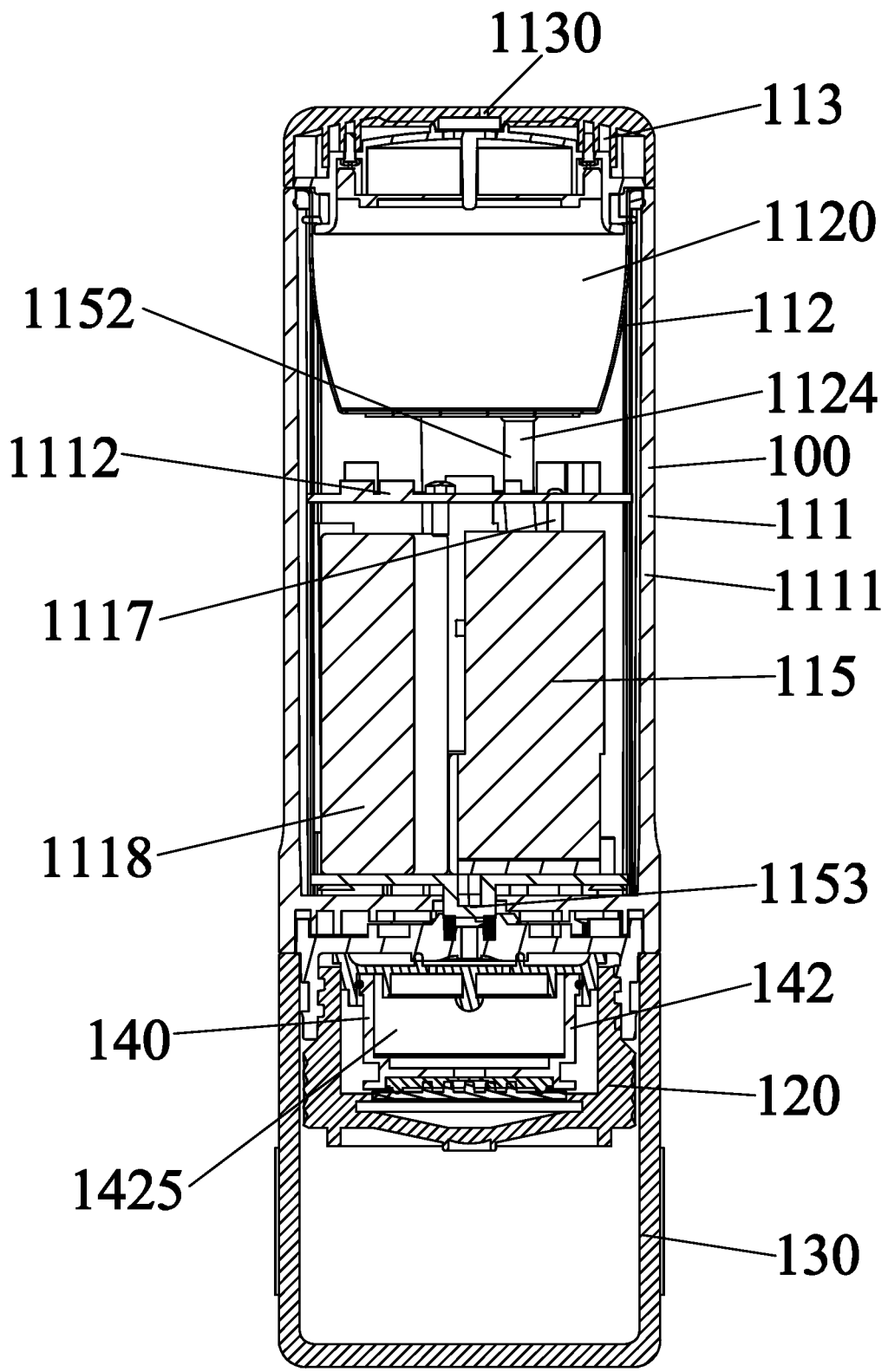
FIG. 70 is a sectional view of the portable coffee machine according to the seventh embodiment of the present invention.

As shown in FIGS. 66 to 68 of the drawings, according to an alternative mode, the capsule extraction container 141 further comprises a resilient retaining ring 1414 which is provided at a bottom of the capsule retaining portion 1412, the resilient retaining ring 1414, which is made of rubber or silicon gel, is able to enhance the firmly sealing between the capsule extraction container 141 and the transferring cup 120, but also functions to retain the coffee capsule in a central position when the capsule extraction container 141 containing the coffee capsule is disposed in the transferring cup 120, so that the blades 14132 of the blade assembly 1413 will be evenly distributed above the coffee capsule for piercing the coffee capsule, so that coffee extraction performance is enhanced. In addition, by the introduction of the retaining ring 1414, the assembling of the capsule extraction container 141 with the transferring cup 120 is also convenient and not easy to detach from each other.

It is worth mentioning that the transferring cup 120 and the housing 111 are detachably coupled with the threads 124 and 1119, so that the engaging manner is easy and convenient for a user to operate. In addition, by arranging the transferring cup 120 to engage with the housing 111 instead of the capsule extraction container 141, the capsule extraction container 141 is received in the transferring cup 120, the air tightness within capsule extraction container 141 is also ensured.

The person of ordinary skilled in the art should understand that in other embodiments, it is also possible to detachably couple the capsule extraction container 141 with the housing 111, and the transferring cup 120 is detachably assembled with the capsule extraction container 141. In addition, the detachable coupling between the transferring cup 120 and the housing 111 can be achieved in other manners, a resilient sealing ring may also be provided between the transferring cup 120 and the housing 111.

Similar to the above embodiments, the housing 111 further comprises a switch 1114 which is embodied as a button that is electrically connected to the controller 117 for controlling the operation of the portable coffee machine, and one or more indicator lights 1115 for indicating the temperature of the water in the water storing cavity 1120 of the water storing cup 112. The person of ordinary skilled in the art should understand that the switch also can be a touch screen, a rotation knob, a sliding switch, or a voice controller. The power module 118 comprises a rechargeable battery for supplying power to the controller 177, the heating module 114 and the water pump assembly 115, so as to allow the user to carry the portable coffee machine during outdoor activities such as travelling and camping.

The manner of activating the operation of the portable coffee machine can be achieved by programming the control manner of the switch 1114. For example, when the button is pressed for a predetermined time period, such as 2-5 seconds, the heating module 114 is activated to heat the water in the water storing cavity 1120 of the water storing cup 112, and when the water in the water storing cavity 1120 of the water storing cup 112 is heated to a preset temperature, the operation of the heating module 114 is stopped and the water pump unit 1151 is automatically activated to pump the boiled water in the water storing cup 112 into the capsule extraction container 141 for coffee extraction, and finally, coffee flow will flow into the coffee cup 130 through the central outlet 1215 of the transferring cup 120.

The person of ordinary skilled in the art should understand that the controlling manner is not limiting. For instance, the button is repeatedly pressed for two times to activate the heating module 114. As another example, when the water storing cup 112 is filled with boiled water, the button may be repeatedly pressed for three times to activate the water pump assembly 115 without activating the heating module 114.

Example 7

Referring to FIGS. 69 to 76 of the drawings, a portable coffee machine 100 according to a seventh embodiment of the present invention is illustrated, the portable coffee machine 100 comprises a machine body 110, an extraction assembly 140 detachably coupled to the machine body 110 for receiving coffee powder, a transferring cup 120 detachably coupled to the extraction assembly 140, and a coffee cup 130 detachably coupled to the transferring cup 120, the machine body 110 can prepare and deliver boiled water into the extraction assembly 140 for coffee extraction, and the produced coffee will pass through the transferring cup 120, so as to be collected in the coffee cup 130 for the user to drink.

In this embodiment, the extraction assembly 140 comprises a powder extraction container 142 which comprises a cover body 1422 and a container body 1424, the cover body 1422 is detachably coupled with the container body 1424 to define an extraction cavity 1425 for receiving coffee powder.

Figure 71:
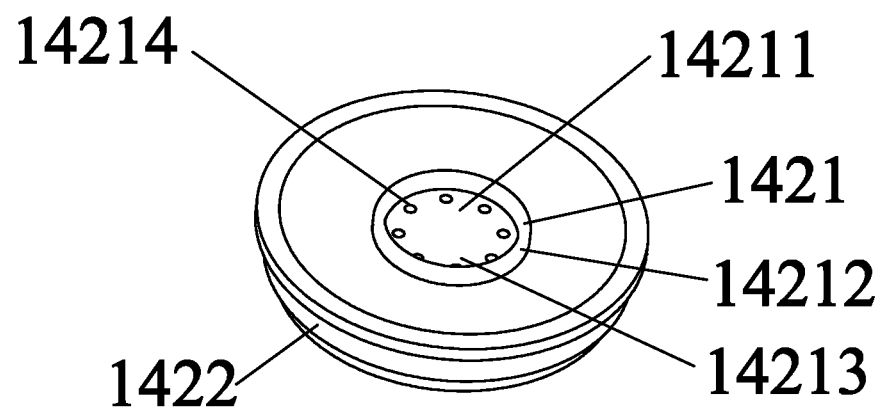
FIG. 71 is a perspective view illustrating a cover body of a powder extraction container of the portable coffee machine according to the seventh embodiment of the present invention.
Figure 72:
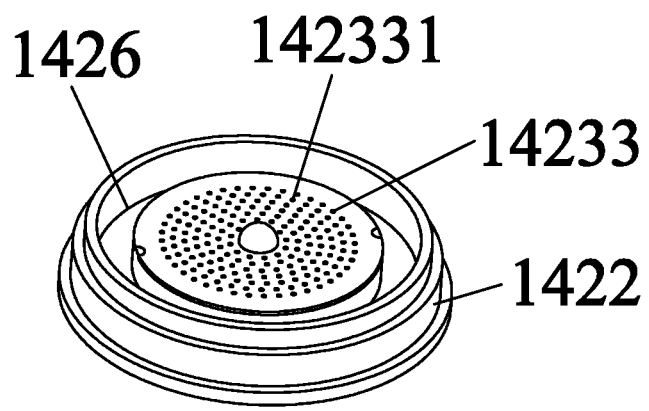
FIG. 72 is another perspective view illustrating the cover body of the powder extraction container of the portable coffee machine according to the seventh embodiment of the present invention.
Figure 73:
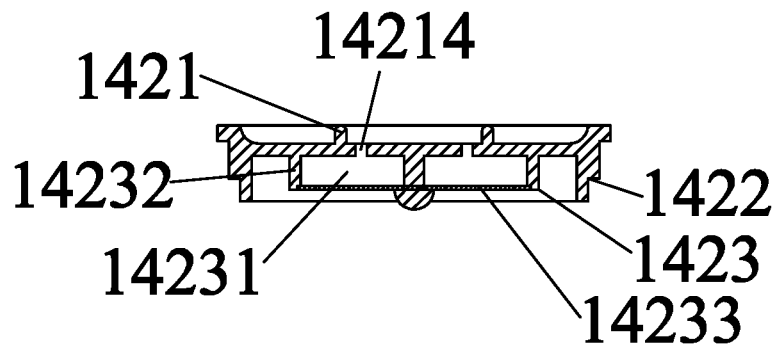
FIG. 73 is a sectional view illustrating the cover body of the powder extraction container of the portable coffee machine according to the seventh embodiment of the present invention.

More specifically, as shown in FIGS. 71 to 73, the powder extraction container 142 further comprises a top engaging portion 1421 which is protruded from a top of the cover body 1422. The top engaging portion 1421 comprises a bottom wall 14211, a surrounding wall 14212 connected to the bottom wall 14211 to define an indented groove 14213, a plurality of inlets 14214 is formed in the bottom wall 14211 of the top engaging portion 1421.

When the powder extraction container 142 is attached to the housing 111, the top engaging portion 1421 is attached to the resilient protrusion 1116 of the housing 111 to ensure a tight connection therebetween, so that the feeding outlet hole 11531 is communicated to the indented groove 14213 between the top engaging portion 1421 of the powder extraction container 142 and the resilient protrusion 1116 of the housing 111, so that water from the water pump unit 1511 is able to enter the indented groove 14213 through the feeding outlet hole 11531 of the feeding conduit 1153, so as to further enter the extraction cavity 1425 of the powder extraction container 142.

In this embodiment, eight inlets 14214 are shown to be formed around a circumferential edge of the bottom wall 14211, so that when water in the water storing cup 112 is pumped into the indented groove 14213, the water will evenly enter the extraction cavity 1425 of the powder extraction container 142 through the eight inlets 14114 which are communicated to the extraction cavity 1425.

The powder extraction container 142 further comprises a transition container 1423 which is disposed in the cover body 1422 under the top engaging portion 1421, the transition container 1423 has a transition cavity 14231, and the inlets 14214 of the top engaging portion 1421 are communicated to the transition cavity 14231.

In this embodiment, the transition container 1423 comprises an enclosing wall 14232 and a backflow preventing layer 14233 at the bottom of the enclosing wall 14232. The backflow preventing layer 14233 is coupled to the enclosing wall 14232 to define the transition cavity 14231. Accordingly, hot water from the water pump assembly 115 is directed into the indented groove 14213 of the top engaging portion 1421, and then is guided into the transition cavity 14231 of the transition container 1423 through the inlets 14214 in the bottom wall 14211 of the top engaging portion 1421, and then pass through the backflow preventing layer 14233 to enter the body portion 1424 of the powder extraction container 142.

According to this embodiment, the backflow preventing layer 14233 allows the water in the transition cavity 14231 to enter the body portion 1424 of the powder extraction container 142, but prevents the water in the body portion 1424 to flow back to the transition cavity 14231. The back flow preventing layer 14233 can be embodied as a one-way valve. In this embodiment, the backflow preventing layer 14233 is a plate with a plurality of pores 142331 each having a smaller diameter than the diameter of the inlet 14214 in the bottom wall 14211 of the top engaging portion 1421.

Accordingly, when the water pump assembly 115 is stopped working, negative pressure may be created in the indented groove 14213 between the top engaging portion 1421 of the powder extraction container 142 and the resilient protrusion 1116 of the housing 111, and coffee residual in the extraction cavity 1425 may be drawn to flow back into the space between the powder extraction container 142 and the housing 111, but the employment of the backflow preventing layer 14233 will prevent the back flow of the coffee residual in the extraction cavity 1425.

Alternatively, the person of ordinary skilled in the art should understand that in other embodiments, the backflow preventing layer 14233 may also be formed on the cover body 1422, or on the body portion 1424.

Figure 74:
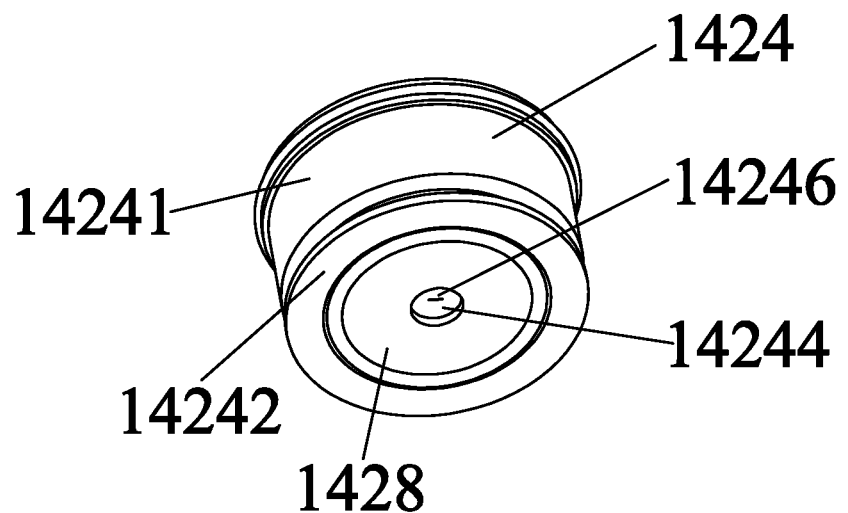
FIG. 74 is a perspective view illustrating a body portion of the powder extraction container of the portable coffee machine according to the seventh embodiment of the present invention.
Figure 75:
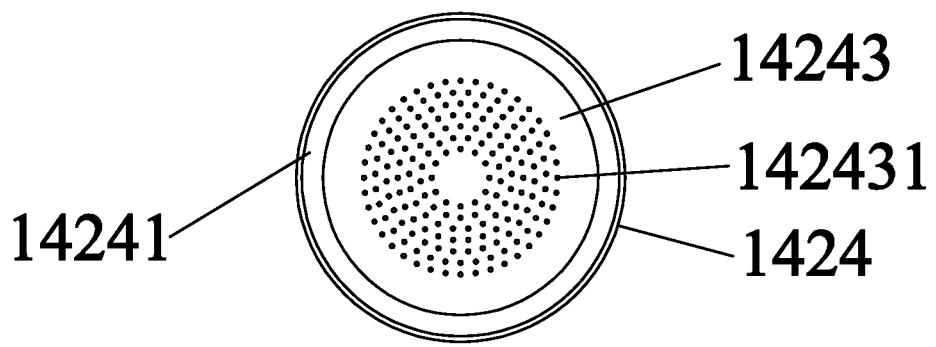
FIG. 75 is a top view illustrating the body portion of the powder extraction container of the portable coffee machine according to the seventh embodiment of the present invention.
Figure 76:
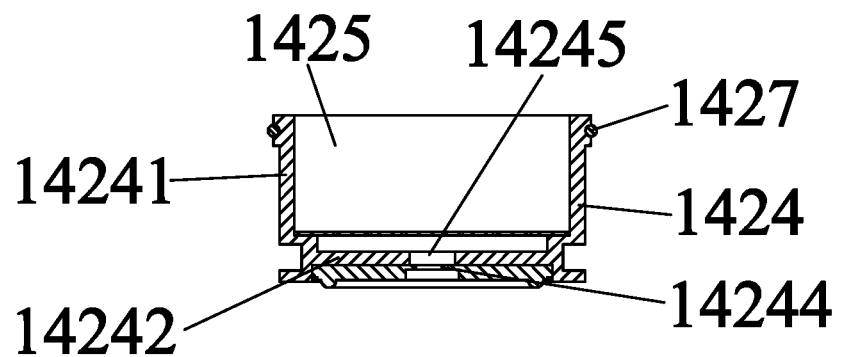
FIG. 76 is a sectional view illustrating the body portion of the powder extraction container of the portable coffee machine according to the seventh embodiment of the present invention.

As shown in FIGS. 74 to 76 of the drawings, the body portion 1424 of the powder extraction container 142 comprises a surrounding portion 14241, a bottom portion 14242 and a filtering layer 14243 disposed at a bottom of the extraction cavity 1425 above the bottom portion 14242, the filtering layer 14243 is provided with small holes 142431 to allow the liquid coffee flow to flow into the transferring cup 120.

In this embodiment, a film layer 14244 is connected to the bottom portion 14242 of the body portion 1424 of the powder extraction container 142, a flow chamber 14245 is formed between the film layer 14244 and the filtering layer 14243. The film layer 14244 is flexible and is formed with at least a discharging slit 14246 which is only forced to open by the increased pressure in the flow chamber 14245.

In other words, the discharging slit 14246 is formed between abutting edges and is in a closed state when the water pump assembly 115 is not in operation. And when the water pump assembly 115 pumps the boiled hot water in the water storing cup 112 into the body portion 1424 of the powder extraction container 142 for coffee extraction, the hot water will be mixed with the coffee powder in the extraction cavity 1425 between the cover body 1422 and the body portion 1424, and then the coffee flow will enter the flow chamber 14245 through the filtering layer 14243 to increase the pressure in the flow chamber 14245, only under the condition of the increased pressure in the flow chamber 14245, the discharging slit 14246 of the film layer 14244 can be forced to be in the open state for discharging the coffee flow into the transferring cup 120, so as to ensure that the hot water enters into the extraction cavity 1425 is completely mixed with coffee powder for coffee extraction before being discharged.

Furthermore, a circular groove 1426 is formed between the transition container 1423 and the cover body 1422, the surrounding portion 14241 of the body portion 1424 of the powder extraction container 142 comprises an upper edge part that is received in the circular groove 1426 for detachably coupling the body portion 1424 to the cover body 1422 to define the extraction cavity 1425 between the body portion 1424 and the cover body 1422.

In addition, as shown in FIG. 76 of the drawings, a resilient ring 1427 can be wound around the upper edge part of the surrounding portion 14241 of the body portion 1424 of the powder extraction container 142, so as to enhance the frictional contact between the body portion 1424 and the cover body 1422, so that the sealing effect between the two components is enhanced.

A bottom groove 1428 may be formed at the bottom of the bottom portion 14242 of the body portion 1424 for fitting with the transferring cup 120. The transferring cup 120 can be detachably coupled to the powder extraction container 142. More specifically, the powder extraction container 142 can be disposed in the transferring cup 120. Accordingly, the coffee powder can be feed into the body portion 1424 of the powder extraction container 142, and the cover body 1422 is then disposed on the boy portion 1424 of the powder extraction container 142. And then the transferring cup 120 can be assembled with the powder extraction container 142 by placing the powder extraction container 142 in the transferring cup 120.

Similar to the above sixth embodiment, the transferring cup 120 comprises a cup body 121 and a sealing portion 122 which is integrally protruded from the cup body 121. The cup body 121 comprises a bottom wall 1211 and a surrounding wall 1212 integrally extended from the bottom wall 1211 to define a receiving chamber 1213, the sealing portion 122 of this embodiment is extended into the receiving chamber 1213 and is protruded from the bottom wall 1211 of the cup body 121, and the sealing portion 122 can be fitted into the bottom groove 1428 of the body portion 1424 of the powder extraction container 142, so that the coffee flow enters into the bottom groove 1428 will pass through the sealing portion 122 of the transferring cup 120 to enter the coffee cup 130.

Example 8

Figure 77:
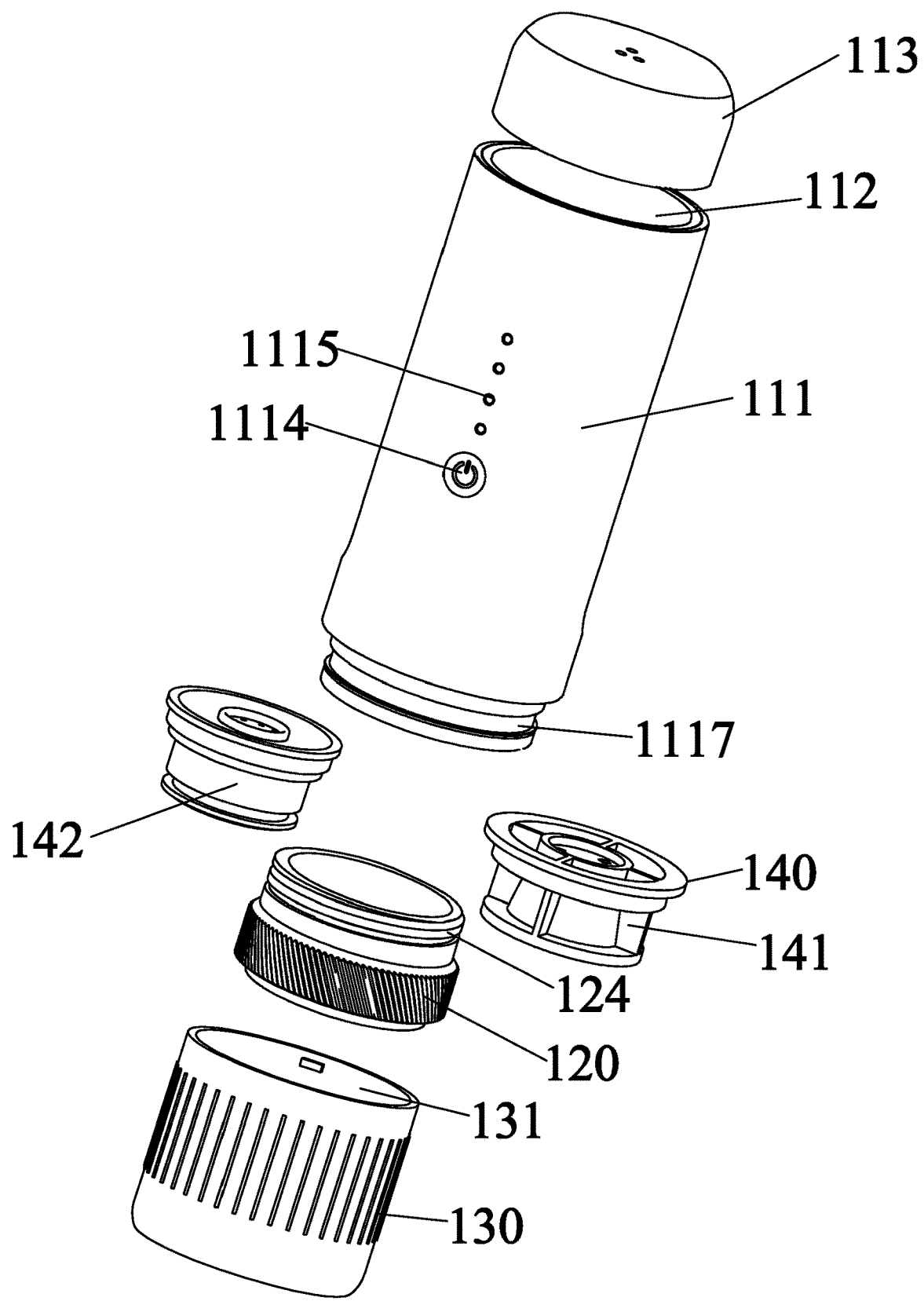
FIG. 77 is an exploded view of a portable coffee machine according to an eighth embodiment of the present invention.

Referring to FIG. 77 of the drawings, a portable coffee machine 100 according to a eighth embodiment of the present invention is illustrated, the portable coffee machine 100 comprises a machine body 110, an extraction assembly 140 detachably coupled to the machine body 110 for receiving coffee powder or a coffee capsule, a transferring cup 120 detachably coupled to the extraction assembly 140, and a coffee cup 130 detachably coupled to the transferring cup 120, the machine body 110 can prepare and deliver boiled water into the extraction assembly 140 for coffee extraction, and the produced coffee will pass through the transferring cup 120, so as to be collected in the coffee cup 130 for the user to drink.

In this embodiment, the extraction assembly 140 comprises a capsule extraction container 141 and a powder extraction container 142, the capsule extraction container 141 has a same structure in the above sixth embodiment for receiving the coffee capsule, and the powder extraction container 142 has a same structure in the above seventh embodiment for receiving the coffee powder.

Accordingly, the capsule extraction container 141 and the powder extraction container 142 are replaceable and can be detachably coupled with the housing 111 and the transferring cup 120, so that it provides convenience to the user.

The above description is only the disclosure of the embodiment of the present invention, and the implementation and scope of the present invention should not be limited thereto. Those skilled in the art should be able to realize that any equivalent substitution and obvious modification made based on the disclosure and illustrations of the present invention are within the scope of the present invention.

What is claimed is:

1. A portable coffee machine, comprising:
   a machine body comprising:
      a housing,
      a water storing cup mounted to said housing, and
      a water pump unit;
   an extraction assembly;
   a heating module for heating the water in said water storing cup; and
   a transferring cup, wherein said extraction assembly is detachably coupled with said housing, wherein said transferring cup is detachably coupled to said extraction assembly, wherein water in said water storing cup is capable of being pumped into said extraction assembly by said water pump unit for coffee extraction;
   wherein said heating module comprises a heating member which is located at a bottom of said water storing cup, wherein said water storing cup is made of thermal conductive material, wherein said water storing cup comprises a bottom wall and a surrounding wall connected to said bottom wall to define a water storing cavity, wherein said water storing cup further comprises a discharging portion which has a plurality of discharging holes communicated to said water storing cavity, wherein said discharging portion is formed at a periphery of said bottom wall of said water storing cup, wherein said discharging portion is protruded from said bottom wall of said water storing cup for being connected to said water pump unit, wherein said heating member is provided at an inner side of said discharging portion.

2. The portable coffee machine according to claim 1, wherein said machine body further comprises a water pump assembly which comprises said water pump unit, a connecting conduit which is connected between said discharging portion of said water storing cup and said water pump, and a feeding conduit communicating said water pump unit to said extraction assembly.

3. The portable coffee machine according to claim 2, wherein said water pump unit comprises an operation motor having a driving shaft, a motion transmission element, a pump element and a water guiding element which is connected between said water storing cup and said extraction assembly, wherein when said operation motor is activated, said driving shaft is driven to rotate, and the rotation will be transmitted to said pump element by said motion transmission element, so as to drive said water guiding element to suck in the water from said water storing cup and discharge the water towards said extraction assembly.

4. The portable coffee machine according to claim 3, wherein said motion transmission element comprises a driving unit comprising an eccentric member and a linkage member connected to said eccentric member, wherein said pump element comprises a diaphragm member connected to said linkage member, and a water transition plate communicated to said water guiding element, wherein said diaphragm member is attached to said water transition plate to define a transition chamber between said diaphragm member and said water transition plate.

5. The portable coffee machine according to claim 4, wherein said motion transmission element further comprises a channel member, wherein said water transition plate has an inlet and an outlet, wherein said inlet and said outlet of said water transition plate are communicated to said transition chamber, wherein said channel member has an inlet channel and an outlet channel, wherein said inlet channel is communicated to said inlet of said water transition plate and said outlet channel is communicated to said outlet of said water transition plate, wherein said water guiding element comprises an inlet portion and an outlet portion, wherein said inlet portion is connected to said water storing cup by said connecting conduit, said outlet portion is connected to said feeding conduit.

6. A portable coffee machine, comprising:
a machine body comprising:
a housing,
a water storing cup mounted to said housing, and
a water pump unit;
an extraction assembly; and
a transferring cup, wherein said extraction assembly is detachably coupled with said housing, wherein said transferring cup is detachably coupled to said extraction assembly, wherein water in said water storing cup is capable of being pumped into said extraction assembly by said water pump unit for coffee extraction;
wherein said water pump unit comprises an operation motor having a driving shaft, a motion transmission element, a pump element and a water guiding element which is connected between said water storing cup and said extraction assembly, wherein said motion transmission element comprises a driving unit comprising an eccentric member and a linkage member connected to said eccentric member, wherein said pump element comprises a diaphragm member connected to said linkage member, a water transition plate communicated to said water guiding element, and a channel member, wherein said diaphragm member is attached to said water transition plate to define a transition chamber between said diaphragm member and said water transition plate, wherein said water transition plate has an inlet and an outlet, wherein said inlet and said outlet of said water transition plate are communicated to said transition chamber, wherein said channel member has an inlet channel and an outlet channel, wherein said inlet channel is communicated to said inlet of said water transition plate and said outlet channel is communicated to said outlet of said water transition plate, wherein said water guiding element comprises an inlet portion connected to said water storing cup and an outlet portion connected to said extraction assembly, wherein when said operation motor is activated, said driving shaft drives said eccentric member to rotate, and said linkage member is driven by said eccentric member to reciprocate, so as to drive said diaphragm member to deform, so as to create pressure change in said transition chamber between said diaphragm member and said water transition plate, so as to suck the water from said water storing cup into said transition chamber and discharge the water in said transition chamber towards said extraction assembly.

7. A portable coffee machine, comprising:
a machine body comprising:
a housing,
a water storing cup mounted to said housing, and
a water pump unit;
an extraction assembly; and
a transferring cup, wherein said extraction assembly is detachably coupled with said housing, wherein said transferring cup is detachably coupled to said extraction assembly, wherein water in said water storing cup is capable of being pumped into said extraction assembly by said water pump unit for coffee extraction;
wherein said extraction assembly comprises a capsule extraction container which comprises a capsule retaining portion and a top engaging portion connected to said capsule retaining portion, wherein said capsule retaining portion has an extraction cavity for receiving a coffee capsule, said top engaging portion has an inlet communicated to said extraction cavity, said housing has a feeding outlet hole at a bottom thereof, wherein when said top engaging portion is engaged with said housing, said feeding outlet hole is communicated to said inlet of said top engaging portion;
wherein said top engaging portion has an indented groove, wherein said feeding outlet hole is communicated to said inlet of said top engaging portion through said indented groove, wherein said top engaging portion has a plurality of said inlets arranged in a circumferential direction at a peripheral edge thereof, wherein said housing comprises a resilient protrusion at a bottom side thereof for biasing against said top engaging portion, wherein said feeding outlet hole is provided at a center of said resilient protrusion, wherein said capsule extraction container comprises a blade assembly which comprises a plurality of blades, wherein said plurality of blades is respectively aligned with said inlets of said top engaging portion, wherein said capsule extraction container is detachably disposed in said transferring cup to seal a bottom of said extraction cavity, wherein said transferring cup comprises a sealing portion comprising a plurality of protrusions and a plurality of discharge outlet holes aligned with said extraction cavity, wherein said transferring cup further has a central outlet communicated to said extraction cavity through said plurality of discharge outlet holes.

8. A portable coffee machine, comprising:
a machine body comprising:
a housing,
a water storing cup mounted to said housing, and
a water pump unit;
an extraction assembly; and
a transferring cup, wherein said extraction assembly is detachably coupled with said housing, wherein said transferring cup is detachably coupled to said extraction assembly, wherein water in said water storing cup is capable of being pumped into said extraction assembly by said water pump unit for coffee extraction;
wherein said extraction assembly comprises a powder extraction container which comprises a top engaging portion, a cover body and a body portion, wherein aid cover body is detachably coupled with said bod portion to define an extraction cavity for receiving coffee powder, wherein said top engaging portion, which is connected to said cover body, has an inlet communicated to said extraction cavity, wherein said housing has a feeding outlet hole at a bottom thereof, wherein when said top engaging portion is engaged with said housing, said feeding outlet hole is communicated to said inlet of said top engaging portion;
wherein said powder extraction container further comprises a backflow prevention layer disposed in said extraction cavity for preventing back flow of coffee liquid when said water pump unit is stopped working.

9. The portable coffee machine according to claim 8, wherein said powder extraction container further comprises a transition container which comprises an enclosing wall connected to said cover body and said backflow prevention layer connected to said enclosing wall to define a transition cavity, wherein said backflow prevention layer has a plurality of pores each having a diameter smaller than a diameter of said inlet of said top engaging portion.

10. A portable coffee machine, comprising:
a machine body comprising:
a housing,
a water storing cup mounted to said housing, and
a water pump unit;
an extraction assembly; and
a transferring cup, wherein said extraction assembly is detachably coupled with said housing, wherein said transferring cup is detachably coupled to said extraction assembly, wherein water in said water storing cup is capable of being pumped into said extraction assembly by said water pump unit for coffee extraction;
wherein said extraction assembly comprises a powder extraction container which comprises a top engaging portion, a cover body and a body portion, wherein aid cover body is detachably coupled with said bod portion to define an extraction cavity for receiving coffee powder, wherein said top engaging portion, which is connected to said cover body, has an inlet communicated to said extraction cavity, wherein said housing has a feeding outlet hole at a bottom thereof, wherein when said top engaging portion is engaged with said housing, said feeding outlet hole is communicated to said inlet of said top engaging portion;
wherein said body portion of said powder extraction container comprises a surrounding portion, a bottom portion, a filtering layer disposed at a bottom of said extraction cavity above said bottom portion to allow liquid coffee to flow into said transferring cup, and a film layer connected to said bottom portion, wherein a flow chamber is formed between said film layer and said filtering layer, wherein said film layer is flexible and is formed with a discharging slit which is shifted between an open state in which said discharging slit is forced to open by an increased pressure in said flow chamber when said water pump unit is working and a closed sate in which said discharging slit is closed to prevent said flow chamber to be communicated to said transferring cup.

11. The portable coffee machine according to claim 10, wherein said top engaging portion has an indented groove, wherein said feeding outlet hole is communicated to said inlet of said top engaging portion through said indented groove, wherein said top engaging portion has a plurality of said inlets arranged in a circumferential direction at a peripheral edge thereof, wherein said housing comprises a resilient protrusion at a bottom side thereof for biasing against said top engaging portion, wherein said feeding outlet hole is provided at a center of said resilient protrusion, wherein said powder extraction container is detachably disposed in said transferring cup, wherein said transferring cup has an central outlet communicated to said extraction cavity.

12. A portable coffee machine, comprising:
a machine body comprising:
a housing,
a water storing cup mounted to said housing, and
a water pump unit;
an extraction assembly; and
a transferring cup, wherein said extraction assembly is detachably coupled with said housing, wherein said transferring cup is detachably coupled to said extraction assembly, wherein water in said water storing cup is capable of being pumped into said extraction assembly by said water pump unit for coffee extraction;
wherein said extraction assembly comprises a capsule extraction container which comprises a capsule retaining portion and a top engaging portion connected to said capsule retaining portion, wherein said capsule retaining portion has an extraction cavity for receiving a coffee capsule, said top engaging portion has an inlet communicated to said extraction cavity, said housing has a feeding outlet hole at a bottom thereof, wherein when said top engaging portion is engaged with said housing, said feeding outlet hole is communicated to said inlet of said top engaging portion;
wherein said capsule extraction container is detachably disposed in said transferring cup, wherein said transferring cup is detachably coupled with said housing by threads.

13. A portable coffee machine, comprising:
a machine body comprising:
a housing,
a water storing cup mounted to said housing, and
a water pump unit;
an extraction assembly; and
a transferring cup, wherein said extraction assembly is detachably coupled with said housing, wherein said transferring cup is detachably coupled to said extraction assembly, wherein water in said water storing cup is capable of being pumped into said extraction assembly by said water pump unit for coffee extraction;
wherein said extraction assembly comprises a powder extraction container which comprises a top engaging portion, a cover body and a body portion, wherein aid cover body is detachably coupled with said bod portion to define an extraction cavity for receiving coffee powder, wherein said top engaging portion, which is connected to said cover body, has an inlet communicated to said extraction cavity, wherein said housing has a feeding outlet hole at a bottom thereof, wherein when said top engaging portion is engaged with said housing, said feeding outlet hole is communicated to said inlet of said top engaging portion;
wherein said powder extraction container is detachably disposed in said transferring cup, wherein said transferring cup is detachably coupled with said housing by threads.

14. A portable coffee machine, comprising:
a machine body comprising:
a housing,
a water storing cup mounted to said housing, and
a water pump unit;
an extraction assembly;
a heating module for heating the water in said water storing cup;
a transferring cup, wherein said extraction assembly is detachably coupled with said housing, wherein said transferring cup is detachably coupled to said extraction assembly, wherein water in said water storing cup is capable of being pumped into said extraction assembly by said water pump unit for coffee extraction; and
a cup lid detachably coupled with said water storing cup, wherein said cup lid comprises a lid body and a flexible sealing film connected to said lid body, wherein said flexible sealing film has a slit which is forced to open by increased air pressure in said water storing cup when said heating module heats and boils the water ins aid water storing cup to produce water vapor.

15. The portable coffee machine according to claim 14, wherein said lid body has a plurality of vapor holes, wherein said cup lid further comprises a connecting column connected to said lid body, wherein a cavity is defined between said flexible sealing film and said lid body, wherein said plurality of vapor holes is communicated to said cavity, wherein said connecting column is coupled with said flexible sealing film to define said slit.

\* \* \* \* \*